United States Patent
Bertucci et al.

(10) Patent No.: US 9,268,338 B2
(45) Date of Patent: Feb. 23, 2016

(54) FLUID DISPENSING APPARATUS AND METHOD

(75) Inventors: Michael H. Bertucci, Gurnee, IL (US);
Christopher F. Lang, Racine, WI (US);
Susan K. Lewis, Gurnee, IL (US);
Justin M. Nunez, Greenfield, WI (US);
Timothy S. Jones, Sharpsburg, GA (US); Steven E. Schiller, Kenosha, WI (US); Wayne Phillips, Hudson, WI (US)

(73) Assignee: Diversey, Inc., Sturtevant, WI (US)

(*) Notice: Subject to any disclaimer, the term of this patent is extended or adjusted under 35 U.S.C. 154(b) by 0 days.

(21) Appl. No.: 13/619,816

(22) Filed: Sep. 14, 2012

(65) Prior Publication Data

US 2013/0008522 A1  Jan. 10, 2013

Related U.S. Application Data

(63) Continuation of application No. 12/562,831, filed on Sep. 18, 2009, now Pat. No. 8,342,364, which is a continuation of application No. PCT/US2007/020511, filed on Sep. 21, 2007, which is a continuation of application No. PCT/US2007/064524, filed on Mar. 21, 2007.

(60) Provisional application No. 60/784,969, filed on Mar. 22, 2006.

(51) Int. Cl.
*G05D 11/00* (2006.01)

(52) U.S. Cl.
CPC ............ *G05D 11/006* (2013.01); *G05D 11/008* (2013.01); *Y10T 137/2496* (2015.04); *Y10T 137/2516* (2015.04)

(58) Field of Classification Search
USPC ............... 222/57, 133, 395, 180–181.3, 184, 222/185.1; 137/87.01
See application file for complete search history.

(56) References Cited

U.S. PATENT DOCUMENTS

| 224,299 | A | * | 2/1880 | Leininger | 60/639 |
|---|---|---|---|---|---|
| 340,313 | A | | 4/1886 | Higgins | |
| 1,331,110 | A | * | 2/1920 | Hutchens | 60/639 |
| 1,476,457 | A | * | 12/1923 | Miller | 415/66 |
| 1,687,876 | A | * | 10/1928 | Moeser | 116/111 |
| 1,831,684 | A | * | 11/1931 | Petersen | 15/101 |
| 2,094,161 | A | * | 9/1937 | Paddock | 401/46 |

(Continued)

OTHER PUBLICATIONS

United States Patent Office Action for U.S. Appl. No. 12/282,797 dated Sep. 26, 2013 (23 pages).

(Continued)

*Primary Examiner* — Donnell Long
(74) *Attorney, Agent, or Firm* — Michael Best & Friedrich LLP

(57) ABSTRACT

A fluid dispenser and method of operating the same. The fluid dispenser can include a wheel driven by diluent passing along a flow path in the fluid dispenser. The wheel can be connected to a pump to pump fluid from a reservoir for dispense into the diluent. In some embodiments, the ratio of wheel rotations to pump cycles is selected to provide a desired and repeatable dilution ratio of concentrated fluid to diluent. The fluid dispenser can be portable and/or disposable, and in some embodiments is adapted for installation on an upper rim of a reservoir wall. Also, the fluid dispenser can be provided with a baffle limiting the velocity and impact of incoming diluent to the wheel driving the pump, thereby improving dosing accuracy of the dispenser in some embodiments.

21 Claims, 28 Drawing Sheets

(56) References Cited

U.S. PATENT DOCUMENTS

| | | | |
|---|---|---|---|
| 2,543,941 A | 3/1951 | Sargent | |
| 3,068,492 A * | 12/1962 | Price | 4/222 |
| 3,164,302 A * | 1/1965 | Indjian | 4/227.1 |
| 3,549,048 A | 12/1970 | Goodman | |
| 3,627,177 A * | 12/1971 | Marcus et al. | 222/181.3 |
| 3,713,565 A * | 1/1973 | Langford | 222/180 |
| 3,869,069 A * | 3/1975 | Levey et al. | 222/180 |
| 3,953,902 A * | 5/1976 | Taylor | 4/227.5 |
| 4,185,653 A * | 1/1980 | Armstrong et al. | 137/114 |
| 4,228,928 A * | 10/1980 | Hocker et al. | 222/181.3 |
| 4,246,753 A | 1/1981 | Redmond | |
| 4,336,822 A | 6/1982 | Carrell | |
| 4,467,217 A | 8/1984 | Roussey | |
| 4,522,231 A | 6/1985 | Bergmann | |
| 4,651,899 A * | 3/1987 | Pauls et al. | 222/130 |
| 4,731,545 A * | 3/1988 | Lerner et al. | 290/54 |
| 4,923,368 A | 5/1990 | Martin | |
| 4,968,437 A * | 11/1990 | Noll et al. | 210/748.1 |
| 5,163,824 A * | 11/1992 | Kantner | 418/153 |
| 5,167,800 A | 12/1992 | Ringer et al. | |
| 5,803,268 A * | 9/1998 | Levy et al. | 206/581 |
| 6,029,286 A * | 2/2000 | Funk | 4/223 |
| 6,029,688 A | 2/2000 | Kaufman | |
| 6,036,333 A * | 3/2000 | Spiller | 362/192 |
| 6,765,308 B1 * | 7/2004 | Kazanjian et al. | 290/43 |
| 6,769,449 B2 | 8/2004 | Stearns | |
| 6,798,080 B1 * | 9/2004 | Baarman et al. | 290/43 |
| 7,014,759 B2 * | 3/2006 | Radford | 210/232 |
| 7,032,787 B2 * | 4/2006 | Sherk et al. | 222/441 |
| 7,067,936 B2 * | 6/2006 | Baarman et al. | 290/43 |
| 7,222,487 B1 * | 5/2007 | Hinkley | 60/639 |
| 7,322,052 B2 * | 1/2008 | Alexander | 4/223 |
| 8,603,257 B2 * | 12/2013 | Burt et al. | 134/24 |
| 2001/0024038 A1 * | 9/2001 | Cavalheiro | 290/1 R |
| 2002/0113442 A1 * | 8/2002 | Yumita | 290/54 |
| 2011/0173976 A1 | 7/2011 | Meadon et al. | |

OTHER PUBLICATIONS

Office Action from the Canadian Intellectual Property Office for Application No. 2681359 dated Mar. 3, 2014 (2 pages).

Office Action from the U.S. Appl. No. 12/282,797 dated Mar. 24, 2014 (34 pages).

* cited by examiner

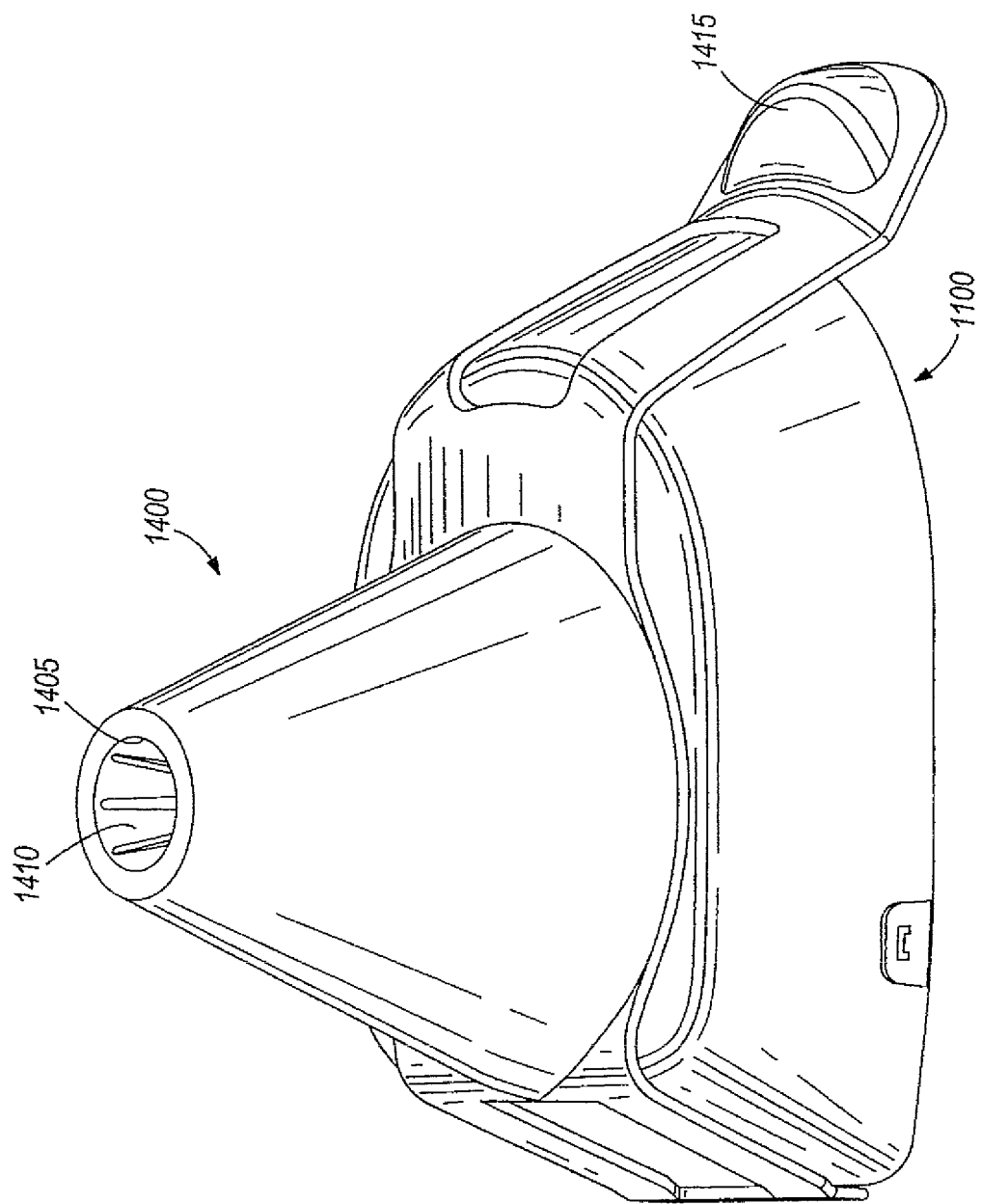

FLUID DISPENSING APPARATUS AND METHOD

CROSS REFERENCE TO RELATED APPLICATIONS

This application is a continuation of U.S. patent application Ser. No. 12/562,831, filed Sep. 18, 2009, issued as U.S. Pat. No. 8,342,364 on Jan. 1, 2013, which is a continuation of International Application No. PCT/US2007/020511 filed Sep. 21, 2007, which is a continuation of International Application No. PCT/US2007/064524 filed Mar. 21, 2007, which claims priority to U.S. Provisional Patent Application No. 60/784,969 filed Mar. 22, 2006. The entire contents of all earlier-filed patent applications are incorporated herein by reference.

BACKGROUND OF THE INVENTION

Many different types of dosing equipment are used to dose concentrated cleaning chemicals and other types of chemicals into a final use solution at a predetermined dilution ratio. Some types of equipment are plumbed directly to a water source (i.e., volumetric eductor based dispensing). However, installation of this type of equipment can be cost prohibitive. Other types of equipment utilize portion control, wherein a predetermined amount of concentrated chemicals is dispensed into a mixing container and another liquid is added to the container separately to dilute the concentrated chemicals. This type of equipment requires the user to know exactly how much of the chemical and diluent is needed for the proper mixing ratio. Accordingly, it can require a user to know the size or volume of a container being filled and to fill the container to an appropriate level. This, however, may be difficult when filling or only partially filling sinks, reservoirs within a floor cleaning machine, buckets, and various other containers.

Accordingly, there is a need for a dilution control system that utilizes volumetric dosing principles without the need for expensive installation costs.

SUMMARY OF THE INVENTION

In some embodiments, a device for receiving fluid to be diluted is provided, and can include a mechanism for controlled dispense of the fluid mixed with diluent at predetermined dilution ratio. The device can include a mechanism for automatically adjusting the dispense rate of concentrate as the flow rate of fluid is changed to maintain the predetermined dilution ratio.

Some embodiments of the present invention provide a method of dispensing fluid diluted to a predetermined dilution ratio, wherein the ratio is maintained as the flow rate of fluid is varied.

Some embodiments of the present invention relate to a dilution control system that utilizes volumetric closing, but does not necessarily require expensive installation costs. In other words, some embodiments of the present invention provide a dispensing apparatus or method that draws or otherwise delivers a concentrated chemical proportionally to the flow rate of a diluent. Some embodiments of the present invention utilize a wheel with a horizontal axis and buckets, floats, or other containers at its rim, wherein diluent or water flowing into or onto the buckets provide power to dispense concentrated chemicals at an appropriate dilution ratio to the diluent flowing into or onto the wheel. Specifically, the wheel harnesses the power of diluent and provides power to other structures or elements for dispensing concentrated chemicals.

In some embodiments, a free flow or gravity fed wheel is utilized as part of a dilution control system. The diluent can freely flow from a source over an air gap into the wheel. The diluent is captured within the scoops or containers of the wheel, which causes the wheel to rotate. The wheel is mounted to a shaft that rotates with the wheel. Rotation of the shaft is then used dispense the concentrated chemical. In some embodiments, the shaft directly dispenses the concentrated chemical. In other embodiments, the shaft indirectly dispenses the concentrated chemical by actuating other devices, such as gears, shafts, pumps, etc.

Also, in some embodiments, a wheel is directly connected to a source of diluent, such as a faucet, as part of a dilution control system. The pressure and speed of the diluent as it is fed to the wheel can provide mechanical advantage for dispensing chemical product into the diluent. The diluent is captured within the scoops or containers of the wheel, which causes the wheel to rotate. The wheel is coupled to a shaft that rotates with the wheel. Rotation of the shaft is then used to dispense the concentrated chemical. In some embodiments, the shaft directly dispenses the concentrated chemical. In other embodiments, the shaft indirectly dispenses the concentrated chemical by actuating other devices, such as gears, shafts, pumps, etc. In some embodiments, the wheel is coupled to an electrical generator. The power generated from the electrical generator can then be utilized to power a pump.

Some embodiments of the present invention provide a chemical dispensing apparatus comprising a housing at least partially defining a flow path or fluid passageway adapted to receive a diluent from a diluent source, and a rotary power wheel coupled to the housing and in fluid communication with the fluid passageway. The rotary power wheel is driven by the impact or weight of diluent flowing through the fluid passageway. A shaft is coupled to the housing and the wheel, wherein the shaft is adapted to rotate with the wheel. A pump is coupled to the housing and the shaft. The pump is in fluid communication with a reservoir containing a concentrated chemical, and is actuated by rotation of the shaft to deliver concentrated chemicals to diluent flowing through the fluid passageway.

Some embodiments of the present invention provide a chemical dispensing apparatus comprising a housing at least partially defining a flow path or fluid passageway adapted to receive a diluent from a diluent source, wherein the housing is coupled to a concentrated chemical reservoir. A rotary power wheel is coupled to the housing and is in fluid communication with the fluid passageway. The rotary power wheel is driven by the impact or weight of diluent flowing through the fluid passageway. A shaft coupled to the housing and the wheel is adapted to rotate in response to rotation of the wheel, is positioned within an aperture or flow path of the concentrated chemical reservoir, and is adapted to selectively dispense concentrated chemicals from the reservoir via rotation of shaft. In some embodiments, the shaft includes a rotary metering device in communication with the aperture or flow path of the concentrated chemical reservoir. Rotation of the shaft causes the rotary metering device to dispense concentrated chemical from the reservoir. The rotary metering device of some embodiments comprises a flatted portion of the shaft in selective communication with the concentrated chemical, wherein rotation of the flattened portion adjacent the aperture provides metered dispensing of a concentrated chemical in the chemical reservoir. The rotary metering device of other embodiments comprises a disc coupled to the shaft and having at least one aperture for receiving concentrated chemical when in communication with the concentrated chemical. Also, in some embodiments, the shaft is a first shaft and the chemical dispensing apparatus further comprises a second shaft and a set of gears. The second shaft is directly coupled to the wheel and is adapted to rotate with the wheel, and the set of gears are positioned to provide power from the second shaft to the first shaft.

Some embodiments of the present invention provide a chemical dispensing apparatus comprising a housing at least partially defining a fluid passageway adapted to receive a diluent from a diluent source, and a wheel coupled to the housing and in fluid communication with the fluid passageway. The wheel is driven by the impact or weight of diluent flowing through the fluid passageway. A shaft is coupled to the housing and the wheel, wherein the shaft is adapted to rotate with the wheel. A generator is coupled to the shaft, and is adapted to rotate in response to rotation of the shaft. Rotation of the generator produces electricity. A pump is in electrical communication with the generator and in fluid communication with a reservoir containing a concentrated chemical. The pump is actuatable by rotation of the wheel to deliver concentrated chemicals to diluent flowing through the fluid passageway.

Some constructions of the embodiments described above can include any number of other features. For example, some embodiments include a conduit at least partially positioned in the housing to deliver the concentrated cleaning chemical from the pump to diluent passing through the fluid passageway. The conduit can be positioned to deliver the concentrated cleaning chemical to the wheel to allow the concentrated chemical to be mixed with the diluent in the wheel. As another example, in some embodiments, the reservoir containing the concentrated chemical is contained within the housing. In other embodiments, the reservoir containing the concentrated chemical is located remotely relative to the housing, and is in fluid communication with the housing via a conduit extending between the pump and the reservoir. As another example, some embodiments also include a set of gears coupled to the housing and positioned to provide power from the shaft to the pump. The set of gears can include a gear ratio that is selected to provide a predetermined dilution ratio. As another example, in some embodiments, the pump is dimensioned and configured to deliver a predetermined amount of concentrated chemical to the diluent per each rotation of the wheel. Also, some embodiments include a funnel along the fluid passageway and upstream from the wheel, wherein the funnel gathers water without direct connection to a source of diluent, and directs the diluent to the wheel. Other embodiments, however, include a backflow prevention device that is coupled to the housing, wherein the backflow prevention device is directly connected to the source of diluent.

In some embodiments, methods of proportionately mixing a concentrated chemical with a diluent are provided. For example, the method can comprise delivering a diluent to a fluid passageway of a housing, and rotating a wheel coupled to the housing and in fluid communication with the fluid passageway via the impact of diluent on the wheel. A pump coupled to the housing is operated via rotation of the wheel, and is in fluid communication with a reservoir containing a concentrated chemical, wherein operation of the pump is proportional to rotation of the wheel. Concentrated chemicals are drawn from the reservoir in response to operating the pump, and are delivered to the diluent. Some embodiments also include the steps of operating a generator with the wheel, and generating electricity with the generator. The electricity is then used to power the pump.

Some embodiments provide a method comprising delivering a diluent to a fluid passageway of a housing, and rotating a wheel coupled to the housing and in fluid communication with the fluid passageway via impact of diluent on the wheel. This causes rotation of a shaft coupled to the wheel. A rotary metering device coupled to the shaft is positioned in a selectively blocking position of an aperture positioned in a concentrated chemical reservoir. Concentrated chemical is selectively dispensed from the reservoir in response to rotation of the shaft and the rotary metering device, and is delivered to the diluent.

In some embodiments of the present invention, a portable fluid dispensing apparatus for dispense of a fluid into a diluent and adapted for installation on an upper rim of a reservoir wall is provided, and comprises an inlet into which diluent flows; an outlet from which diluent exits the dispensing apparatus; a flow path along which diluent flows from the inlet to the outlet; a wheel having a plurality of vanes, at least a portion of the wheel located within the flow path; a fluid reservoir; a pump coupled to the wheel and in fluid communication with the fluid reservoir, the pump operable to pump fluid from the fluid reservoir responsive to rotation of the wheel; and a bearing surface positioned to contact the reservoir wall and through which the dispensing apparatus is supported upon the upper rim of the reservoir wall; wherein the inlet, outlet, wheel, fluid reservoir, pump, and bearing surface define a portable unit removable and mountable upon a reservoir wall without the use of tools.

Some embodiments of the present invention provide a disposable fluid dispensing apparatus for dispense of a fluid into a diluent, wherein the disposable fluid dispensing apparatus comprises a housing; a diluent flow path through which diluent moves within the disposable dispensing apparatus; a wheel located at least partially within the housing and driven by diluent flowing along the diluent flow path; a reservoir in which a quantity of fluid is retained, the reservoir permanently sealed against access by a user from outside of the disposable dispensing apparatus; and a pump in fluid communication with the fluid in the reservoir, the pump coupled to the wheel and driven by rotation of the wheel; wherein the housing, wheel, reservoir, and pump define a portable structure installed, removable, and disposable as a single integral unit without the use of tools.

In some embodiments of the present invention, a portable fluid dispensing apparatus for dispense of a fluid into a diluent is provided, and comprises a diluent flow path extending through the fluid dispensing apparatus; a pump; a fluid reservoir in fluid communication with the pump; and a wheel rotatable by diluent flowing along the diluent flow path, the wheel coupled to the pump to drive the pump responsive to rotation of the wheel, each rotation of the wheel corresponding to an amount of diluent passing the wheel along the diluent flow path and an amount of fluid pumped from the fluid reservoir; wherein a ratio of the amount of fluid pumped from the fluid reservoir per rotation of the wheel to the amount of fluid passing the wheel per rotation of the wheel is at least about 1:500.

Some embodiments of the present invention provide a fluid dispensing apparatus for dispense of a fluid into a diluent, wherein the fluid dispensing apparatus comprises an inlet into which diluent is received within the fluid dispensing apparatus; a baffle at least partially covering the inlet, the baffle comprising a first portion having a first plurality of apertures extending therethrough; and a second portion having a second plurality of apertures extending therethrough, wherein the second portion of the baffle is skewed with respect to the first portion to present at least one of a concave and convex shape to diluent approaching the fluid dispensing apparatus.

A portable dispensing apparatus, comprising a disposable container in which is contained a quantity of soap; a fluid flow path extending from the reservoir through which the soap passes for dispense from the apparatus responsive to flow of diluent in the apparatus; and a surface of the dispensing apparatus upon which is featured at least one of a brand name and logo of the soap within the disposable container.

Further aspects of the present invention, together with the organization and operation thereof, will become apparent from the following detailed description of the invention when taken in conjunction with the accompanying drawings.

BRIEF DESCRIPTION OF THE DRAWINGS

FIG. 35 is a perspective view of a hood according to an embodiment of the present invention, shown attached to a cap of a dispensing apparatus;

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
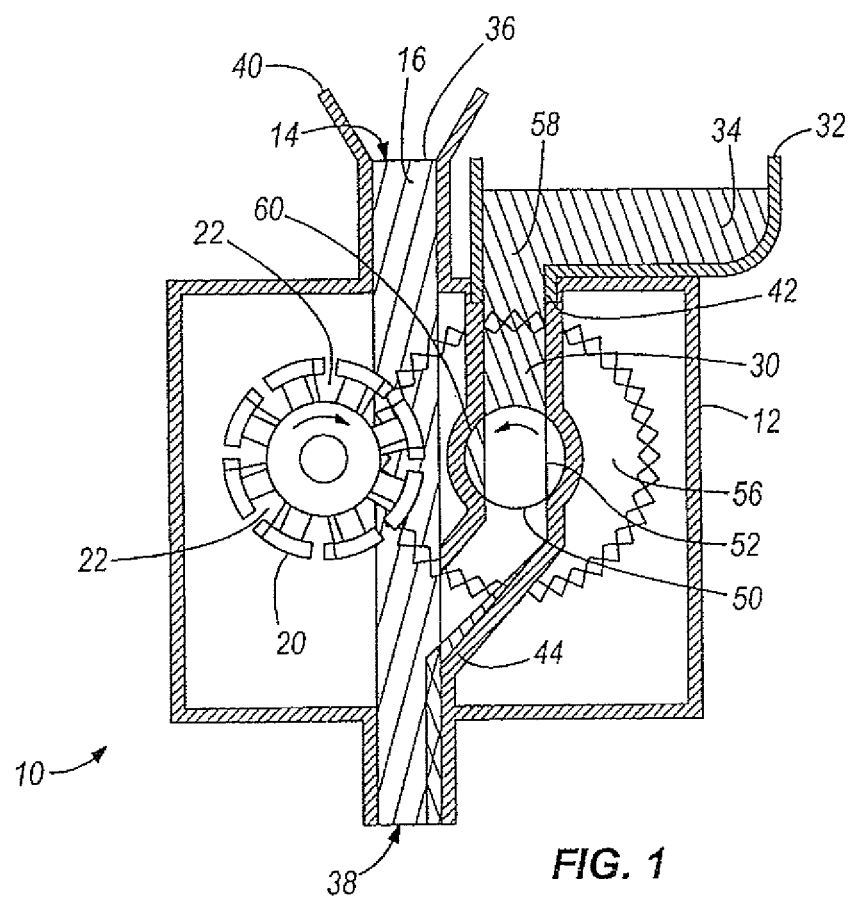
FIG. 1 is side cross-sectional view of a dispensing apparatus according to an embodiment of the present invention.
Figure 2:
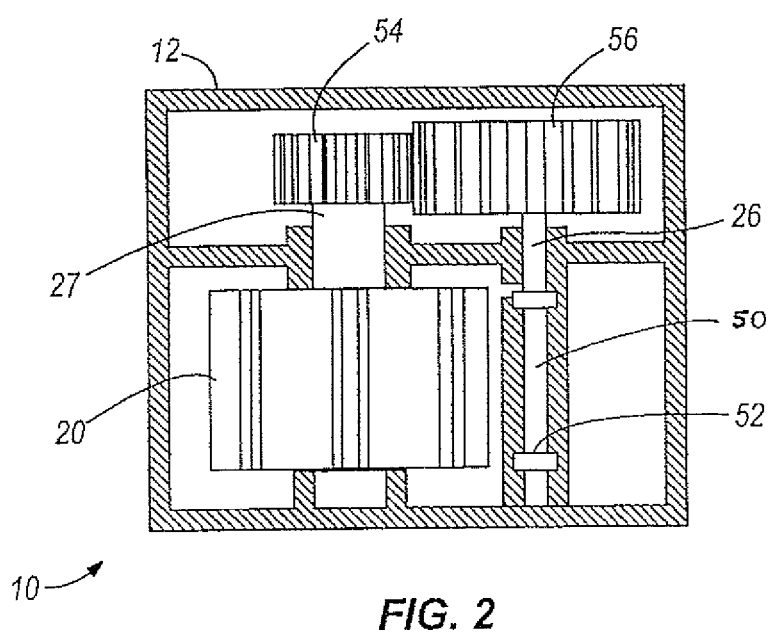
FIG. 2 is a top cross-sectional view of the dispensing apparatus shown in FIG. 1.

Referring to FIGS. 1 and 2, an embodiment of a dispensing apparatus 10 embodying aspects of the present invention is illustrated. The illustrated dispensing apparatus 10 provides a dilution control system that doses volumetrically. In other words, the dispensing apparatus 10 of this embodiment draws or otherwise delivers a concentrated chemical proportionally to the flow rate of a diluent passing through the dispensing apparatus 10 and into a container.

As illustrated, the dispensing apparatus 10 of this embodiment has a housing 12 and a fluid passageway 14 through which a diluent 16 from a diluent source (not shown) passes. The diluent source can be, for example, a plumbed diluent source such as a faucet on a sink or a spigot, a hose or hose bib, a pipe or other conduit, and the like, or can instead be a vessel of any type. In some embodiments, the fluid passageway 14 is defined at least in part by a portion of the housing 12, whereas in other embodiments, the fluid passageway 14 comprises one or more elements attached to the housing 12 in any suitable manner.

The dispensing apparatus 10 illustrated in FIGS. 1 and 2 has a wheel 20 rotatable about an axis and in fluid communication with fluid passing through the fluid passageway 14. The wheel 20 can be configured in a variety of different manners, as exemplified in the accompanying figures. In general, the wheel 20 can have or be connected to a central hub, axle, spindle, or other shaft, with a plurality of vanes 22 (described in greater detail below) extending therefrom, much like a water wheel, turbine, or paddle wheel. The wheel 20 generally operates as a rotary power unit driven by the impact of, weight, or reaction from a flow stream of fluid on the vanes 22 of the wheel 20. The wheel 20 harnesses the power of flowing diluent 16, and provides power to other structures or elements for dispensing concentrated chemicals 34, as will be described in greater detail below.

The wheel 20 can be connected to a separate shaft 27 or can be integrally formed with an shaft 27. In those embodiments in which the shaft 27 is an element that is separate from the wheel 20, the wheel 20 can be rotatable about a stationary shaft 27 or can rotate with respect to the shaft 27. Alternatively, in those embodiments in which the shaft 27 is integral with the wheel 20, the shaft 27 can be rotatable with respect to the dispensing apparatus structure (e.g., one or more sockets defined by or connected to the housing 12, one or more bearings or bushings connected to the housing 12, and the like, not shown in FIGS. 1 and 2) to which the shaft 27 is mounted.

In the illustrated embodiment of FIGS. 1 and 2, the shaft 27 (and therefore, the rotational axis) of the wheel 20 is horizontally oriented. Depending at least in part upon the path of fluid through the fluid passageway 14, the shaft 27 and rotational axis of the wheel 20 can be oriented in any other manner desired, including vertical orientations and orientations inclined with respect to vertical and horizontal orientations.

The wheel 20 illustrated in FIGS. 1 and 2 has a plurality of vanes 22 for transferring motion and/or weight from fluid to the wheel 20. The vanes 22 can have any shape desired, including without limitation straight, curved, or faceted vanes 22 (e.g., blades or paddles), vanes 22 that are shaped to define scoops, buckets, or other containers, and the like. The vanes 22 can be shaped to retain a quantity of fluid without adjacent structure (e.g., adjacent vanes and/or the shaft 27), although this is not necessarily the case with other vane shapes.

As discussed above, the vanes 22 contact fluid passing through the passageway 14. In some embodiments, only the distal portion of each vane 22 (i.e., at the rim of the wheel 20) contacts the fluid in operation of the dispensing apparatus 10, whereas in other embodiments, the entire vane or substantially the entire vane 22 contacts the fluid.

Water or other diluent 16 flowing upon the vanes 22 (e.g., at least partially filling the illustrated bucket-shaped vanes 22 in FIGS. 1 and 2) provides power to dispense concentrated chemicals at an appropriate dilution ratio to the diluent 16 flowing into and/or onto the wheel 20. This power can be transferred to a number of different elements to provide this dispensing action. For example, in some embodiments, the wheel 20 directly or indirectly drives not only the shaft 27, but one or more shafts that generate dispense of concentrated chemicals at an appropriate dilution ratio with respect to the water or other diluent.

For example, the wheel 20 and shaft 27 illustrated in FIGS. 1 and 2 drive a second shaft 26 that is coupled to the housing 12 and drivable coupled to the first shaft 27 and wheel 20. More specifically, rotation of the wheel 20 and first shaft 27 generates rotation of the second shaft 26 by virtue of a drive connection between the first and second shafts 27, 26. In this embodiment, at least a portion of the second shaft 26 is positioned within a flow path 30 or reservoir 32 of a concentrated chemical 34, and is adapted to selectively dispense concentrated chemicals 34 into the diluent 16 or into a container via rotation of second shaft 26. In other embodiments, the first shaft 27 is positioned within the flow path 30 or reservoir 32 of a concentrated chemical 34, and has the same features as described below with respect to the second shaft 26 in order to dispense concentrated chemicals 34 into the diluent 16 or into a container via rotation of the first shaft 27.

The dispensing apparatus 10 of FIGS. 1 and 2 (and the other dispensing apparatuses 10 described and illustrated elsewhere herein) can be used to dispense concentrated chemicals of any type, including without limitation detergents and rinse aids for cleaning food preparation and serving equipment and utensils, detergents and fabric softeners for laundry use, cleaning, stripping, treating, and coating chemicals for floor care, and the like. By way of example only, and with reference to embodiments of the dispensing apparatus used in dishwashing, any of the dispensing apparatuses described and illustrated herein can dispense any of Suma® (JohnsonDiversey) products, such as Premium, Super, Crystal and Break-up, Sunlight® (JohnsonDiversey) products, Dawn® (Procter & Gamble) products, Palmolive® (Colgate-Palmolive Company) products, and Joy Dish Soap (Procter & Gamble) products.

In some embodiments, one or more surfaces of the various dispensing apparatuses described and illustrated in the present application can be provided with a brand name and/or logo of the concentrated chemical 34 within the reservoir 32. For example, in the case of dish soap within the reservoir 32, any of the soap brand names mentioned above can be displayed on a surface of the dispensing apparatus. The surface featuring the brand name and/or logo can include, for example, a surface of the reservoir 32 or a surface of the housing 12. In this manner, the type of concentrated chemical stored in the reservoir 32 can be displayed for identification of the concentrated chemical by a user of the apparatus.

With reference again to the illustrated embodiment of FIGS. 1 and 2, a first flow path 14 for diluent 16 (e.g., water) extends through the housing 12, and generally includes an inlet 36 and an outlet 38. A funnel 40 can be located along or adjacent the flow path 14 to collect, gather, or focus the flow of diluent 16 from a diluent source. As described above, the diluent source can be a plumbed diluent source such as a faucet on a sink, a spigot, a hose or hose bib, and the like. However, in some embodiments, the diluent source can be a bottle, tank, reservoir or other container of diluent 16, and can either be supplied directly from such a container or from a container through tubing, piping, channels, or other conduits. In plumbed or non-plumbed embodiments, flow of diluent can be controlled by one or more valves.

Accordingly, and as described in greater detail below, the diluent source can be directly coupled to the dispensing apparatus 10 in some embodiments, while it can be placed in free flow fluid communication (i.e., not directly coupled) in other embodiments. In the directly coupled embodiments, the housing 12 can be directly connected or plumbed to the faucet or other diluent source to receive the diluent 16. Such embodiments can utilize the force and pressure from moving water or other diluent 16 to aid in dispensing concentrated chemicals from the dispensing apparatus 10. In such embodiments, the speed of diluent 16 through the dispensing apparatus 10 can at least partially determine the amount and rate of concentrated chemicals dispensed into the fluid passageway 14 or into a downstream container. In some embodiments, the weight of water or other diluent 16 accumulated in the funnel 40 or downstream of the funnel 40 (i.e., within the dispensing apparatus 10) is also or instead employed to drive the wheel 20, in which cases the speed of diluent 16 flowing into the dispensing device 10 need not necessarily determine the amount and rate of concentrated chemicals dispensed therefrom. In any of the directly connected embodiments, a back flow prevention device (e.g., one or more valves, air gap devices, and the like) can be employed to comply with plumbing codes, as necessary.

In free flow embodiments, the funnel 40 described above can be utilized to capture diluent 16 flowing freely from the diluent source. In such embodiments, the force and pressure from moving water or other diluent 16 flowing through the dispensing apparatus 10 can be employed to dispense concentrated chemicals from the dispensing apparatus 10, in which cases the speed of diluent 16 flowing into the dispensing apparatus 10 can aid in dispensing the concentrated chemicals. Alternatively, some embodiments supplied with free-flowing diluent 16 rely primarily or solely upon the weight of diluent 16 accumulated in the funnel 40 or downstream of the funnel 40 (i.e., within the dispensing apparatus 10) to drive the wheel 20.

Further, although not illustrated in FIGS. 1 and 2, diluent 16 flowing through the housing 12 and out the outlet 38 can be received in a vessel, reservoir, or other container. For example, in some embodiments, the diluent 16 is received in a sink compartment. In other embodiments, the diluent 16 can be received in a bucket, spray bottle, cleaning machine reservoir, and the like. In still other embodiments, the diluent 16 is not collected in a container, but is instead directly dosed onto a floor, countertop, wall, vehicle body, window, animal carcass, or other surface.

With continued reference to the embodiment of FIGS. 1 and 2, the illustrated dispensing apparatus 10 has a second flow path 30 along which concentrated chemicals 34 can flow. The second flow path 30 in this illustrated embodiment has an inlet 42 that is coupled to a source of concentrated chemicals 34, such as a vessel, reservoir, or other container as shown (or to suitable tubing, piping, channels, or other conduits extending to such a container). The outlet 44 of the second flow path 30 in the illustrated embodiment intersects the first flow path 14 upstream of the outlet 38 of the first flow path 14. In other words, and as shown in FIG. 1, the second flow path 30 intersects and feeds into the first flow path 14 inside the housing 12, thereby enabling the concentrated chemical 34 to be at least partially diluted prior to exiting the dispensing apparatus (e.g., the housing 12). This can help prevent concentrated chemicals from contacting people or objects adjacent the dispensing apparatus 10, as the concentrated chemicals are at least partially mixed with diluent 16 prior to exiting the dispensing apparatus (e.g., the housing 12). In other embodiments, however, the second flow path 30 has its own dedicated outlet, in which cases concentrated chemicals 34 can be dispensed from the dispensing apparatus 10 without being diluted therein.

In the embodiment illustrated in FIG. 1, a reservoir 32 of concentrated chemicals 34 is positioned above and in fluid communication with the second flow path 30. By virtue of this arrangement, the concentrated chemicals 34 are gravity fed into the second flow path 30. However, as described in greater detail below, in some embodiments, a pump or other device can be used to deliver the concentrated chemicals to the second flow path 30, or otherwise into the diluent 16 or container.

As described above, a wheel 20 is coupled to the housing 12 in the illustrated embodiment of FIGS. 1 and 2, and is in fluid communication with the diluent flow path 14. As illustrated in FIGS. 1 and 2, in some embodiments, the wheel 20 is fully contained within the housing 12. However, in other embodiments, one or more portions of the wheel 20 can be exposed outside of the housing 12. A portion of the wheel 20 is located in the diluent flow path 14. More specifically, the wheel 20 can be positioned in the diluent flow path 14 to at least partially interrupt (and in some cases substantially interrupt) flow of diluent 16 through the flow path 14. In those embodiments in which the wheel 20 substantially interrupts diluent 16 through the flow path 14, substantially all diluent 16 flowing through the flow path 14 can be utilized to drive the wheel 20 and provide maximum power to the wheel 20. In other embodiments, a fraction of the diluent 16 along the flow path 14 is utilized to drive the wheel 20, in which cases the balance of the diluent 16 can flow around the wheel 20 or can bypass the wheel 20 in any other manner (e.g., by a separate conduit). In such embodiments, a fraction of the maximum power from the moving diluent can be imparted to the wheel 20. This result can be desirable in those embodiments in which slower wheel rotation is desired in order to reduce the amount of concentrated chemicals dispensed by the dispensing apparatus 10.

In some embodiments (e.g., in embodiments in which the entire diluent flow is used to drive the wheel 20), the amount of diluent 16 passing along the flow path 14 can be measured by the number of vanes 10 filled on the wheel 20 (in those embodiments in which vanes 10 can be partially or fully filled with diluent 16) or by the number of rotations of the wheel 20. Rotation of the wheel 20 can be proportionately coupled to the dispense of concentrated chemical 34. As described above, in some embodiments, the wheel 20 only interrupts a portion of the flow of diluent 16, such that less concentrated chemical 34 is dispensed per rotation of the wheel 20 than if the wheel 20 was positioned to substantially interrupt the flow of diluent 16.

As best shown in FIG. 2, the wheel 20 of the illustrated embodiment is coupled to a rotary metering device in the concentrated chemical flow path 30. Specifically, the wheel 20 is coupled to a shaft 27 (as described above), which is in turn coupled to a gear 54. In some embodiments, the shaft 27 is a separate element connected to the gear 54 in any suitable manner, whereas in other embodiments, the shaft 27 is integral with the gear 54. This gear 54 is drivably coupled to a second gear 56 which is, in turn, coupled to a shaft 26 (described above). The second shaft 26 is coupled to or at least partially defines the rotary metering device. More specifically, in the illustrated embodiment, the second shaft 26 is integrally formed with the rotary metering device 50, described in greater detail below. In some embodiments, the second gear 56, shaft 26, and/or the rotary metering device 50 can be integrally formed, whereas in other embodiments, any of these elements 56, 26, 50 can be separate elements connected together in any suitable manner. Although the wheel 20, first shaft 27, gears 54, 56, second shaft 26, and rotary metering device 50 of the illustrated embodiment are all contained within a common housing 12 (or portions of a common housing 12), at least a portion of any or all of these elements can be located outside of the housing 12 in other embodiments.

The rotary metering device 50 of the dispensing apparatus embodiment shown in FIGS. 1 and 2 includes two flattened sections 52 on the shaft 26. In other embodiments, the rotary metering device 50 has only a single flattened section 52, has three or more flattened sections 52, or has circumferentially-spaced sections having other shapes that cooperate with adjacent walls of the dispensing apparatus 10 to meter and dispense concentrated chemicals in a manner similar to that described in greater detail below with respect to the illustrated embodiment of FIGS. 1 and 2. Alternatively or in addition, the rotary metering device 50 can comprise one or more apertures in or through the shaft 26. With continued reference to the embodiment of FIGS. 1 and 2, the rotary metering device 50 is located in an aperture 58 located downstream of the concentrated chemical reservoir 32. More specifically, the illustrated rotary metering device 50 is located in a conduit 30 extending from the reservoir 32. In other embodiments, the rotary metering device 50 is located on or immediately adjacent the concentrated chemical reservoir 32 (such as by defining at least a portion of a bottom or side of the concentrated chemical reservoir 32), whereas in other embodiments, the rotary metering device 50 is located further downstream (such as being located at the intersection of the first and second flow paths 14, 30).

Generally, the rotary metering device 50 can have at least two positions. In the first position, the rotary metering device 50 prevents concentrated chemical from flowing through the conduit 30. In another position, the rotary metering device 50 allows a specific quantity of concentrated chemical to be dispensed or moved to a position where it can be dispensed. The flattened sections 52 of the illustrated embodiment of FIGS. 1 and 2 allow a predetermined amount of concentrated chemical 34 to be dosed per rotation of the shaft 26 or per rotation of the wheel 20. Specifically, when a flatted portion 52 is in a specific rotational position, chemical concentrate 34 can flow into an aperture 60 defined between the shaft 26 and an adjacent portion of the dispensing apparatus 10 (e.g., an adjacent portion of the housing 12 defining the flow path 30). Rotation of the shaft 26 eventually prevents further communication of this aperture 60 and the reservoir 32. Even further rotation of the shaft 26 places the aperture 60 (and captured chemicals) into fluid communication with the remainder of the flow path 30, allowing the concentrated chemical to be dispensed to the remainder of the flow path 30. Accordingly, through the use of a metering device 50 drivably coupled to the wheel 20, the concentrated chemical 34 can be dispensed volumetrically and in proportion to the amount of diluent 16 dispensed.

The amount of concentrated chemical 34 dispensed per unit of diluent 16 can be controlled in many ways in the embodiment illustrated in FIG. 1. For example, the amount of concentrated chemical 34 dispensed can be controlled by controlling the size and configuration of the rotary metering device 50, such as by altering the size and/or shape of either or both flattened portions 52 of the second shaft 26. As another example, the amount of concentrated chemical 34 dispensed can also or instead be controlled by altering the shape of the dispensing apparatus 10 adjacent the second shaft 26 (e.g., that portion of the housing 12 adjacent the second shaft 26), thereby at least partially defining that part of the second flow path 30 adjacent the rotary metering device 50. As yet another example, the amount of concentrated chemical 34 dispensed can also or instead be controlled by adjusting the gear ratio of the first gear 54 to the second gear 56, thereby altering the number of rotations of the shaft 26 relative to each rotation of the first shaft 26. By altering any or all of these features, the dilution ratio of diluent 16 to concentrated chemical can, in some embodiments, be a ratio of about 1:1 or less to a ratio of about at least 3000:1 or more. It will be appreciated that the viscosity of the concentrated chemical can be a controlling factor impacting the dilution ratio generated by the dispensing apparatus 10.

Operation of the dispensing apparatus illustrated in FIGS. 1 and 2 will now be described. A concentrated chemical 34 is provided in the reservoir 32, and a diluent source is provided to the dispensing apparatus 10. Again, a source of the diluent 16 can be directly connected to the dispensing apparatus 10, or diluent can freely flow to the dispensing apparatus 10 (in which case an air gap can exist between the diluent source and the dispensing apparatus 10). In free flow embodiments, diluent 16 can be captured in the funnel 40 that is in communication with the diluent flow path 14. Accumulated diluent 16 in the funnel 40 can then flow along the flow path 14, where it comes into contact with the wheel 20 to rotate the wheel 20 (whether by partially or fully filling adjacent vanes 22 or only pushing vanes 22 as the diluent 16 passes the wheel 20). In some embodiments, the force exerted by the diluent 16 upon the wheel 20 is only or substantially provided by the weight of the diluent 16, whereas in other embodiments (such as embodiments in which the diluent is under pressure or impacts the vanes 22), the force exerted by the diluent 16 upon the wheel 20 is at least partially due to the inertia of the diluent 16.

Rotation of the wheel 20 allows a measured amount of diluent 16 to flow through the flow path 14 per rotation of the wheel 20. Specifically, the volume of diluent passing the wheel 20 (e.g., moving through the vanes 22 and/or filling each of the vanes 22 in some embodiments) is known, and this volume is known per rotation of the wheel 20. Accordingly, the amount of diluent 16 passing along the flow path 14 per rotation of the wheel 20 is known.

Rotation of the wheel 20 also causes the rotary metering device 50 in the concentrated chemical flow path 30 to rotate and dispense concentrated chemical 34 at a predetermined dilution ratio with respect to diluent along the first flow path 16. Specifically, rotation of the wheel 20 causes the first shaft 27 to rotate, which causes the first gear 54 to rotate. The first gear 54 drives the second gear 56, which, in turn, rotates the shaft 26. Rotation of the shaft 26 causes the rotary metering device 50 to dispense chemicals 34 through the concentrated chemical flow path 30 as described above.

In the illustrated embodiment of FIGS. 1 and 2, concentrated chemicals 34 are delivered to the chemical flow path 30 and the rotary metering device 50 via gravity. Rotation of the rotary metering device 50 allows a predetermined amount of concentrated chemical 34 to be dispensed into the diluent 16 per volume of diluent. In the illustrated embodiment of FIGS. 1 and 2, the concentrated chemical 34 mixes with the diluent 16 inside the housing 12, although this need not necessarily be the case in other embodiments.

In the illustrated embodiment of FIGS. 1 and 2, the rotary metering device 50 is a rotating shaft 26 having portions shaped to receive concentrated chemicals for later dispense. In other embodiments, however, other types of metering devices can instead be used to dispense known quantities of concentrated chemicals per rotation of the shaft 26 driving the pump. By way of example only, the shaft 26 can drive a pump of any type, wherein each actuation of the pump 26 dispenses a known quantity of concentrated chemicals fed thereto. The pump can be a piston pump, peristaltic pump, wobble plate pump, diaphragm pump, gear pump, worm gear pump, or a pump of any other type, including those described herein with regard to other embodiments of the present invention. As another example, the shaft 26 can drive another wheel of any type in order to dispense a metered quantity of concentrated chemical, as will be described in greater detail below in connection with FIG. 3.

Figure 3:
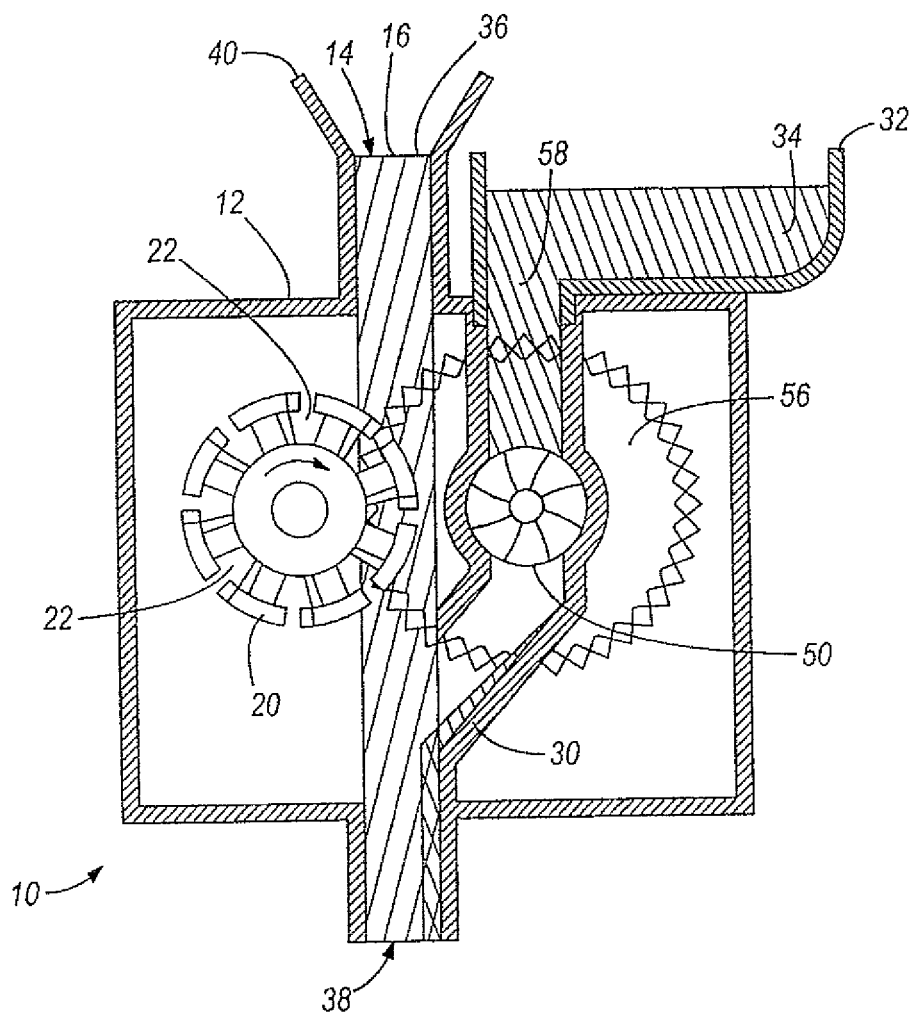
FIG. 3 is a side cross-sectional view of a dispensing apparatus according to a second embodiment of the present invention.
Figure 4:
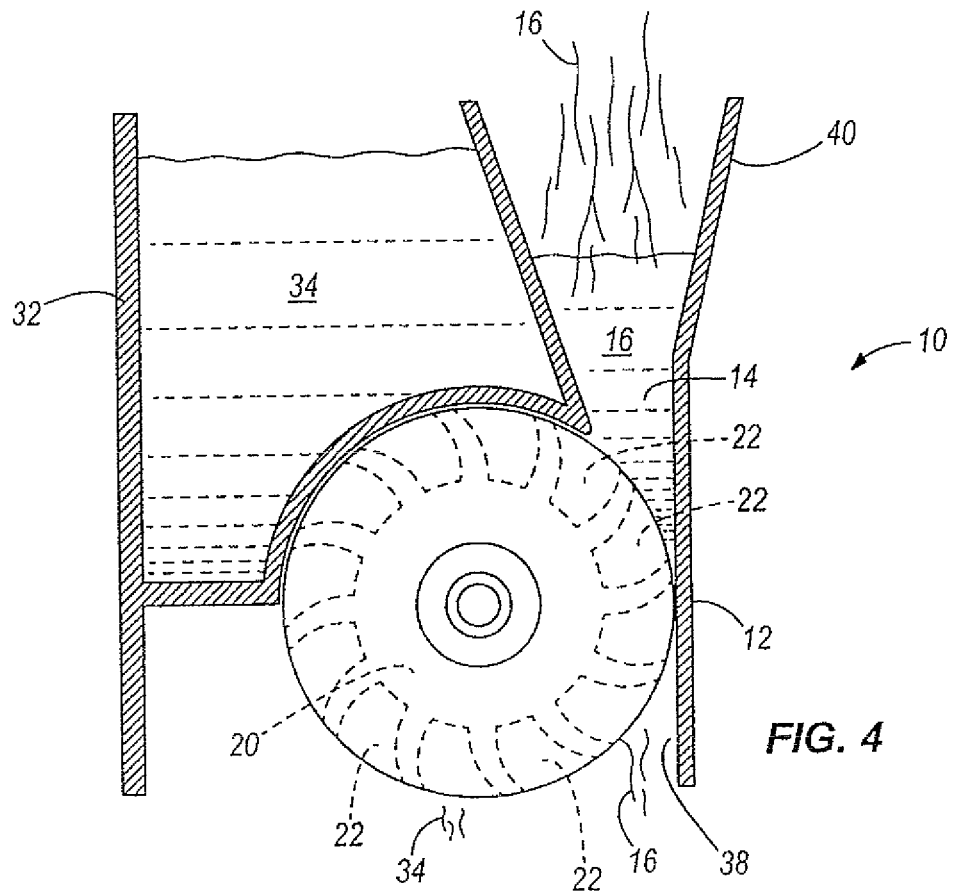
FIG. 4 is a side cross-sectional view of a dispensing apparatus according to a third embodiment of the present invention.
Figure 5:
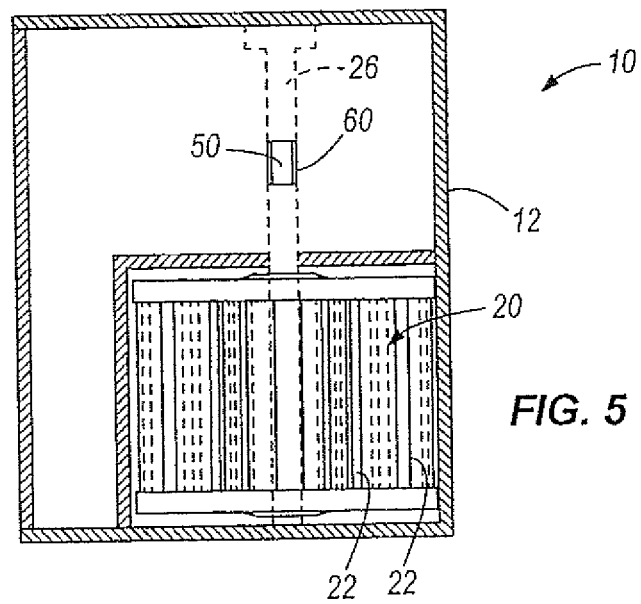
FIG. 5 is a top cross-sectional view of dispensing apparatus shown in FIG. 4.

FIGS. 3-5 illustrate alternative embodiments of a fluid dispensing apparatus according to the present invention. Accordingly, with the exception of mutually inconsistent features and elements between the embodiments of FIGS. 3-5 and the embodiment of FIGS. 1-2, reference is hereby made to the description above accompanying the embodiments of FIGS. 1-2 for a more complete description of the features and elements (and the alternatives to the features and elements) of the embodiments of FIGS. 3-5.

As illustrated in FIG. 3, the only significant difference in construction of this embodiment relative to that of FIGS. 1 and 2 is with regard to the rotary metering device 50. Specifically, the rotary metering device 50 illustrated in FIG. 3 is a wheel. Rotation of the wheel causes concentrated chemical to be dispensed into and through the wheel, which can take any of the forms described above with reference to the wheel 20 in the embodiment of FIGS. 1 and 2. For example, the rotary metering device 50 illustrated in FIG. 3 can include a water wheel, paddle wheel, or turbine type device, in contrast to the flattened shaft 27 illustrated in FIGS. 1 and 2. The rotary metering device 50 illustrated in FIG. 3 can be driven by the wheel 20 via any suitable connection, including the shaft and gear arrangements described above in connection with FIGS. 1 and 2. As described in connection with the previous embodiments, the size, shape, and configuration of this rotary metering device 50 can be selected to dispense any desired amount of concentrated chemical per rotation of the device 50.

FIGS. 4 and 5 illustrate another embodiment of a dispensing apparatus 10 embodying aspects of the present invention. This illustrated embodiment is configured and operates in a similar manner to the embodiments shown in FIGS. 1-3. Accordingly, reference is hereby made to the description of the embodiments above in connection with FIGS. 1-3 for more information regarding the construction and operation (and alternatives thereto) of the embodiments described and illustrated in connection with FIGS. 4 and 5.

The embodiment of FIGS. 4 and 5 has a housing 12 through which a diluent flow path 14 extends. In some embodiments, the housing 12 at least partially defines the diluent flow path 14. A wheel 20 is in fluid communication with the diluent flow path 14, and in the illustrated embodiment is located in the diluent flow path 14. The housing 12 of the illustrated embodiment also includes a chemical reservoir 32. The chemical reservoir 32 of the illustrated embodiment is positioned adjacent the wheel 20. As best shown in FIG. 5, the chemical reservoir 32 includes an aperture 60 defined in a base of the chemical reservoir 32. The aperture 60 can be located at a lowest point in the chemical reservoir 32 so that the entire chemical reservoir 32 can be emptied by gravitational forces. However, other positions of the aperture 60 are possible. With continued reference to the illustrated embodiment of FIGS. 4 and 5, a shaft 26 coupled to the wheel 20 is positioned adjacent the aperture 60 to selectively dispense chemicals 34 from the chemical reservoir 32. More specifically, a rotary metering device 50 secured to or defined by the shaft 26 can be positioned in or adjacent the aperture 60 to selectively open and close the aperture 60 or otherwise rotate to dispense chemical through the aperture 60. As noted above, the shaft 26 can be position within a passageway that is in fluid communication with the chemical reservoir 32 via the aperture 60.

In the embodiment of FIGS. 4 and 5, the shaft 26 is directly driven by the wheel 20. Accordingly, dilution control is achieved at least in part by controlling the size of the aperture 60 and/or size and configuration of the rotary metering device 50. In other words, a set of gears or another type of mechanical power transmission device or assembly is not included in this illustrated embodiment. However, in other embodiments, additional shafts and mechanical power transmission devices and assemblies can be utilized to control the frequency and amount of chemical dispense from the chemical reservoir 32 (e.g., through the aperture 60).

Although the chemical reservoir 32 of the embodiment shown in FIGS. 4 and 5 is integral with the housing 12, in other embodiments, the chemical reservoir 32 can be coupled to the housing in other manners. For example, the chemical reservoir 32 can be coupled to the housing 12 via one or more pipes, tubes, channels or other conduits. Additionally, in some embodiments, the housing 12 can receive a free-flowing stream of fluid as shown in FIG. 4, or can instead directly receive a bottle or other container chemicals 34 (e.g., concentrated chemicals).

The operation of the dispensing apparatus 10 shown in FIGS. 4 and 5 will now be described. A concentrated chemical 34 is provided in the reservoir 32, and a diluent source is provided to the dispensing apparatus 10. Again, the diluent 16 can be received from a container connected to the dispensing apparatus 10, or can freely flow thereto (i.e., through an air gap between a source of the diluent and the dispensing apparatus 10). In free flow configurations, diluent 16 can be captured in a funnel 40 in fluid communication with the flow path 14. Diluent 16 in the funnel 40 can then flow into the flow path 14 where it will come into contact with the wheel 20. The diluent 16 can flow directly to the wheel 20 without delay, or can first collect within the funnel 40 and/or other locations upstream of the wheel 20. Diluent flows to the wheel 20, and can partially or fully fill one or more containers defined at least in part by the vanes 22, or can simply move the vanes 22 without such filling (e.g., in cases where the vanes 22 do not define containers). The weight of the diluent 16 (and in some cases, the impact of the diluent 16) against the wheel 20 will cause rotation of the wheel 20.

As described in connection with previous embodiments, rotation of the wheel 20 in the illustrated embodiment allows a measured amount of diluent 16 to flow through the diluent flow path 14 per full or partial rotation of the wheel 20, or corresponds to such an amount of diluent 16. Rotation of the wheel 20 also causes the rotary metering device 50 in fluid communication with the concentrated chemical 34 to rotate and dispense chemical 34. Accordingly, the concentrated chemical 34 is dispensed at a predetermined ratio with respect to the flowing diluent 16. Specifically, rotation of the wheel 20 causes the shaft 26 to rotate, which then causes the rotary metering device 50 to rotate and dispense chemical from the chemical reservoir 32.

Each of the embodiments described above in connection with FIGS. 1-5 relies at least in part upon gravitational force to dispense chemicals, such as a gravity-fed rotary metering device. In other words, concentrated chemicals 34 are delivered from a reservoir 32 of concentrated chemicals 34 to diluent 16 at least partially under the influence of gravity. Further, gravity is at least partially responsible for delivery of the concentrated chemicals 34 to the rotary metering device 50. Then, rotation of the rotary metering device 50 allows a predetermined amount of chemical 34 to be dispensed.

In other embodiments, dispense of concentrated chemicals 34 is performed without requiring gravitational force—whether to move the concentrated chemicals to a metering device (of any type) or to dispense the concentrated chemicals for dilution. By way of example only, the embodiments illustrated in FIGS. 6-9 operate by pumping concentrated chemical 34. In other words, a pump 62 is utilized to dispense concentrated chemical 34 from a reservoir 32 of concentrated chemical 34. In some embodiments, the pump 62 can overcome gravitational forces, while in other embodiments, the pump 62 can work in conjunction with gravitational forces. For example, in some embodiments, the chemical reservoir 32 or portion(s) thereof can be positioned below the pump 62 and/or the dispensing outlet through which the concentrated chemicals are metered or otherwise dispensed. In such embodiments, the pump 62 can be used to overcome gravitational forces otherwise preventing or limiting movement of the concentrated chemicals to the dispensing outlet. In some embodiments, by way of example only, the pump 62 draws chemical from a dip tube positioned in a reservoir 32. In some embodiments, the pump 62 can be positioned such that concentrated chemicals are delivered to the pump 62 via gravitational feed, and the pump 62 delivers the concentrated chemicals against the force of gravity to a dispensing outlet.

Figure 6:
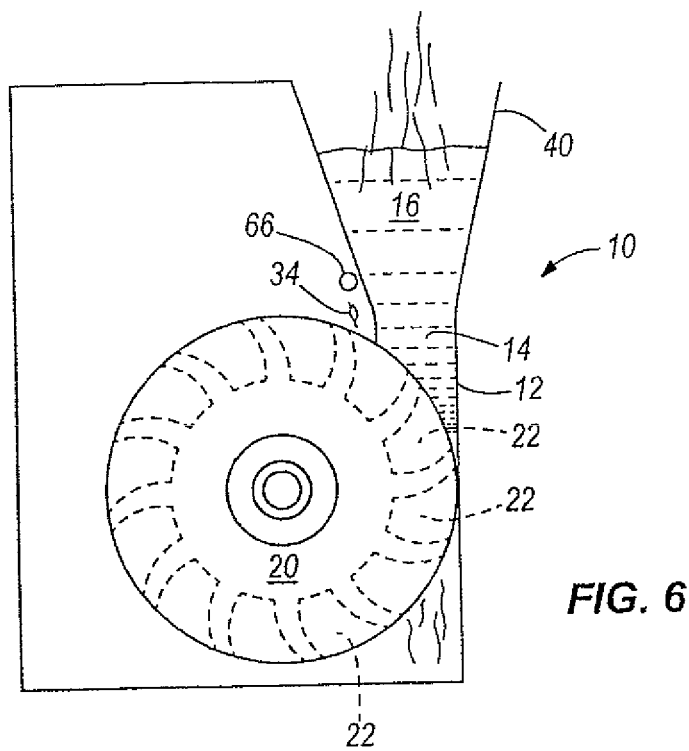
FIG. 6 is a side cross-section view of a dispensing apparatus according to a fourth embodiment of the present invention.
Figure 7:
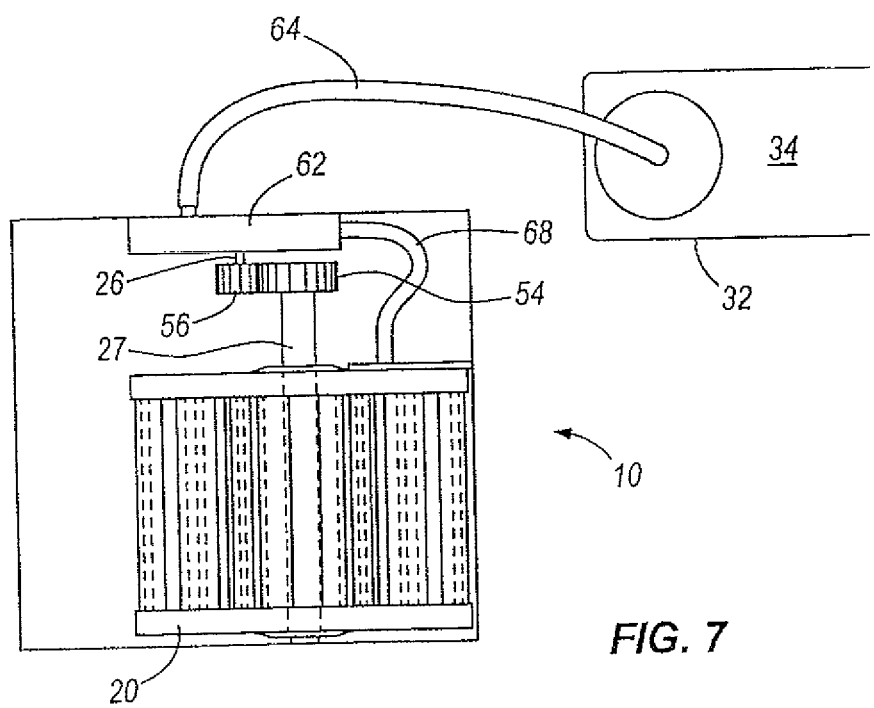
FIG. 7 is a first top cross-sectional view of the dispensing apparatus shown in FIG. 6.
Figure 8:
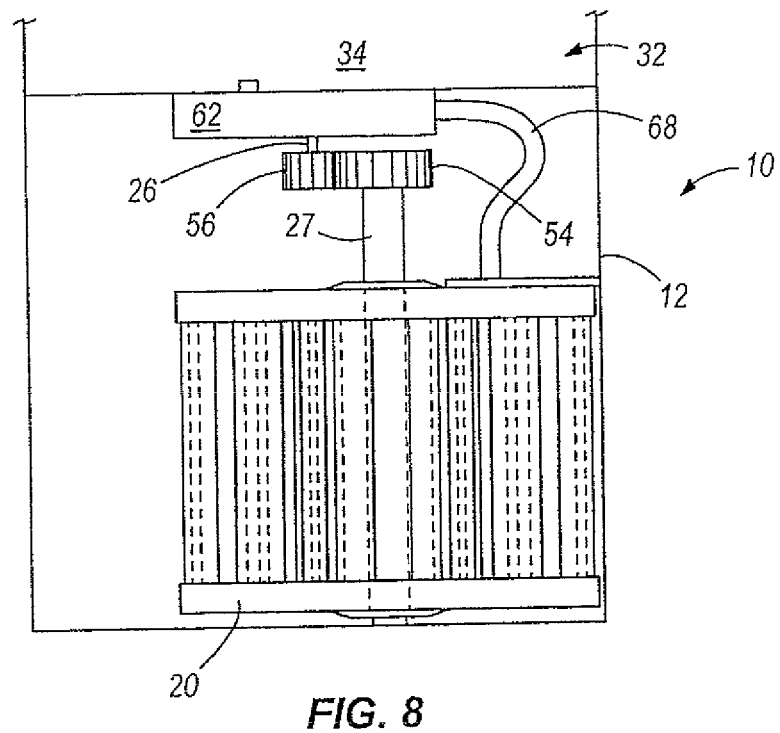
FIG. 8 is an alternative top cross-sectional view of the dispensing apparatus shown in FIG. 6.

FIGS. 6-8 illustrate embodiments of a dispensing apparatus 10 having a number of features in common with the dispensing apparatus embodiments described and illustrated above. Accordingly, many of these common features will not be discussed in detail. Rather, reference is hereby made to the embodiments described above in connection with FIGS. 1-5 for more information regarding the construction and operation (and alternatives thereto) of the embodiments described and illustrated in connection with FIGS. 6-8.

The dispensing apparatus 10 illustrated in FIGS. 6 and 7 has a fluid passageway 14 extending to a wheel 20 that can take any of the forms described and illustrated above in connection with earlier embodiments. The dispensing apparatus 10 can include a housing 12 that, in some embodiments, can at least partially define the fluid passageway 14. The illustrated dispensing apparatus 10 can also include a pump 62, which in some embodiments can be coupled to the housing 12. The fluid passageway 14 is adapted to receive a diluent 16 (e.g., water) from a diluent source. The flow path 14 (whether through the housing 12 or otherwise) typically includes an inlet 36 and an outlet 38. Also, a funnel 40 can be located along or adjacent the flow path 14 to collect, gather, and focus diluent entering the dispensing apparatus from a diluent source (not shown).

As indicated above, the dispensing apparatus 10 includes a wheel 20. The wheel 20 can be coupled to the housing 12 in some embodiments, or can instead be mounted for rotation in any other manner desired. At least a portion of the wheel 20 is in fluid communication with and located in the diluent flow path 14. The wheel 20 can be positioned in the flow path 14 to at least partially interrupt all flow of diluent 16 through the flow path 14. In other embodiments, the wheel 20 can substantially entirely interrupt all flow of diluent 16 through the first flow path 14. Also, in still other embodiments, the wheel 20 can at least partially interrupt less than all flow of diluent 16 through the first flow path 14. Diluent 16 contacting the wheel 20 imparts power to the wheel 20, which is used to drive or actuate the pump 62 to dispense concentrated chemical 34.

The pump 62 is in fluid communication with a reservoir 32 containing a concentrated chemical 34. Actuation of the pump 62 delivers concentrated chemicals 34 to diluent 16 flowing through the fluid passageway or flow path 14, and in other embodiments can deliver such chemicals to a location outside of the dispensing apparatus 10 as described above in connection with earlier embodiments. As best shown in FIG. 7, the wheel 20 in the illustrated embodiment is coupled to a shaft 27, which is coupled to a gear 54. This gear 54 is coupled to a second gear 56, which is coupled to a second shaft 26. The second shaft 26 is drivably coupled to the pump 62. In some embodiments, the pump 62 can be directly coupled to the wheel 20, in which cases the shaft 27 can extend from the wheel 20 to the pump 62. In such embodiments, the gears and second shaft would be eliminated. In still other embodiments, additional gears, shafts, and other mechanical power transmission devices and assemblies can be connected between the wheel 20 and the pump 62 to drive the pump 62 at an appropriate speed for achieving a desired dilution ratio.

Although substantially any pump can be utilized to obtain desired dilution ratios for the concentrated chemical 34, in some embodiments a positive displacement pump is used for good performance results. For example, in some embodiments, a gear pump, piston pump, diaphragm pump, wobble plate pump, peristaltic pump, rotary vane pump, or other pump can be used. Furthermore, in some embodiments, centrifugal pumps can be utilized.

The dispensing apparatus 10 can be adapted to dispense fluid at one or more desired dilution ratios and/or in one or more ranges of desired dilution ratios. This adaptation can be achieved in various ways, depending in some cases upon the type of pump used in conjunction with the wheel 20 to dispense the concentrated chemical 34 with diluent 16. For example, if gears are utilized to transmit power from the wheel 20 to the pump 62, a gear ratio can be selected to provide a desired dilution ratio. Furthermore, the configuration, capacity, and size of the pump 62 can be selected to provide a desired dilution ratio or otherwise to provide dilution control of the dispensing apparatus 10. It will be appreciated that the viscosity of the concentrated chemical 34 can also be a controlling factor in the dilution ratio of the dispensing apparatus.

As illustrated in FIG. 7, the pump 62 can draw concentrated chemicals 34 from a concentrated chemical reservoir 32 located remotely from the housing 12, in which case the reservoir 32 need not necessarily be connected to housing 12 via anything other than suitable conduit for establishing fluid communication between the reservoir 32 and the pump 62. For example, the pump 62 and housing 12 in the illustrated embodiment is connected to the reservoir 32 via a conduit 64 (e.g., tubing) extending between the pump 62, into the housing 12, and to the reservoir 32. Concentrated chemical 34 can be drawn from the reservoir 32 during operation of the pump 62 via the conduit 64. Alternatively, and as shown in FIG. 8 by way of example, the reservoir 32 can be coupled to or integrally formed with the housing 12. In such embodiments, the inlet to the pump 62 can be placed in fluid communication with the reservoir 32 (e.g., via a port or other suitable fluid connection). The inlet to the pump 62 can be placed at the lowest position within the reservoir 32 to allow substantially all of the concentrated chemical to be gravity fed to the pump 62, in some embodiments.

Although in some embodiments (e.g., the embodiment of FIG. 8), the dispensing apparatus 10 has a reservoir 32 that is defined by or connected to a housing 12 as described above, other embodiments do not have a housing 12, but still provide similar advantages by virtue of a pump 62 and reservoir 32 in the same unit (e.g., on the same frame or otherwise in the same structure of the dispensing apparatus 10). In this regard, in some embodiments it is highly desirable to provide a dispensing apparatus 10 that is portable, disposable, and/or that can be installed without plumbing. To this end, some embodiments of the dispensing apparatus 10 have a pump 62 and reservoir 32, and are also portable, disposable, and/or can be installed without plumbing—regardless of whether such dispensing apparatuses 10 have a housing 12.

Concentrated chemicals 34 can be pumped to a variety of locations within the housing 12, or within the structure of the dispensing apparatus 10 in those embodiments not having a housing 12. With reference again to the embodiment of FIGS. 6 and 7, in some embodiments, the concentrated chemical 34 is pumped to a location (e.g., aperture 66 in the illustrated embodiment) above or adjacent the wheel 20. As such, the concentrated chemical 34 can be dispensed onto the wheel 20, where it can mix with the diluent 16. In some embodiments, this mixing action can occur before the concentrated chemical 34 and diluent 16 exit the dispensing apparatus 10 (e.g., housing 12). Additionally, with such as configuration, the flow of diluent 16 into the wheel 20 can cause agitation of the mixing fluids. Such agitation can cause the concentrated chemical 34 to foam in the diluent 16, which may be desirable in some circumstances. In the illustrated embodiments of FIGS. 6-8, the concentrated chemical 34 is delivered from the pump 62 to the wheel 20 via a conduit 68. However, in other embodiments, the pump 62 can be positioned with respect to the wheel 20 and/or the diluent flow path 14 so that such a conduit between the pump 62 and the location of concentrated chemical dispense is not necessary. Furthermore, in some embodiments, it may not be desirable to dispense a concentrated chemical onto the wheel 20. In these and other embodiments, the pump outlet (or any conduit extending therefrom) can be directed elsewhere.

As discussed above, the dispensing apparatus 10 can be configured to provide a desired degree of chemical foaming prior to or at dispense. For example, the dispensing apparatus 10 can be configured as described in the previous paragraph to enhance foaming. However, in other embodiments, the dispensing apparatus 10 can be configured to minimize chemical agitation and resulting foaming, such as by introducing the concentrated chemicals into the diluent flow path 14 at a location where turbulence is relatively low (e.g., downstream of the wheel 20). In embodiments where foaming is desired, the wheel 20, structure adjacent the wheel 20 (e.g., one or more housing walls), and/or any part of the diluent flow path 14 downstream of the wheel 20 can be provided with fins, bumps, baffles, corrugations, and other protrusions, and/or recesses, holes, dimples, grooves, and other apertures to cause or enhance agitation or otherwise produce or enhance foaming action.

Operation of the embodiment illustrated in FIGS. 6 and 7 will now be described. A concentrated chemical 34 is provided in the reservoir 32, and a diluent is supplied to the dispensing apparatus 10 from a diluent source (not shown). Again, the diluent 16 can be supplied to the dispensing apparatus by direct connection to a diluent source, or can flow freely to the dispensing apparatus 10 (i.e., wherein an air gap exists between the diluent source and the dispensing apparatus 10). In free flow embodiments, diluent 16 can be captured in a funnel 40 in fluid communication with the diluent flow path 14. The diluent 16 can flow from the funnel 40 directly to the wheel 20 without significant accumulation, or in other embodiments can accumulate in the funnel 40 prior to proceeding to the wheel 20 along the diluent flow path 14. In either case, the diluent 16 contacts and drives the wheel 20. As described in greater detail above, diluent 16 can partially or entirely fill one or more containers of the wheel 20 (e.g., defined by vanes 22 of the wheel 20), although in other embodiments no such filling action takes place depending at least in part upon the shape of the vanes 22. The weight of the diluent 16, and in some cases the impact of diluent 16 upon the vanes 22, generates rotation of the wheel 20.

Rotation of the wheel 20 allows a measured amount of diluent 16 to flow through the flow path 14 per partial or full rotation of the wheel 20. Specifically, in some embodiments, the volume of each container at least partially defined by the vanes 22 is known, and the number of containers at least partially defined by the vanes 22 filled and dumped per rotation is known. Accordingly, the amount of diluent 16 passing through the diluent flow path 14 per rotation is known. In these and other embodiments, the number of rotations of the wheel 20 is known, and can be proportional to the amount of diluent flow passing the wheel 20 (regardless of whether the vanes 22 are shaped to define containers). Accordingly, the amount of diluent 16 passing through the diluent flow path 14 per rotation is again known.

As described above in connection with FIGS. 6-8, rotation of the wheel 20 in some embodiments causes actuation of the pump 62 to deliver concentrated chemical to the diluent 16. Specifically, in the illustrated embodiments of FIGS. 6-8, rotation of the wheel 20 causes the first shaft 27 to rotate, which causes the first gear 54 to rotate. The first gear 54 drives the second gear 56, which in turn rotates the second shaft 26. Rotation of the second shaft 26 causes the pump 62 to dispense concentrated chemical from the reservoir 32. The concentrated chemical 34 in the illustrated embodiment of FIGS. 6-8 is delivered to the top of the wheel 20, and is mixed with diluent 16 in the wheel 20. This mixing action in the wheel 20 can cause foam to form in the mixture via fluid agitation in the wheel 20.

Figure 9:
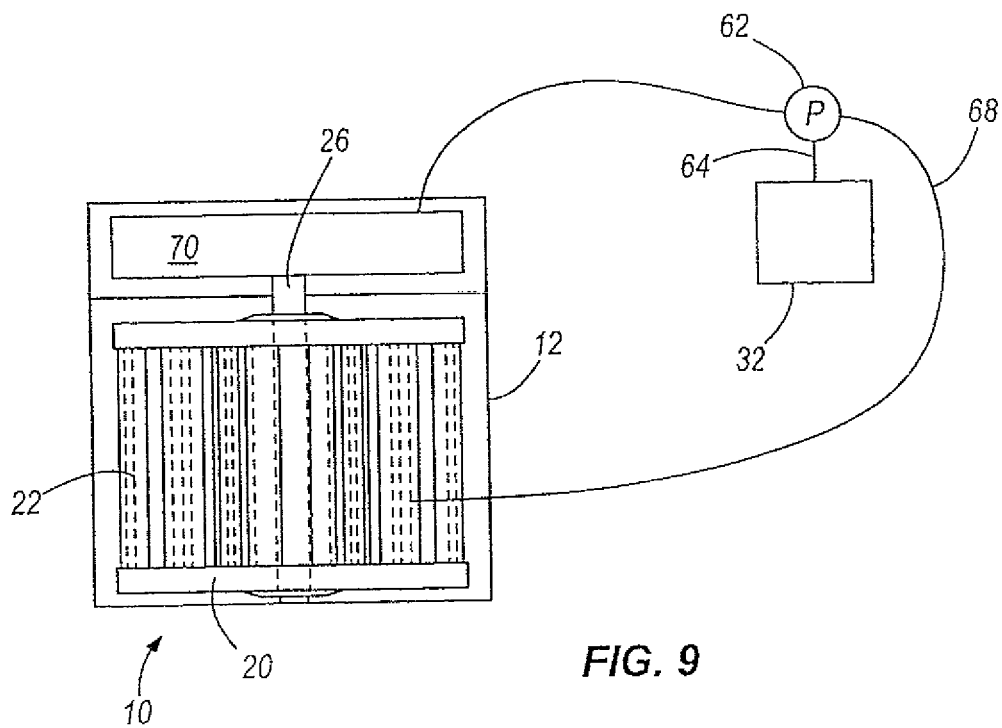
FIG. 9 is a top schematic view of a dispensing apparatus according to another embodiment of the present invention.

FIG. 9 illustrates an alternative embodiment of a fluid dispensing apparatus according to the present invention. As can be seen in the figures and understood in the description provided below, the dispensing apparatus 10 shown in FIG. 9 has many features in common with previously described embodiments. Accordingly, many of the common features will not be discussed in detail. With the exception of mutually inconsistent features and elements between the embodiment of FIG. 9 and the embodiments of FIGS. 1-8, reference is hereby made to the description above accompanying the embodiments of FIGS. 1-8 for a more complete description of the features and elements (and the alternatives to the features and elements) of the embodiment of FIG. 9.

Like the previous embodiments of the dispensing apparatus 10 having pumps 62, the dispensing apparatus 10 shown in FIG. 9 utilizes a pump 62 to deliver concentrated chemical 34 to the diluent 16. However, unlike previous embodiments in which purely mechanical power is used to operate the pump 62, the dispensing apparatus 10 of FIG. 9 utilizes an electrical generator 70 to power the pump 62. As described below, the electrical generator 70 can be driven by a wheel 20 taking any of the forms described above in connection with previous embodiments.

The dispensing apparatus 10 illustrated in FIG. 9 has a fluid passageway 14 through which diluent 16 flows, and a wheel 20 functioning as a turbine to generate power to be provided to the electrical generator 70. The dispensing apparatus 10 in the illustrated embodiment also includes a housing 12 to which the wheel 20 is coupled, although other embodiments need not necessarily have a housing 12. Like the previous illustrated embodiments, the housing 12 of the dispensing apparatus 10 shown in FIG. 9 at least partially defines the fluid passageway 14 adapted to receive the diluent 16 from a diluent source. In other embodiments, the fluid passageway 14 is defined by one or more other portions of the dispensing apparatus 10, such as by one or more conduits. Again with reference to the illustrated embodiment of FIG. 9, the flow path 14 through the housing 12 generally includes an inlet and an outlet. In those embodiments in which freely-flowing diluent 16 is received from a diluent source, a funnel (not shown) can be located along or adjacent the flow path 14 to collect, gather, and focus the flow of diluent 16. In other embodiments, the diluent source can be connected to the dispensing apparatus 10, such as to take advantage of pressurized fluid from the diluent source.

As indicated above, the dispensing apparatus 10 includes a wheel 20. The wheel 20 can be coupled to the housing 12 in some embodiments, or can instead be mounted for rotation in any other manner desired. At least a portion of the wheel 20 is in fluid communication with and located in the diluent flow path 14. The wheel 20 can be positioned in the flow path 14 to at least partially interrupt all flow of diluent 16 through the flow path 14. In other embodiments, the wheel 20 can substantially entirely interrupt all flow of diluent 16 through the first flow path 14. Also, in still other embodiments, the wheel 20 can at least partially interrupt less than all flow of diluent 16 through the first flow path 14. Diluent 16 contacting the wheel 20 imparts power to the wheel 20, which is used to drive or actuate the pump 62 to dispense concentrated chemical 34. In those embodiments in which the wheel 20 interrupts all or substantially all flow of diluent 16 through the first flow path 14, it is possible to harness all or substantially all of the mechanical advantage of the diluent 16 flowing within the dispensing apparatus 10.

In some embodiments, the amount of diluent 16 passing through the flow path 14 can be measured by the number of containers defined by the vanes 22 that are fully or partially filled 22 with diluent 16, and/or the number of rotations of the wheel 20. As discussed in greater detail herein, by knowing the amount of diluent 16 passing the wheel 20, the amount of concentrated chemical 34 is known, and can be proportionately dispensed based upon rotation of the wheel 20.

With continued reference to FIG. 9, the electrical generator 70 is coupled to and driven by the wheel 20. Rotation of the wheel 20 causes rotation of part of the generator 70 (e.g., a rotor relative to a stator), thereby causing electricity to be generated. This generated electricity is then used to power the pump 62, which delivers concentrated chemical to the diluent 16.

The pump 62 is in electrical communication with the generator 70 and in fluid communication with a reservoir 32 containing the concentrated chemical 34. The pump 62 can be positioned adjacent the reservoir 32 or placed remotely relative to the reservoir 32. In some embodiments, the pump 62 is contained within the housing 12 and is coupled to a reservoir 32 located remotely relative to the housing 12 (but coupled thereto via a fluid conduit 64). In other embodiments, the pump 62 is coupled to a reservoir 32 located remotely relative to the housing 12 (but delivering concentrated chemical to the housing 12 via a fluid conduit 68). In still other embodiments, the pump 62 and reservoir 32 can be integrally formed with or directly coupled to the housing 12. As described above, in some embodiments it is highly desirable to provide a dispensing apparatus 10 that is portable, disposable, and/or that can be installed without plumbing. To this end, some embodiments of the dispensing apparatus 10 have a pump 62 and reservoir 32, and are also portable, disposable, and/or can be installed without plumbing—regardless of whether such dispensing apparatuses 10 have a housing 12. The components of such dispensing apparatuses 10 can be coupled together as a single portable integral unit, such as by being mounted to a common plate or frame.

The pump 62 can be triggered and actuated in a number of different manners. In some embodiments, the pump 62 is actuated when an electric current is received from the generator 70. In other embodiments, the pump 62 is actuated when a trigger signal is received from the wheel 20, housing 12, or generator 70. Additionally, the pump 62 can be triggered to pump for limited period of time based upon the number of rotations of the wheel 20, or can be modulated on and off a select number of times per rotation of the wheel 20.

As described above, the pump 62 can be configured and sized to pump and dispense a desired amount of concentrated chemical per volume of diluent 16, thereby generating a predetermined dilution ratio for the mixed concentrated chemical 34 and diluent 16.

Operation of the dispensing apparatus illustrated in FIG. 9 will now be described. A concentrated chemical 34 is provided in the reservoir 32, and diluent 16 is supplied to the dispensing apparatus 10 from a diluent source (not shown). Again, the diluent source can be directly connected to the dispensing apparatus 10, or diluent can freely flow thereto (i.e., wherein an air gap exists between the diluent source and the dispensing apparatus 10). In those embodiments in which the diluent source is connected to the dispensing apparatus 10, the housing 12 or other portion of the dispensing apparatus 10 can be directly coupled to the diluent source, such as to a faucet or other diluent source structure described above. For example, a threaded connection or quick connect fitting can be used to connect the housing 12 to the diluent 16 source (such connections being applicable to any of the dispensing apparatus embodiments described herein). When diluent is supplied from the diluent source, diluent 16 can flow into the diluent flow path 14, where the diluent 16 will contact the wheel 20. In those embodiments in which the vanes 22 define fluid containers as described in earlier embodiments, the diluent 16 can partially or entirely fill one or more vanes 22 in the wheel 20. In these and other embodiments, the weight of the diluent 16 upon the wheel 20 causes rotation of the wheel 20. Additionally, in some embodiments (e.g., wherein the diluent source is pressurized, or when the diluent approaching the wheel 20 obtains a significant velocity), the impact of diluent 16 upon the vanes 22 can be used to drive the wheel 20.

Rotation of the wheel 20 drives the electrical generator 70, which causes electricity to be generated. This electricity is then used to power the pump 62, which delivers concentrated chemical 34 from the reservoir 32 to the diluent 16. As described above, the pump 62 can be sized, configured, and operated to deliver a desired amount of concentrated chemical 34 to the diluent 16 per unit of diluent 16 passing through the wheel 20. The concentrated chemical 34 can be delivered to the top of the wheel 20 and mixed with diluent 16 in the wheel 20, or can be delivered in any of the other locations described above in connection with other wheel-type dispensing apparatus embodiments. Mixing of concentrated chemical 34 and diluent 16 in the wheel 20 can cause foam to form in the mixture via agitation in the wheel 20.

In some embodiments, the dispensing apparatus 10 further comprises a battery (not shown) electrically coupled to the electrical generator 70. In such embodiments, the battery can be charged by the electrical generator 70 as the wheel 20 is turned by diluent flow. Power can be supplied from the battery to the pump 62 in order to drive the pump 62 as described above.

Figure 10:
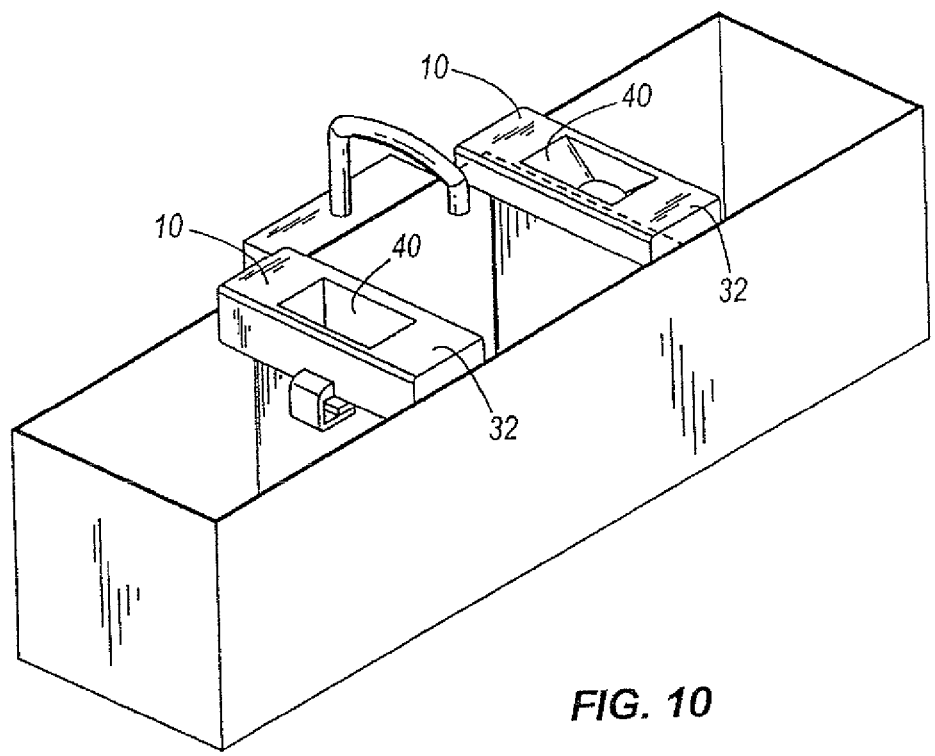
FIG. 10 is a perspective view of dispensing apparatuses according to another embodiment of the present invention, shown coupled to dividers of a sink.
Figure 11:
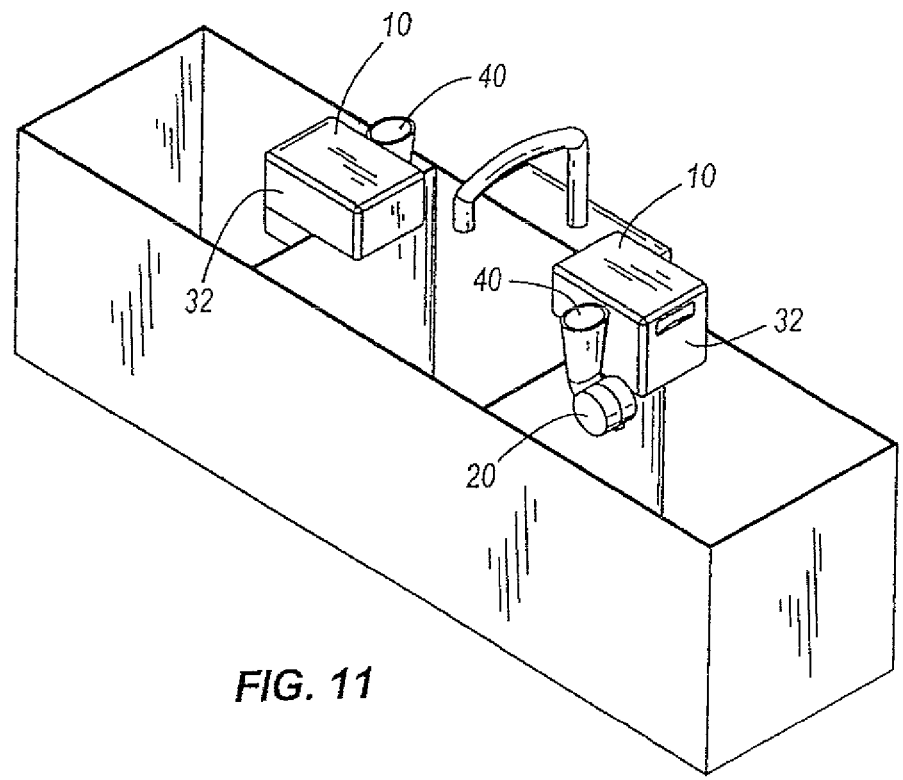
FIG. 11 is a perspective view of dispensing apparatuses according to another embodiment of the present invention, shown coupled to dividers of a sink.
Figure 14:
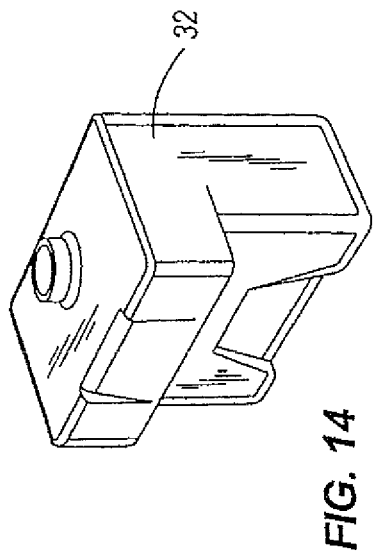
FIG. 14 is a perspective view of the container of the dispensing apparatus shown in FIGS. 12 and 13.
Figure 13:
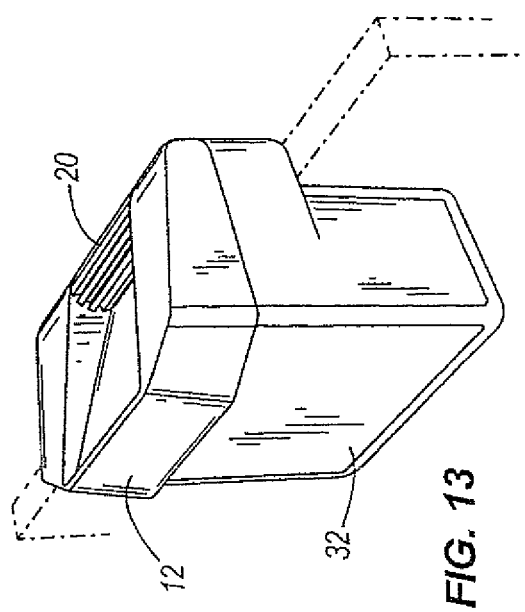
FIG. 13 is another perspective view of the dispensing apparatus shown in FIG. 12.
Figure 12:
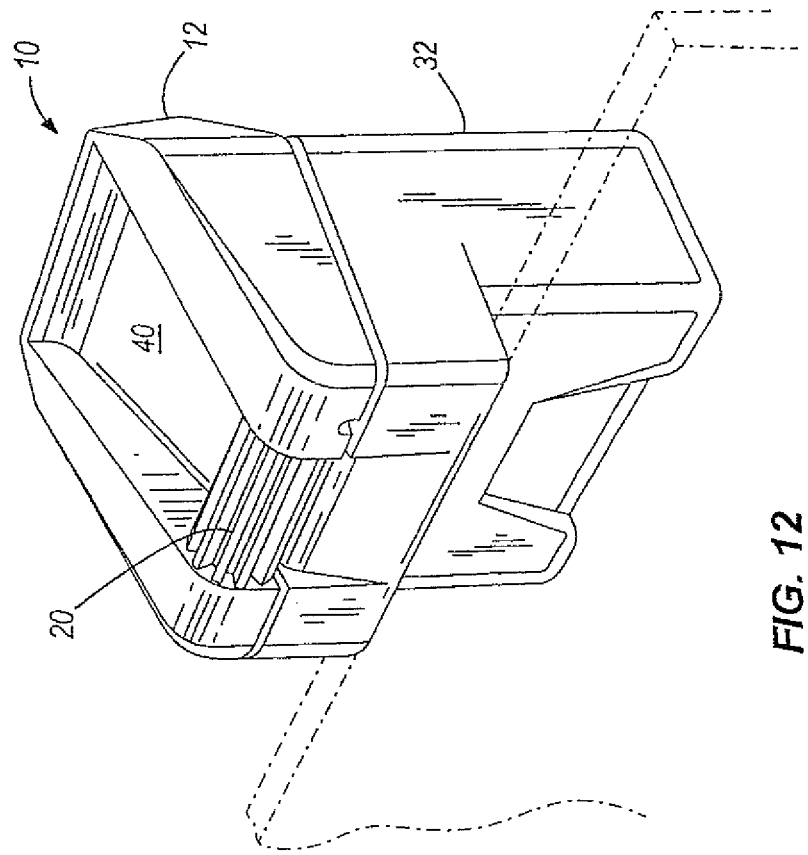
FIG. 12 is a perspective view of a dispensing apparatus according to another embodiment of the present invention, shown coupled to a portion of a container (e.g., a sink divider, bucket wall, and the like) for dispense of fluid therein.
Figure 16:
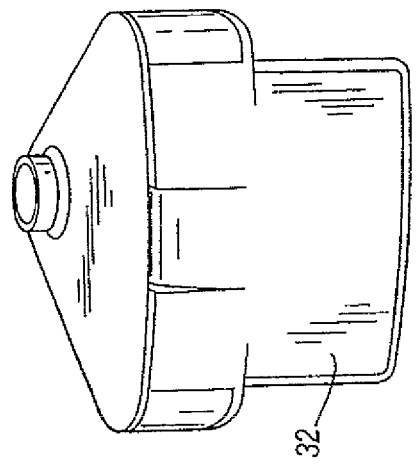
FIG. 16 is a perspective view of the container of the dispensing apparatus shown in FIG. 15.
Figure 15:
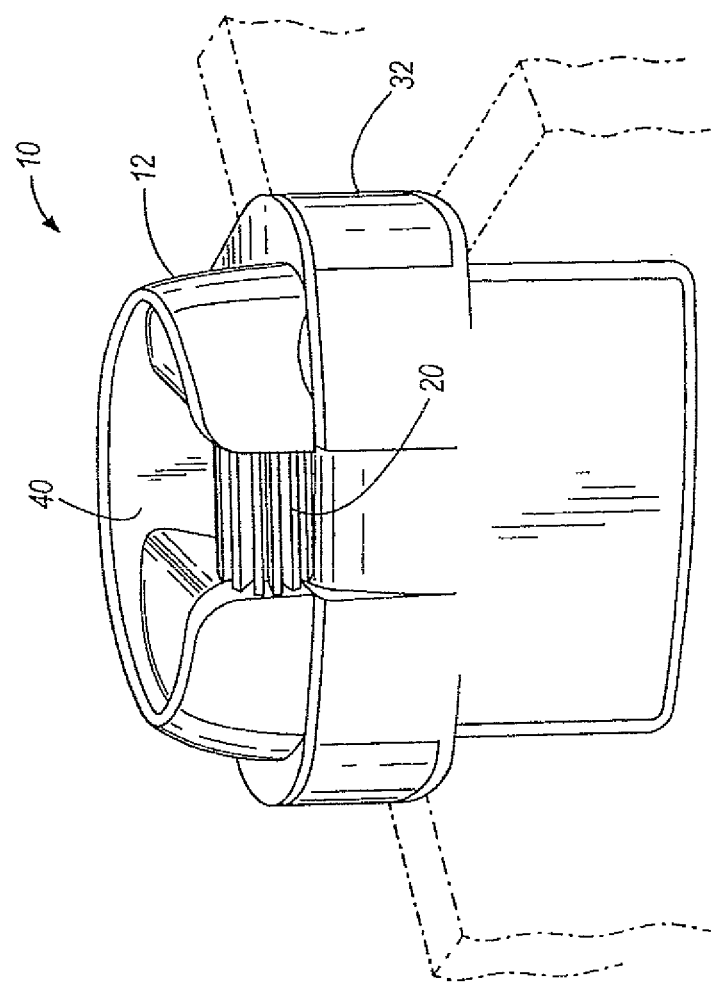
FIG. 15 is a perspective view of a dispensing apparatus according to another embodiment of the present invention, shown coupled to a portion of a container (e.g., a sink divider, bucket wall, and the like) for dispense of fluid therein.

FIGS. 10 and 11 illustrate alternative configurations for a dispensing apparatus according to the present invention. FIGS. 10 and 11 each illustrate two dispensing apparatuses 10 according to any of the embodiments described herein, although it should be noted that any number of dispensing apparatuses 10 can be installed in a given environment, such as on a single-compartment or multi-compartment sink as shown in FIGS. 10 and 11.

The dispensing apparatuses 10 illustrated in FIGS. 10 and 11 are configured to be received on a divider or other wall of a single-compartment sink or multi-compartment sink. In this regard, the dispensing apparatuses 10 are shaped to rest upon an upper rim of such sinks, such as on the upper rim of a dividing wall of such sinks as shown in FIGS. 10 and 11 and/or on the upper rim of an exterior wall of such sinks. For this purpose, a portion of the dispensing apparatus 10 (e.g., the housing 12 in some embodiments, a mounting plate or frame in other embodiments) is provided with an attachment device to connect that portion of the dispensing apparatus 10 to the sink, and to thereby mount the dispensing apparatus 10 to the sink. In some embodiments, the attachment device is a hook-shaped portion of the dispensing apparatus 10 at least partially straddling a wall of the sink. The hook-shaped portion can be a separate element of the dispensing apparatus connected to the housing 12, frame, mounting plate, or other structure of the dispensing apparatus 10, or can be defined by such portion(s) of the dispensing apparatus (e.g., a housing 12 shaped to define a recess for receiving a wall of the sink).

In some embodiments, the hook-shaped portion of the dispensing apparatus 10 can define a wall-receiving aperture having a fixed size. Alternatively, this aperture can be adjustable to enable the dispensing apparatus 10 to be received on a variety of different wall thicknesses and shapes. More information regarding such adjustable apertures is provided below in connection with other embodiments of the present invention.

As an alternative to hook-shaped portions of the dispensing apparatus adapted 10 to receive an upper rim of a sink wall, the housing 12 can be shaped in other manners to rest and be supported upon an upper rim of a sink wall. For example, the dispensing apparatus 10 can be shaped with a ledge dimensioned to rest upon the upper rim of a sink wall, in which case the dispensing apparatus 10 can balance upon the upper rim. In any of the dispensing apparatus embodiments described herein, other attachment devices can be used to retain the dispensing apparatus 10 in a desired position and location with respect to a sink. Examples of such attachment devices include, without limitation, adhesive or cohesive bonding material, suction cups, hook and loop fastener material, magnets, and the like. Additionally, structures can be provided on the sink to receive and hold one or more portions of the dispensing apparatus 10. Further, and as described above, the dispensing apparatus 10 (e.g., a portion of the housing 12) can be directly coupled to a faucet.

As also described above, in some embodiments it is highly desirable to provide a dispensing apparatus 10 that is portable, disposable, and/or that can be installed without plumbing. Therefore, some embodiments of the present invention only utilize those features described herein for retaining the dispensing apparatus 10 in place with respect to a sink that are releasable, and permit removal or movement of the dispensing apparatus 10. Some of these embodiments also permit removal of the dispensing apparatus 10 from the sink or movement of the dispensing apparatus 10 without the use of tools. By permitting movement or removal of the dispensing apparatus 10 with respect to the sink, a user can move the dispensing apparatus 10 to different locations on the sink or another sink as the user's needs arise (such as for dispensing diluted chemicals in different sink basins, to move the dispensing apparatus to a more convenient location for a left-handed or right-handed individual, and for other reasons), or can remove the dispensing apparatus for storage or replacement with a dispensing apparatus dispensing the same or a different chemical—in some cases without the need for tools.

In the embodiments illustrated in FIGS. 10 and 11, dispensing apparatuses 10 according to any of the embodiments described herein are shown installed on sinks. In other applications, however, the dispensing apparatuses 10 can be installed on and used in conjunction with other structures and devices, including any of the structures and environments described herein. For example, the dispensing apparatus 10 can be coupled to the wall of a bucket for filling the bucket with chemicals and diluent, can be coupled to a reservoir of a floor cleaning machine for filling the reservoir with chemicals and diluent, and the like. In any of these embodiments, the dispensing apparatus 10 can be adjustably and/or removably coupled to an upper rim of a basin, chamber, bucket, or other reservoir as described above, and in some embodiments can be installed and removed as a single integral unit. Also in such embodiments, installation and removal of the dispensing apparatus is possible without plumbing, without the use of tools, or without the need to connect the dispensing apparatus 10 to any structure other than the upper rim of the reservoir.

Although installation on the upper rim of a reservoir presents unique advantages for the dispensing apparatuses 10 described and illustrated herein, it will be appreciated that any of the dispensing apparatuses 10 can be permanently or releasably mounted to other structures, in some cases as a single integral unit and/or without the need for plumbing or tools. For example, the dispensing apparatus 10 can be coupled to a wall, rack, or frame, and can be configured for dispense into small containers, such as spray bottles or handheld buckets.

FIGS. 12-16 illustrate additional embodiments of fluid dispensing apparatuses according to the present invention. Accordingly, with the exception of mutually inconsistent features and elements between the embodiments of FIGS. 12-16 and the embodiments described in connection with FIGS. 1-11, reference is hereby made to the description above accompanying the embodiments of FIGS. 1-11 for a more complete description of the features and elements (and alternatives to the features and elements) of the embodiments of FIGS. 12-16.

The dispensing apparatuses 10 illustrated in FIGS. 12-16 each include a container adapted for use as a concentrated chemical reservoir 32, wherein the container is directly coupled to a dispenser housing 12. In other words, the wheel 20 and pump (not visible in FIGS. 12-16) are connected to the dispenser housing 12, and a dip tube (also not visible in FIGS. 12-16) extends into the chemical reservoir 32 located below the dispenser housing 12 to draw concentrate from the reservoir 32. In some embodiments, the dispenser housing 12 and chemical reservoir 32 can be configured differently such that the dispenser housing 12 (or substantial portions of the dispensing housing 12) are received within the separate container used as the concentrated chemical reservoir 32.

FIGS. 12-16 provide examples of the manner in which the chemical reservoir 32 can be separated from the rest of the dispensing apparatus 10 in some embodiments. The ability to separate the chemical reservoir 32 in this manner can permit a user to refill the chemical reservoir 32 with the same or different chemicals, in some embodiments. However, in other embodiments, it is highly desirable to insure that the chemical reservoir 32 cannot be removed from the rest of the dispensing apparatus 10. In particular, in any of the dispensing apparatus embodiments described herein, it may be desirable to insure that the chances for user access or exposure to the concentrated chemicals 16 are minimized or eliminated. Therefore, in such embodiments, the chemical reservoir 32 is permanently attached to the rest of the dispensing apparatus 10, and the concentrated chemical 34 within the chemical reservoir 32 and/or the concentrated chemical fluid path along which the concentrated chemical 34 flows is not accessible from the exterior of the dispensing apparatus 10.

FIGS. 12-16 also illustrate the manner in which the various dispensing apparatuses 10 described and illustrated herein can be adapted for placement in locations having different shapes, such as at the upper rim of a dividing wall or exterior wall of a sink, bucket, or other reservoir (FIGS. 12 and 13), the upper rim of a corner of any such reservoir (FIG. 15), and the like. In this regard, one or more exterior walls of the dispensing apparatus 10 can be shaped to conform to the upper rim and one or more walls of the reservoir on which the dispensing apparatus 10 is installed. With reference to FIGS. 12-15, the dispensing apparatus 10 has a bearing surface 95 shaped and positioned to rest against the upper rim of a wall as just described. The bearing surface 95 can be defined by a protruding portion of the housing 12 as shown in the illustrated embodiments, but can be defined by other portions of the dispensing apparatus (e.g., a portion of the reservoir, a frame or mounting plate of the dispensing apparatus, and the like).

Although not specifically described above, dispensing apparatuses according to some embodiments of the present invention can dispense concentrated chemicals in a variety of forms. For example, in some embodiments, the concentrated chemical is in liquid form, whereas in other embodiments, the concentrated chemical is in solid or powder form. In those embodiments in which concentrated chemical is in solid or powder form, various metering devices and techniques can be used.

For example, in the case of solid concentrated chemical, water can flow via the aid of gravity from the diluent source directly over the solid concentrated chemical, and can drain from the housing or other portion of the dispensing apparatus 10 with the assistance of gravity. The solid product can be selected or arranged to dissolve at a predetermined rate corresponding to the flow of diluent 16 in order to provide a desired dilution ratio. In such cases, the flow of diluent 16 can be controlled with a wheel, valve, controlled aperture, tortuous fluid passageways, diversions in flow paths, and the like. Further, the solid product can be impregnated or encapsulated on the wheel and can be selected to dissolve at a predetermined rate. In such cases, the solid product can be a concentrated cleaning chemical, a water softening chemical, and the like.

In the case of powder chemical dispense, the wheel 20 can be configured to drive a dispensing closure, such as that illustrated in U.S. Patent Publication Number 2005/0247742 entitled "Metering and Dispensing Closure," the entire contents of which are hereby incorporated by reference. Alternatively, a controlled amount of diluent can be flushed against a powder interface within the dispenser to provide a desired dilution ratio to the flow of diluent. The amount of diluent contacting the powder can be controlled by a wheel, a valve, controlled aperture, tortuous fluid passageways, diversions in flow paths, and the like.

FIGS. 17-21 illustrate a dispensing apparatus 510 according to another embodiment of the present invention. The dispensing apparatus 510 can have any of the features described above in connection with the dispensing apparatus embodiments of FIGS. 1-16, absent mutually inconsistent features described below and illustrated in FIGS. 17-21. Also, any of the features described below in connection with the dispensing apparatus 510 of FIGS. 17-21 can be utilized in the previously-described pumps of the present invention. For more information regarding the structure and operation (and alternatives thereto) of the dispensing apparatus 510 illustrated in FIGS. 17-21, reference is hereby made to the description above in connection with the embodiments of FIGS. 17-21.

Figure 17:
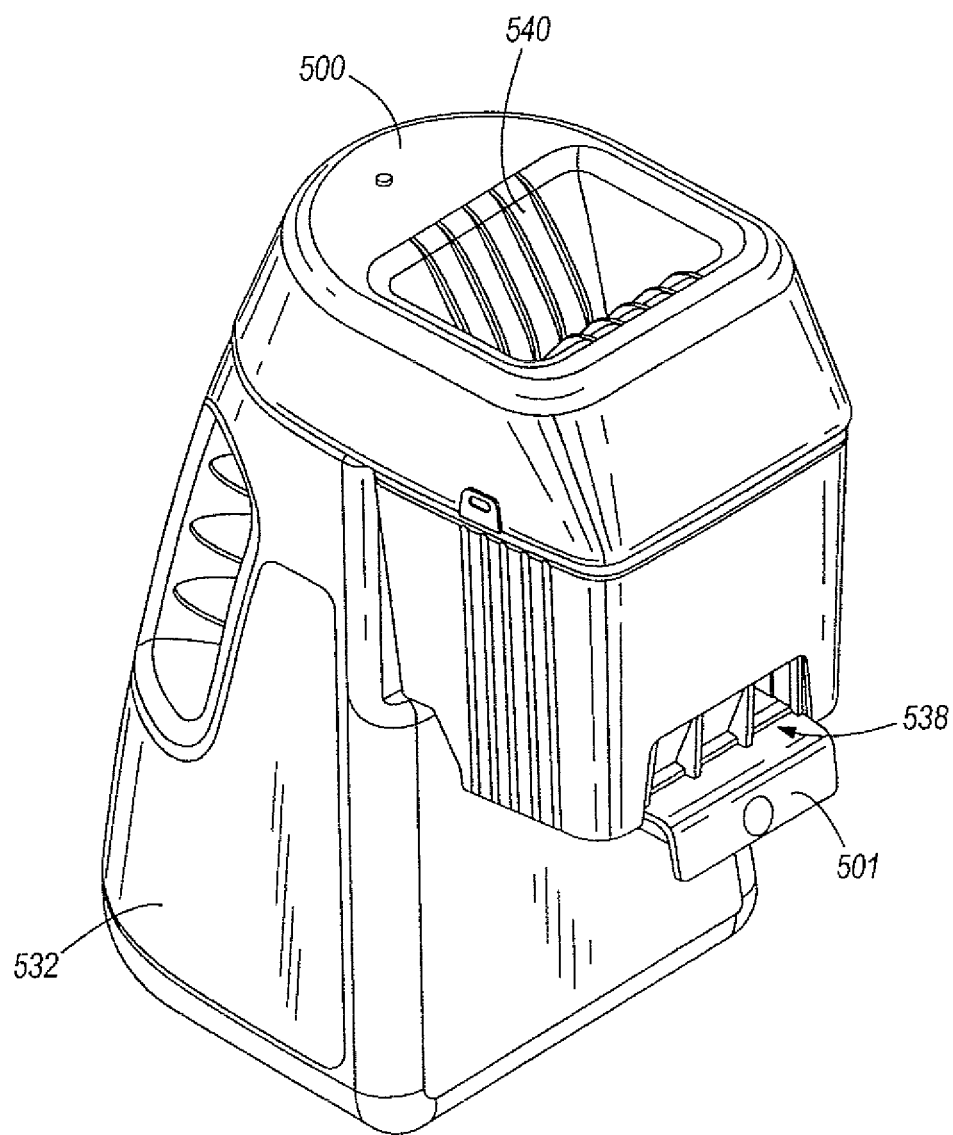
FIG. 17 is a perspective view of a dispensing apparatus according to another embodiment of the present invention.

With reference first to FIG. 17, the illustrated dispensing apparatus 510 includes a concentrated chemical reservoir 532 coupled to a housing 512. The concentrated chemical reservoir 532 and the housing 512 can be manufactured in any desired manner, such as by molding, welding, machining, stamping, pressing, and the like. The housing 512 can have any shape and size desired, and can be constructed of any number of components. For example, the housing 512 illustrated in FIGS. 17-19 includes a body 517 connected to a cap 519. In some embodiments, the body 517 is a separate element permanently connected to the cap 519 to prevent removal of the concentrated chemical reservoir 532 from the cap 519 and/or to prevent user access to an interior of the concentrated chemical reservoir 532 or to the flow path of concentrated chemicals from the concentrated chemical reservoir 532 to a location where the concentrated chemicals mixes with diluent.

The dispensing apparatus of FIGS. 17-21 also includes a funnel 540 for receiving diluent. The funnel 540 shown in FIG. 17 is defined in the cap 519, although in other embodiments the funnel 540 (if used) can be partially or entirely defined by other elements of the housing 512.

Like the dispensing apparatuses described and illustrated above, the dispensing apparatus 510 receives a flow of diluent, and dispenses diluent and chemicals stored in the concentrated chemical reservoir 532. This dispense can comprise a partially or fully mixed flow of diluent and chemicals, or can comprise unmixed diluent and chemicals (e.g., dispensed from separate outlets for mixture in a downstream reservoir). In the illustrated embodiment, the dispensing apparatus 510 dispenses a mixture of diluent (e.g., water) and chemicals toward a fluid outlet 576.

In the illustrated embodiment of FIGS. 17-21, the concentrated chemical reservoir 532 and housing 512 are made from or include polymeric material, although other materials such as metal, fiberglass, glass and other ceramics, and composites can instead be used, if desired. The dispensing apparatus 510 (including the pump, gears, and other components described in greater detail below) is a single integral unit that is portable, and in some embodiments is entirely disposable. In some embodiments (e.g., disposable embodiments), the chemical reservoir 532 is closed against access by a user—whether from the introduction of fluid into the concentrated chemical reservoir 532 or from user access to concentrated chemicals therein. In such cases, the housing 512 can be constructed to permanently close and seal the concentrated chemical reservoir 532, with the exception of an outlet for dispense of concentrated chemicals therefrom.

Figure 18:
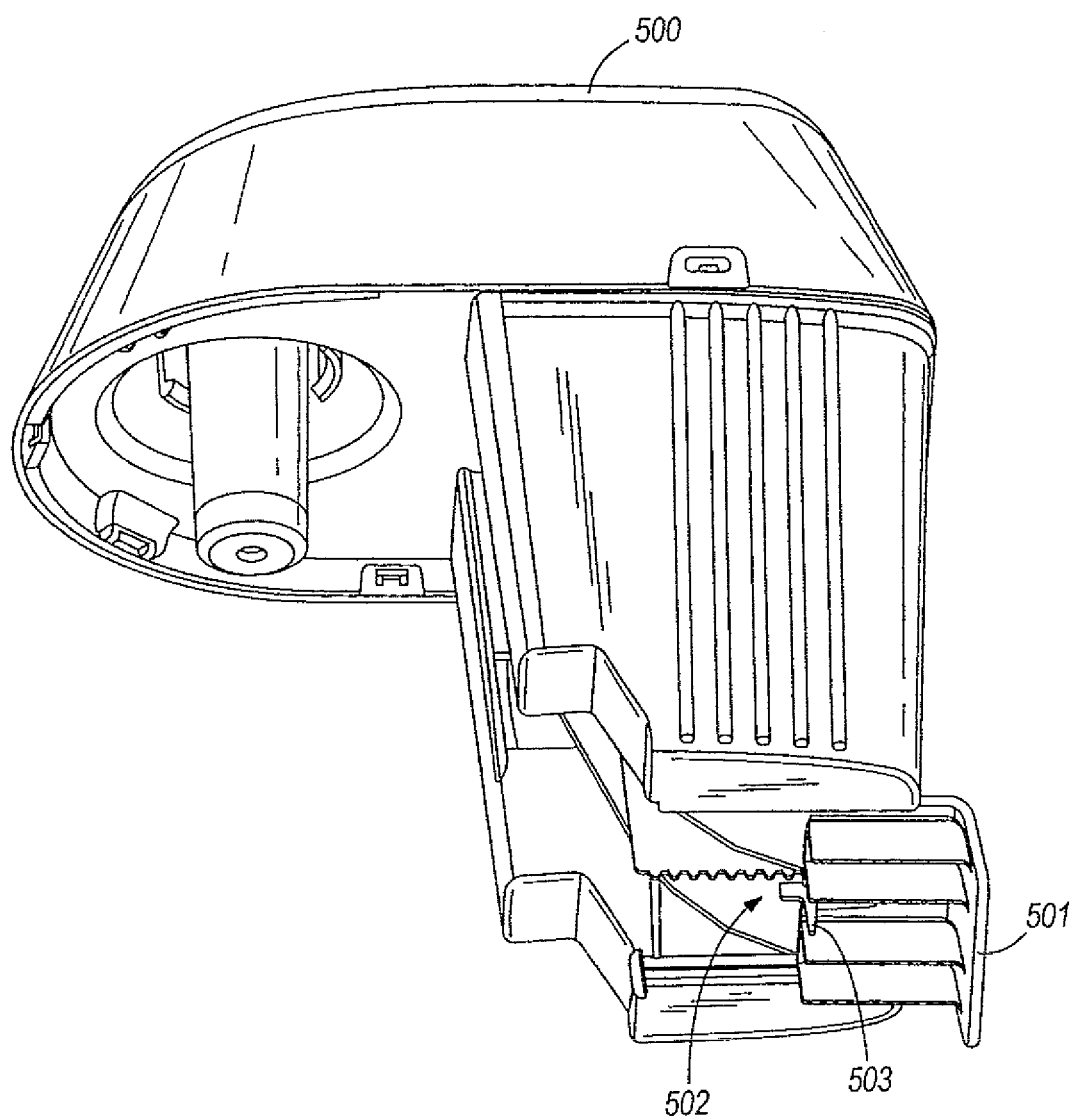
FIG. 18 is a bottom perspective view of the dispensing apparatus of FIG. 17, shown with the container removed.
Figure 19:
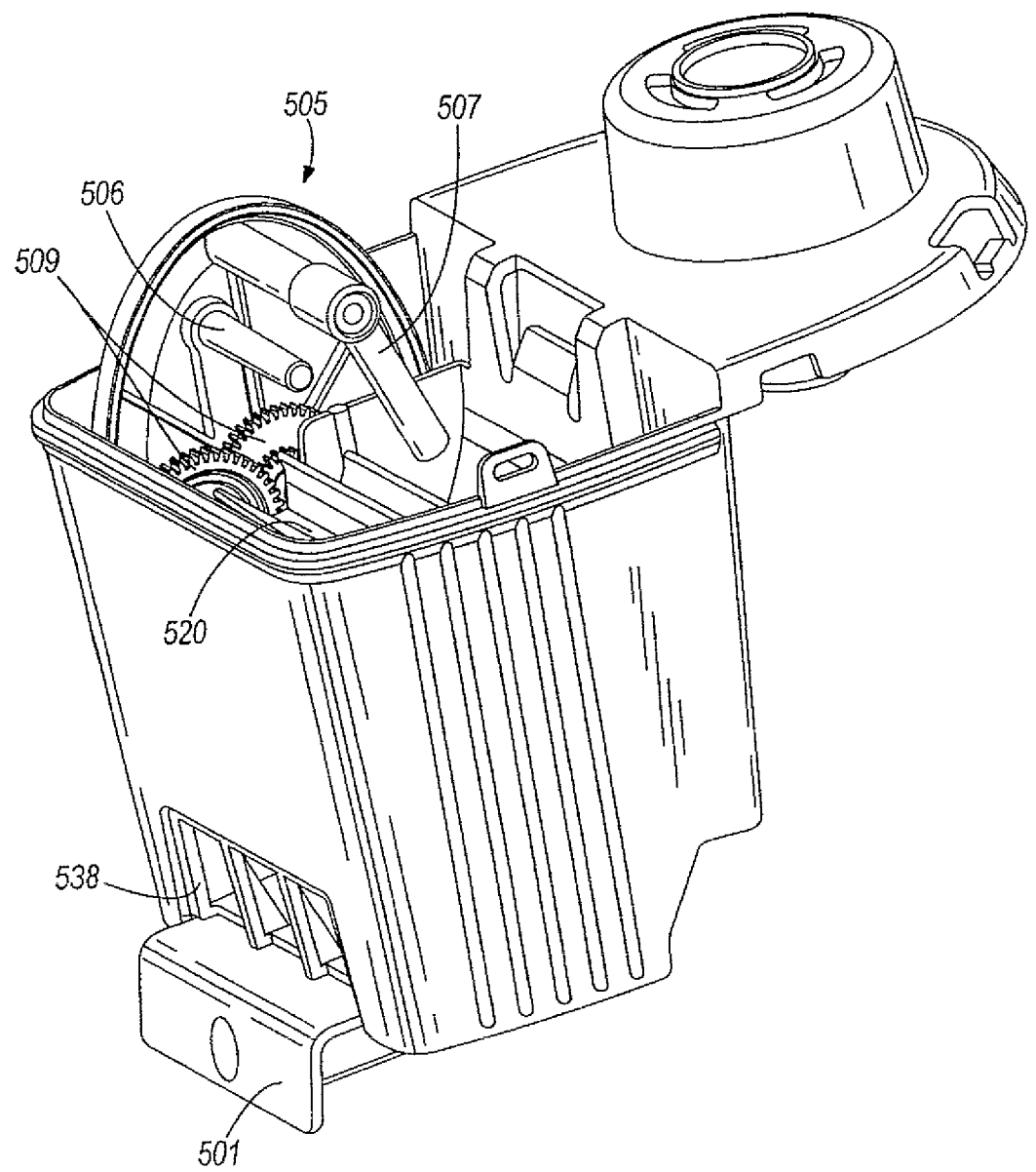
FIG. 19 is a top perspective view of the dispensing apparatus of FIG. 17, shown with portions of the apparatus removed for clarity.

It should be noted that any of the dispensing apparatuses described above can take the form of the dispensing apparatus 510 illustrated in FIGS. 17-22, absent mutually inconsistent features and elements. However, although the shape and configuration of the concentrated chemical reservoir 532 and housing 512 (including cap 519 and body 517) shown in FIGS. 17-19 is particularly desirable in many applications, this shape and configuration is presented by way of example only, and is not intended to be limiting to the present invention.

With continued reference to the illustrated embodiment of FIGS. 17-21, the dispensing apparatus 510 includes a clamp arm 501. As described in greater detail above, some embodiments of the dispensing apparatus 510 are adapted for mounting to the upper rim of any reservoir wall, such as the upper rim of a sink, bucket, or cleaning machine. To this end, the dispensing apparatus 510 can include a bearing surface 595 (as described above in connection with the embodiments of FIGS. 12-16) against which the upper rim of a reservoir wall bears to support the dispensing apparatus 510 thereon. Like the earlier embodiments described above, the bearing surface 595 can have any shape, and can contact the reservoir wall in any number of locations desired. The clamp arm 501 illustrated in FIGS. 17-19 extends along a portion of such a reservoir wall, and can help to retain the dispensing apparatus 510 on the reservoir wall. The clamp arm 510 can also be positioned and shaped to support a portion of the dispensing apparatus 510 at an elevation below the upper rim of the reservoir wall to which the dispensing apparatus 510 is mounted, thereby reducing or minimizing splashing or spray of dispensed fluid out of the reservoir.

In some embodiments, the clamp arm 501 of the dispensing apparatus 510 is not adjustable. However, the clamp arm 510 in the illustrated embodiment is movable with respect to the rest of the dispensing apparatus 510 (and in particular, with respect to the body 512 in the illustrated embodiment) to adjust the dispensing apparatus 510 for mounting to different locations. With reference to FIG. 18, the illustrated clamp arm 501 is movable between from a first (innermost) position to a second (outermost) position, and can be moveable to a number of different positions therebetween. In some embodiments, the clamp arm 501 is movable through a range of positions, whereas in other embodiments, the clamp arm 501 is movable only to two or more discrete positions.

A number of different mechanisms and elements can be used to permit adjustment of the clamp arm 510 as described above. For example, the clamp arm 510 can be connected to the rest of the dispensing apparatus (e.g., the housing 512) by a mating ratchet and pawl mechanism, an example of which is shown in FIGS. 17-19. With particular reference to FIG. 18, the mating ratchet and pawl mechanism 502 permits a user to lock the clamp arm 510 into any of a plurality of positions. A lever 503 can be included to allow a user to release the ratchet and detent mechanism 502 so that the clamp arm 510 can be slid to a different position for fitting to a desired sink, bucket, or other reservoir, or for otherwise mounting to a desired location. In other non-illustrated embodiments, the clamp arm 510 can be a one-time ratchet and detent mechanism or other single-use clamping mechanism, enabling a user to adjust the clamp arm 510 a single time, thereby permanently securing the clamp arm 510 in a desired position.

The clamp arm 510 can be adjusted to different positions with respect to the housing 512 and/or the concentrated chemical reservoir 532 in a number of other manners, each of which falls within the spirit and scope of the present invention. For example, any type of adjustment mechanism for a conventional clamp can be used, such as a screw-type clamp mechanism, a spring-loaded locking lever (such as those utilized in pipe clamps), and the like.

With reference now to FIG. 19, the illustrated dispensing apparatus 510 includes a gear pump 505 for dispensing concentrated chemicals from the concentrated chemical reservoir 532. The gear pump 505 (described in greater detail below) provides unique performance results that are highly desirable in the dispensing apparatus 510. The illustrated gear pump 505 is operably coupled to and driven by a wheel 520 (not shown) taking any of the forms described above in connection with earlier embodiments. At least a portion of the wheel in the illustrated embodiment is positioned within the flow path of diluent in the dispensing apparatus 510, such that the weight (and in some embodiments, the impact) of the diluent rotates the wheel 520. Reference is hereby made to the earlier-described wheel-driven pump embodiments above for more information in this regard. In other non-illustrated embodiments, other pump driving devices and mechanisms capable of supplying power to the gear pump 505 responsive to movement of diluent in the dispensing apparatus 510 can instead be used as desired, and fall within the spirit and scope of the present invention.

The gear pump 505 in the illustrated embodiment of FIGS. 17-21 has a pump housing with an ovular or egg-like shape. Other symmetrical and non-symmetrical housing shapes, including without limitation round, rectangular, and oblong shapes, are possible in other embodiments. The gear pump 505 in FIGS. 19-21 has a fluid inlet 506 and a fluid outlet 507, although it should be noted that two or more fluid inlets 506 and/or fluid outlets 507 can exist in other embodiments of the gear pump 505. The gear pump 505 is operable to pump concentrated chemical from the reservoir 532, through a tube, pipe, or other conduit (not shown) extending to the fluid inlet 506, through the fluid inlet 506, across a longer diameter of the gear pump 505 (along arrow A in FIGS. 20 and 21), around at least a portion of a perimeter of the gear pump 505 (along arrows B and C in FIGS. 20 and 21) and out the fluid outlet 507. In other embodiments, the concentrated chemical is directed along a different path within the pump housing 549, such as a more direct path between the fluid inlet 506 and the fluid outlet 507. The path described above and shown in FIGS. 21 and 22 can be desirable by virtue of an improved seal within the gear pump 505.

In particular, although some fluid-tight gear pump housings can be constructed without a separate gasket or seal between mating housing parts, such housings can be difficult to manufacture due to the need for relatively high tolerances at the locations where a fluid-tight seal is needed. Depending at least in part upon the material used to construct the housing parts and the manufacturing method for the housing parts, the inventors have discovered that higher manufacturing tolerances can be achieved at the periphery of gear pump housing parts. For example, in molded plastic gear pump housing parts, the periphery of such housing parts can often be held to higher tolerances than other portions of the housing parts. Therefore, and with reference to the embodiment of FIGS. 17-21, locating the areas that will define fluid-tight seals of the gear pump housing 549 in the same locations at which higher manufacturing tolerances can be maintained (e.g., in the peripheral areas of both housing pump portions 549 of the illustrated embodiment) can result in improved housing seals and housing performance results. Accordingly, in the illustrated embodiment of FIGS. 17-21, fluid flow within the gear pump 505 extends through flow passages located about the periphery of the gear pump 505.

Figure 20:
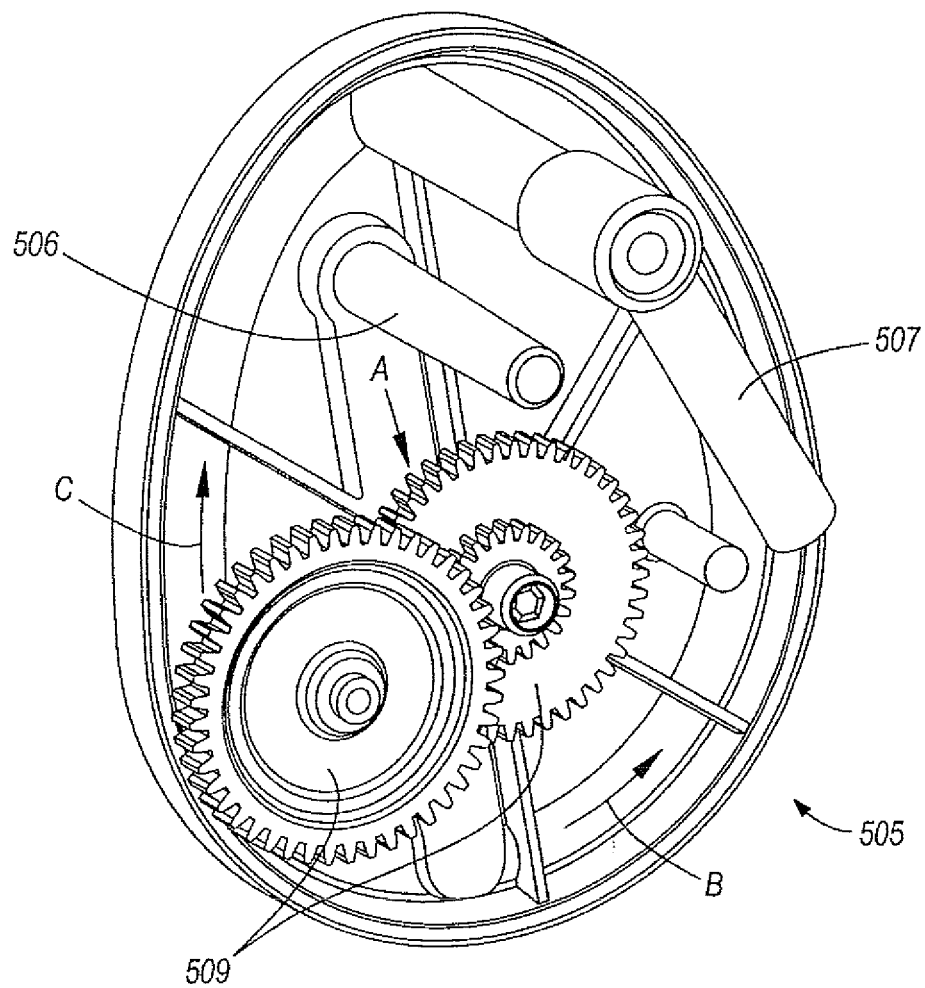
FIG. 20 is a partial perspective view of the gear pump of FIG. 19.
Figure 21:
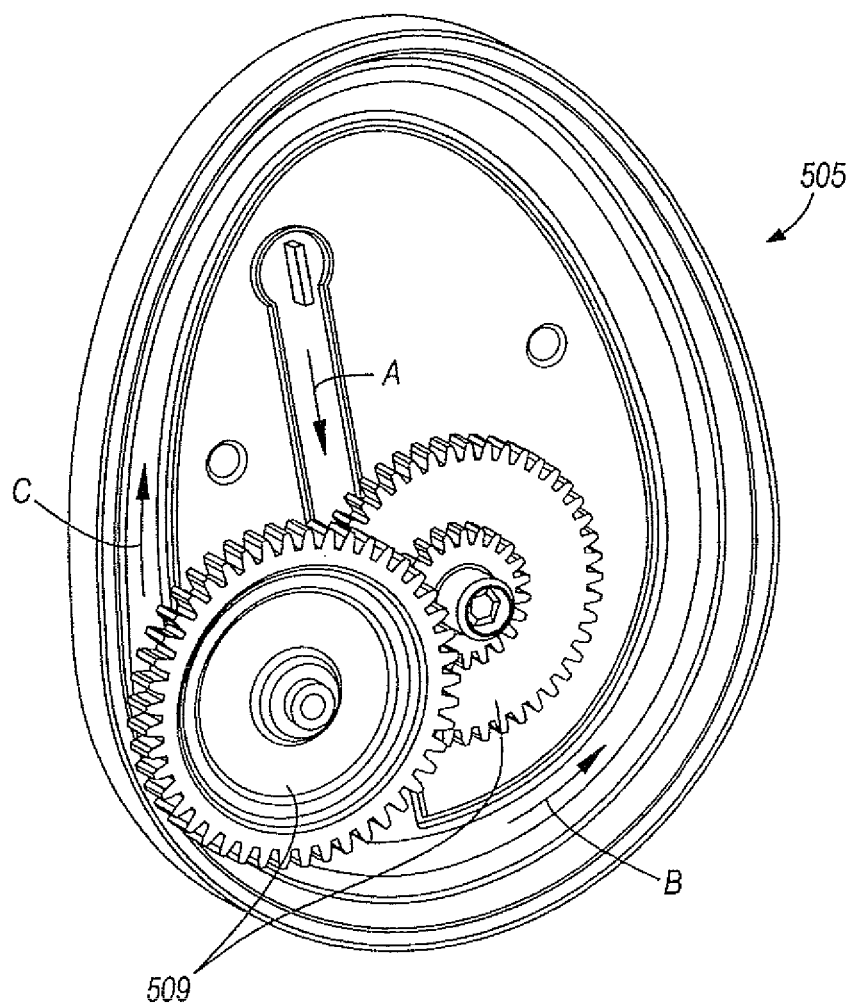
FIG. 21 is another partial perspective view of the gear pump of FIGS. 19 and 20, shown with the pump inlet and outlet removed.

The gear pump 505 shown in FIGS. 19-21 includes a plurality of gears 509 that form a gear train. A gear 509 receives power from the rotating wheel 520 for transmission of the power to another gear 509 in the gear pump 505. In the illustrated embodiment, the gears 509 have different sizes so that the rotational speed of the wheel 520 can be different from that of the gear pump 505. The relative gear diameters and gear teeth ratios of the gears 509 determine the amount of concentrated chemical pumped through the gear pump 505 in response to each rotation of the wheel 520. If a higher concentration of chemical to diluent is desired, the gear ratios and relative gear diameters can be selected to allow for more concentrated chemical to flow for a given amount of water than if a lower concentration is desired. Although a gear train as described above can provide significant advantages by generating a pump input speed that is different from the rotational speed of the wheel 520, the input speed of the gear pump 505 in other embodiments is the same as the rotational speed of the wheel 520, such as in embodiments in which the shaft about which the wheel 520 turns is the same as that directly connected to the input of the gear pump 505.

Figure 22:
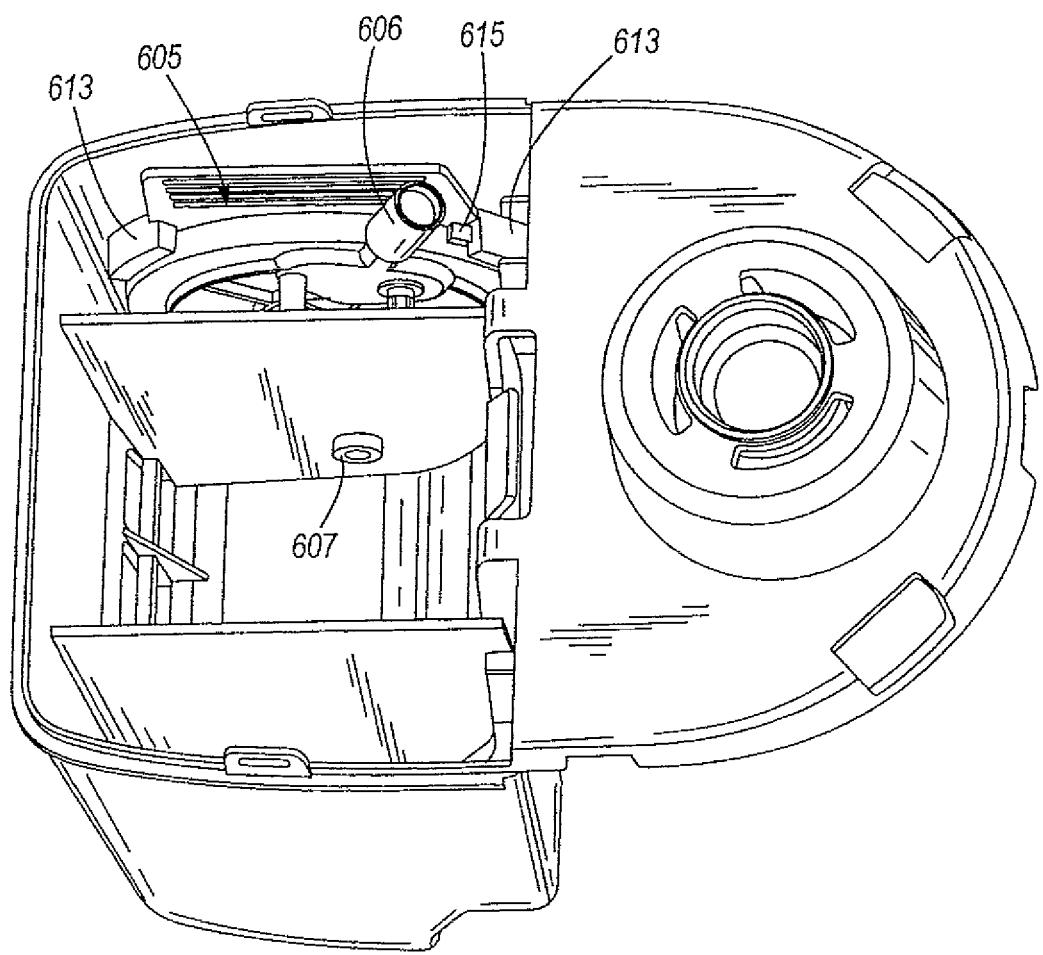
FIG. 22 is a top perspective view of a dispensing apparatus according to another embodiment of the present invention, shown with portions of the apparatus removed for clarity.
Figure 23:
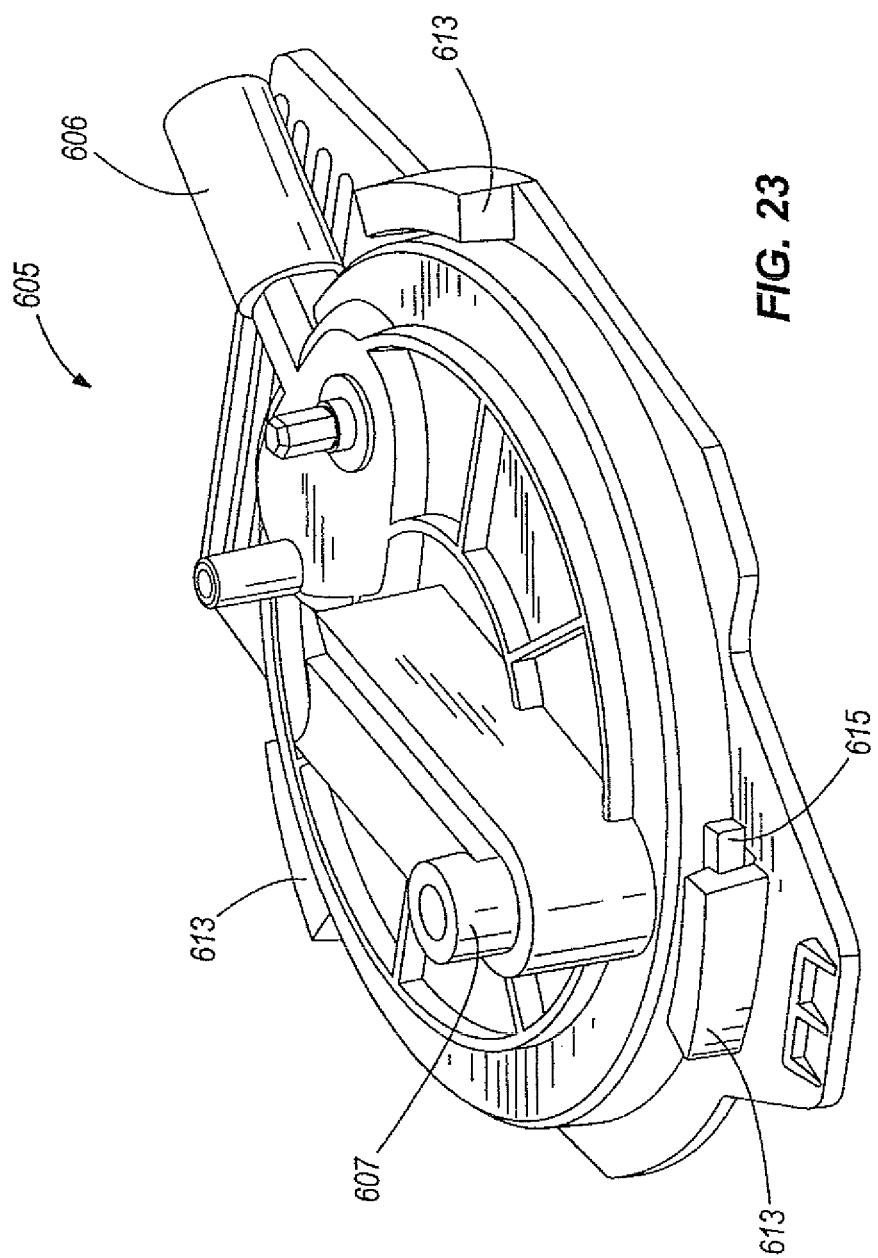
FIG. 23 is a perspective view of the gear pump shown in FIG. 22.

The gear pump 505 operates by drawing a suction force toward at least two mating gears (not shown in FIGS. 19-21, but similar to gears 665 in the gear pump shown in the embodiment of FIGS. 22 and 23). At least one of these mating gears is driven by the gears 509 in the gear train described above. The resulting suction force draws concentrated chemical from the chemical reservoir 532 to the inlet 506 of the gear pump 505, where the concentrated chemical moves toward the gear pump outlet 507 as described in greater detail above.

Based at least in part upon the sizes of the gears 509 and wheel 520 selected, extremely accurate diluent to concentrated chemical ratios are possible. For example, ratios of chemical to diluent of 1:50, 1:500 and 1:2500 have been consistent and repeatable during testing. These ratios can be set during manufacturing, such that a given concentrated chemical having a set number of desirable concentrations (e.g., one or two) can be sold in either or both of the desirable concentrations.

By virtue of the gear pump 505 described above and illustrated in FIGS. 19-21, and the use of such a pump 505 in a dispensing apparatus 510 as also described above, very small dilution ratios can be achieved with high accuracy and precision. In some embodiments, the gear pump 505 is driven at a rate to dispense concentrated chemical at no less than about a 1:256 ratio of concentrated chemical to diluent. In other embodiments, the gear pump 505 is driven at a rate to dispense concentrated chemical at no less than about a 1:500 ratio of concentrated chemical to diluent. In still other embodiments, the gear pump 505 is driven at a rate to dispense concentrated chemical at no less than about a 1:1800 ratio of concentrated chemical to diluent. However, the inventors have discovered that a gear pump driving rate to dispense concentrated chemical at no less than about a 1:2500 ratio of concentrated chemical to diluent is highly desirable in some applications.

The above-described dilution ratios can be achieved at a number of different flow rates of diluent through the dispensing apparatus 510. For example, in some embodiments, diluent can flow through the dispensing apparatus 510 at a rate of at least about 0.5 gallons per minute and no greater than about 10 gallons per minute. Alternatively, some embodiments of the present invention operate at a diluent flow rate of at least about 2 gallons per minute and no greater than about 8 gallons per minute. In other embodiments, diluent can flow through the dispensing apparatus 510 at a rate of at least about 3 gallons per minute and no greater than about 7 gallons per minute.

With such small volumes of concentrated chemicals being dispensed in normal operation of the dispensing apparatus 510, a lower volume of chemical concentrate is needed to produce a given amount of cleaning fluid than has been possible before. In some embodiments, the chemical reservoir 520 holds at least about 0.5 liters. In other embodiments, the chemical reservoir 520 holds at least about 1 liter. In still other embodiments, the chemical reservoir 520 holds at least about 1.5 liters. Also, in some embodiments, the chemical reservoir holds up to 2.0 liters, whereas in other embodiments much larger chemical reservoirs holding, for example, up to 5 or 10 liters are possible while still enabling a user to carry the dispensing apparatus 510.

In the illustrated embodiment of FIGS. 17-21, concentrated chemicals from the chemical reservoir 532 are pumped to a location adjacent the wheel 520. The concentrated chemicals are agitated with the diluent in the wheel 520, which can result in frothing or foaming (desirable in many applications, such as in the dispense of soap and other cleaning products). In other embodiments, concentrated chemicals are pumped to any other location (e.g., below or beside the wheel 520) for mixture with diluent in the dispensing apparatus 510, or even to an outlet of the dispensing apparatus 510 separate from that for the diluent. However, it is often desirable for the diluent and concentrated chemical to be at least partially mixed prior to exiting the dispensing assembly 510, such as through outlet 538. This pre-dispense mixing action can inhibit or prevent user contact with concentrated chemicals from the dispensing assembly 510.

Figure 24:
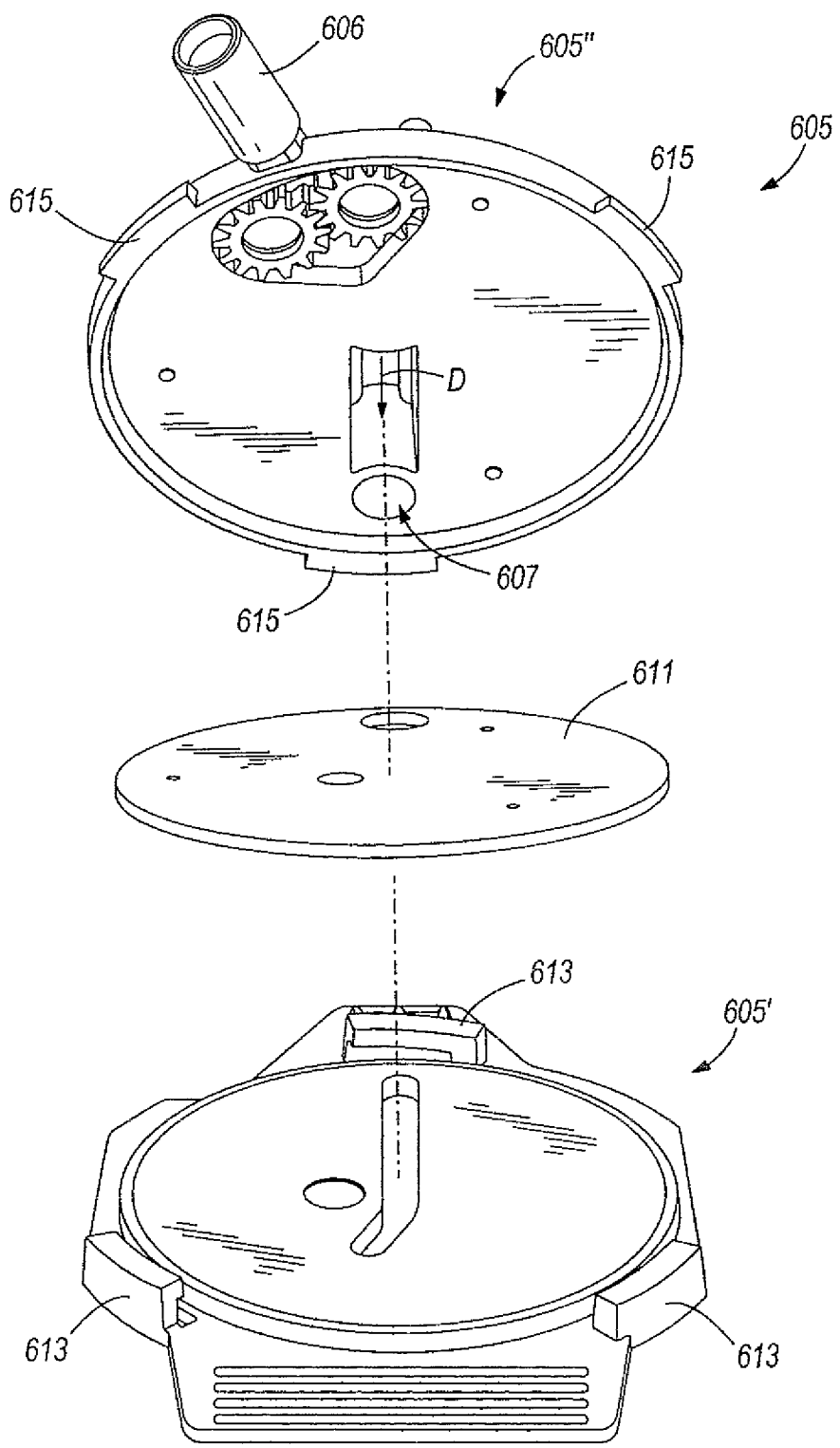
FIG. 24 is an exploded perspective view of the gear pump shown in FIGS. 22 and 22.

FIGS. 22-24 illustrate a dispensing apparatus 610 having a gear pump 605 according to another embodiment of the present invention. The dispensing apparatus 610 can take any of the forms described and illustrated above. Like the gear pumps described above in connection with the embodiment of FIGS. 17-21, the gear pump 605 shown in FIGS. 22-24 can be utilized in any of the dispensing apparatus embodiments described and/or illustrated herein, absent mutual inconsistencies to the contrary. The gear pump 605 shown in FIGS. 22-24 is similar in many respects to the gear pump 505 described above. Accordingly, with the exception of mutually inconsistent features and elements between the embodiments of FIGS. 22-24 and the embodiments of FIGS. 17-21, reference is hereby made to the description above accompanying the embodiments of FIGS. 17-21 for a more complete description of the features and elements (and the alternatives to the features and elements) of the embodiments of FIGS. 22-24. Features and elements in the embodiments of FIGS. 22-24 corresponding to features and elements in the embodiments of FIGS. 17-21 are numbered in the 600 series of reference numbers.

The gear pump 605 shown in FIGS. 22-24 has a fluid inlet 606 and a fluid outlet 607, although it should be noted that two or more fluid inlets 606 and/or fluid outlets 607 can exist in other embodiments of the gear pump 605. The gear pump 605 is drivably coupled to a wheel (not shown in FIG. 22, but having any of the features and connected in any of the manners described above in connection with earlier embodiments).

The gear pump 605 draws concentrated chemical from a chemical reservoir (not shown, but similar to any of those illustrated and described in earlier embodiments) through an inlet 606, through a pair of meshing gears 665, and toward an outlet 607 along a flow path indicated generally by arrow D in FIG. 24. The flow path through the gear pump 605 can be at least partially defined in some embodiments by an elongated passageway in the gear pump housing 659 extending between the inlet and outlet 606, 607 of the gear pump 605. The meshing gears 665 are driven by rotation of the wheel in any of the manners described above in order to produce suction for pumping the concentrated chemical in this manner. In the illustrated embodiment of FIG. 22, the concentrated chemical is dispensed from the outlet 607 to a location below the wheel, resulting in reduction or elimination of foaming in the mixture of diluent and concentrated chemical exiting the dispensing apparatus 610. In other, non-illustrated embodiments, the concentrated chemical dispense location within the dispensing apparatus 610 results in dispense of concentrated chemical onto the wheel or adjacent an upper portion of the wheel, thereby resulting in foaming in some embodiments. In any case, a length of tube, pipe, or other conduit can extend from the outlet 607 of the gear pump 605 as needed to dispense concentrated chemical anywhere in the dispensing apparatus 610 desired.

The dilution ratio of concentrated chemical to diluent using the gear pump 605 illustrated in FIGS. 22-24 is determined by the relative speeds of rotation of the gear pump 605 and the wheel driving the gear pump 605. This ratio can, in some embodiments, be determined at least in part by the relative diameters and ratios of gears driving the fluid pumping gears 665 (e.g., using driving gears such as the gears 509 in the embodiment of FIGS. 17-21, or using any of the other driving gear assemblies in earlier embodiments described above). Also, the quantity of concentrated chemical held by the reservoir to which the gear pump 605 is connected can be the same or similar to any of those described above.

With continued reference to the gear pump 605 shown in FIGS. 22-24, the illustrated gear pump 605 includes a seal 611 is received between two different portions 605', 605" of the pump housing 649. The seal 611 in the illustrated embodiment of FIGS. 22-24 is a layer of material compressed between the gear pump housing portions 605', 605" to insure a fluid-tight passage through the meshing gears 664 and the fluid passageway 669 extending from the meshing gears 664. In some embodiments, the seal 611 is a resilient foam gasket layer providing compression resistance to result in the fluid-tight seal just described. If desired, the seal 611 can also include a smooth, low-friction layer of material (e.g., TEFLON® brand synthetic resin, and the like).

The seal 611 can be positioned between the gear pump housing portions 605', 605" as shown in FIG. 24, and can be compressed therebetween by mating elements of the gear pump housing portions 605', 605". In the illustrated embodiment, for example, the gear pump housing portions 605', 605" include a plurality of mating ramp and projection sets 613 and 615 that engage to couple and compress the gear pump housing portions 605', 605" together by relative rotation of the gear pump housing portions 605', 605". Any number of such mating ramp and projection sets can be utilized to perform this function. When compressed between the gear pump housing portions 605', 605" in this manner, the seal 611 can provide a fluid-tight passageway (e.g., liquid-tight) for concentrated chemical flowing between the inlet 606 and the outlet 607 of the gear pump 605.

The mating ramp and projection sets 613, 615 in the illustrated embodiment can provide a pre-load for compressing the seal 611 and occupying extra space between the two gear pump housing portions 605', 605", thereby defining the fluid-tight passageway even despite a larger range of manufacturing tolerances than would otherwise be acceptable in other gear pump designs. In addition to providing the ability to manufacture a simple, reliable and fluid-tight gear pump 611 with relatively large manufacturing tolerances and low production costs, the gear pump design shown in FIGS. 22-24 permits disassembly of the gear pump 605 without the use of tools (e.g., simply by relative rotation between the gear pump housing portions 605', 605" to disengage the ramp and projection sets 613, 615 in some embodiments).

Figure 25:
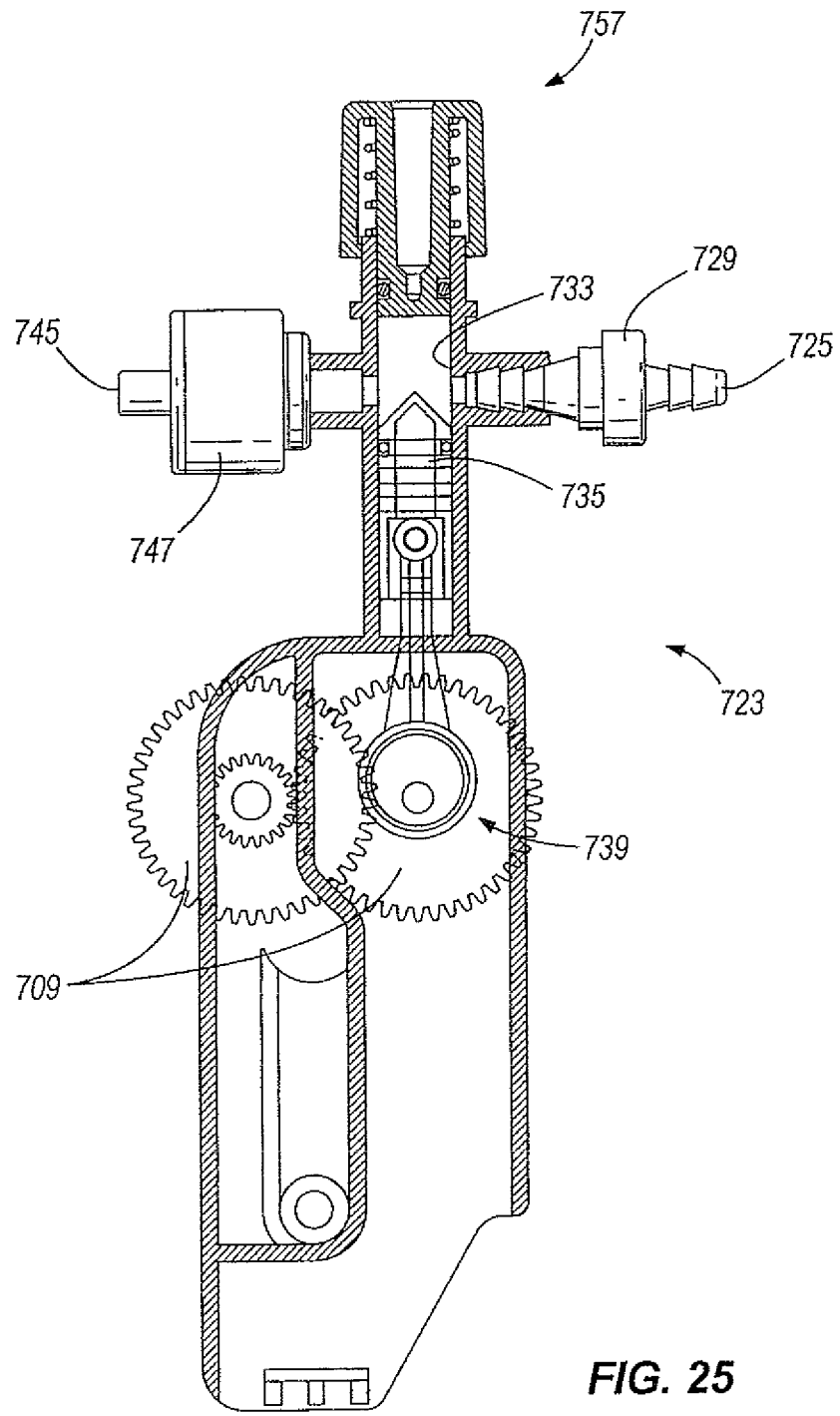
FIG. 25 is a cross-sectional view of a pump according to another embodiment of the present invention.
Figure 26:
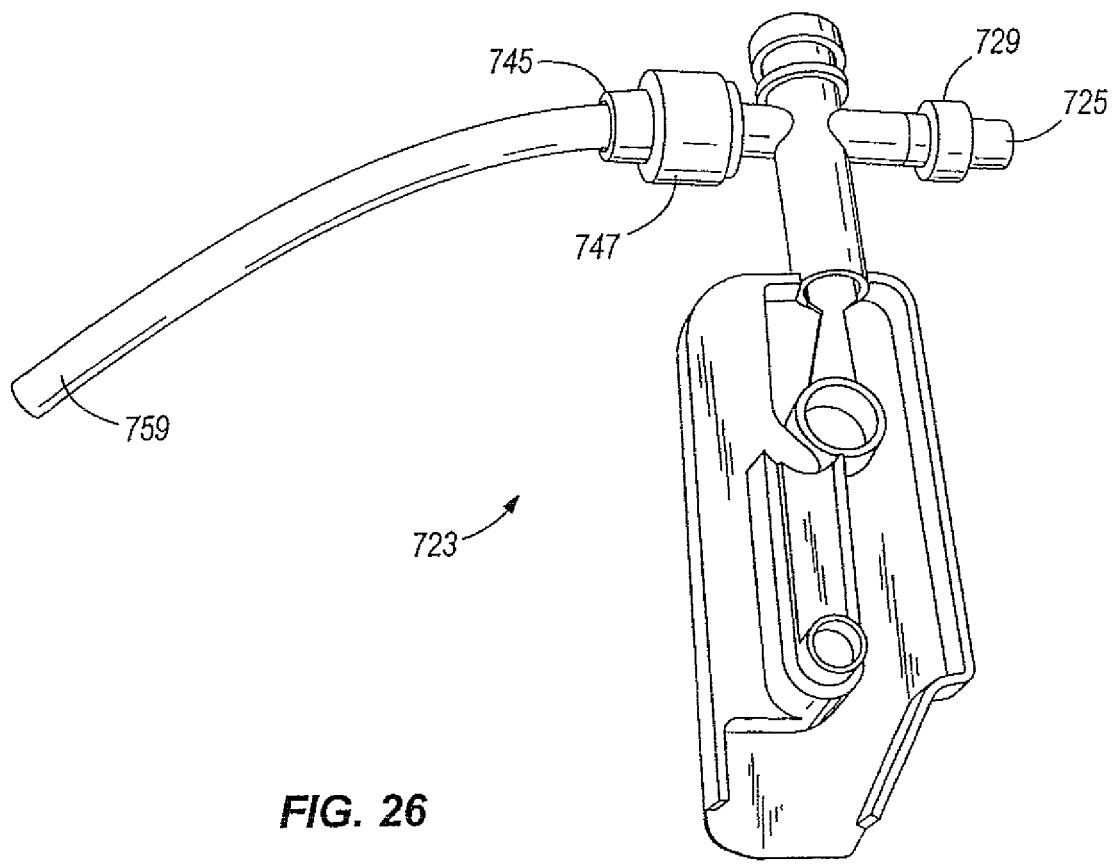
FIG. 26 is a perspective view of the pump of FIG. 25, shown with parts of the pump removed.

As described above, any of the dispensing apparatus embodiments described and illustrated herein can employ a gear pump to draw concentrated chemical from a chemical reservoir for mixture with diluent. Alternatively, a piston pump can be used to perform this function. FIGS. 25 and 26 illustrate such a pump 723 according to an embodiment of the present invention. This piston pump 723 can be utilized in any of the dispensing apparatus embodiments described and illustrated herein.

The illustrated piston pump 723 includes an inlet 725, an inlet valve 729 in or associated with the inlet 725, an outlet 745, an outlet valve 747 in or associated with the outlet 725, a piston 735, and a pump chamber 733 in fluid communication with the inlet 725. The inlet and outlet valves 729, 745 can each be any suitable one-way valve, such as a ball valve, check valve, umbrella valve, duck-bill valve, and the like. The inlet and outlet valves 749, 745 can be of the same type or different types, as desired. In some embodiments, a normally-open umbrella valve is utilized for the inlet valve 729 to allow concentrated chemical to flow substantially uninhibited through the inlet 725 and into the pump chamber 733, while inhibiting the concentrated chemical from flowing in a reverse direction back out of the inlet 725. Also, in some embodiments, a normally-open umbrella valve is utilized for the outlet valve 747 to allow concentrated chemical to flow substantially uninhibited through the outlet 745 from the pump chamber 733, while inhibiting backflow into the pump chamber 733 through the outlet 745.

The volume of the pump chamber 733 shown in FIGS. 25 and 26 can be changed by movement of the piston 735, which is moveable within the pump chamber 733 to draw concentrated chemical therein through the inlet 725 and to push chemical fluid therefrom through the outlet 745. The piston 735 of the illustrated embodiment is moved within the pump chamber 733 by a crank arm 783 connected to gears 709 of a gear train 739. The crank arm 783 can be eccentrically connected to one of the gears 709 for transmission of rotary motion from the gear 709 to linear or substantially linear motion of the piston 735 within the pump chamber 733. The gears 709 can be coupled to a wheel (not shown) having any of the configurations described herein, so that the gears 709 rotate in response to rotation of the wheel in any of the manners described above. As the gears 709 rotate, the crank arm 783 moves the piston 735 in one direction within the pump chamber 733 to draw concentrated chemical into the inlet 725, and in an opposite direction within the pump chamber 733 to push concentrated chemical out of the outlet 745. It should be noted that other types of piston and chamber shapes and configurations and piston movements are possible to perform these functions, all of which fall within the spirit and scope of the present invention. Also, in other embodiments, the piston 735 can be driven by a crank arm 783 directly coupled to a wheel, rather than through a reducing or non-reducing gear train.

In some embodiments, such as the embodiment illustrated in FIG. 25, a manually-operated piston 757 can be included to initially prime the piston pump 723 and/or to manually dispense a dose of concentrated fluid through the pump chamber 733. For example, during a first usage of the piston pump 723, it may be necessary to exert a suction force in a repeated or sustained manner to draw concentrated chemical toward and into the pump chamber 733. As another example, it may be desirable for a user to manually dispense a larger amount of concentrated chemical into the diluent stream than would otherwise have been dispensed under normal operation of the dispensing apparatus (e.g., by rotation of the wheel), such as when a stronger cleaning fluid is needed in an application. The manually-operated piston 757 provides a convenient manner by which a user can perform either or both functions. The manually-operated piston 757 in the illustrated embodiment is movable independently of the piston 735 driven by the crank arm 783 as described above, and provides an attractive manner by which a user can control pressure in the piston chamber 733 independently of wheel operation or the position or movement of the other piston 735.

The manually-operated piston 757 can be connected to or define a button 797 or other manual actuator accessible by a user from outside the dispensing apparatus. The button 797 can be spring-loaded in some embodiments, and can be actuated one or more times until sufficient concentrated chemical has been drawn to the piston pump 723 to prime the piston pump 723. In this regard, actuation of the button 797 draws concentrated chemical from a chemical reservoir and through the inlet 725. This actuation can be used to initially fill an empty or partially empty pump chamber 733 (for priming), or to provide one or more additional doses of concentrated chemical through the outlet 744 toward a diluent stream (whether directly or through a tube, pipe, channel, or other conduit, such as conduit 759 shown in FIG. 26). In the illustrated embodiment of FIGS. 25 and 26, the manually-operated piston 757 can be actuated to prime an empty pump chamber 733 within about 10 seconds, although faster or slower priming times are possible. In some embodiments, the piston pump 723 can be primed during manufacturing (e.g., partially or fully filled with concentrated chemical or other fluid), whereas in other embodiments, the piston pump 723 can be primed by an initial user.

In some embodiments, the piston pump 723 is positioned and oriented so that either or both valves 729 and 747 are located above and/or within the chemical reservoir (not illustrated) to inhibit leakage of the concentrated chemical outside of the dispensing apparatus. In such embodiments, even if the piston pump 723 is primed during manufacture and prior to shipping, concentrated chemical leakage can be prevented. Also, the inlet and/or outlet valves 729, 747 can have pre-load forces holding either or both valves 729, 747 closed against fluid flowing from the pump chamber 733. In some embodiments, the inlet valve 729 can have a relatively small pre-load force (e.g., about 0.5 psi) holding the inlet valve 729 closed, and the outlet valve 747 can have a larger pre-load force (e.g., about 3 psi) holding the outlet valve 729 shut. These pre-load forces provide little resistance to fluid flowing into the pump 723, but more resistance to fluid flowing out of the pump 723, and can therefore help inhibit leakage of concentrated chemical from the pump 723 during packaging, shipment, storage, unpackaging, and installation. Also, the balance between the pre-loads of the inlet and outlet valves 729, 747 can allow for appropriate pressure to build in the chamber 733 during operation, particularly in light of the variety of viscosities of fluids that can be pumped by the piston pump 723. It should be noted that other inlet and outlet valve pre-load forces are possible (e.g., pre-load forces lower than 0.5 psi and greater than 3 psi for either valve 729, 747), and that either or both inlet and outlet valves can have no pre-load force, in some embodiments. The valve pre-load values provided above are given by way of example only, and are not intended to limit the scope of the invention.

Figure 27:
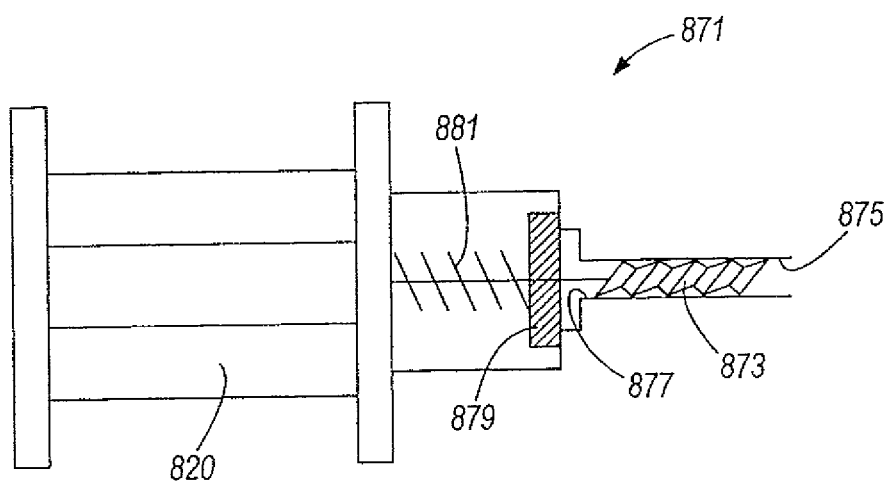
FIG. 27 is a schematic cross-sectional view of a pump according to another embodiment of the present invention.
Figure 28:
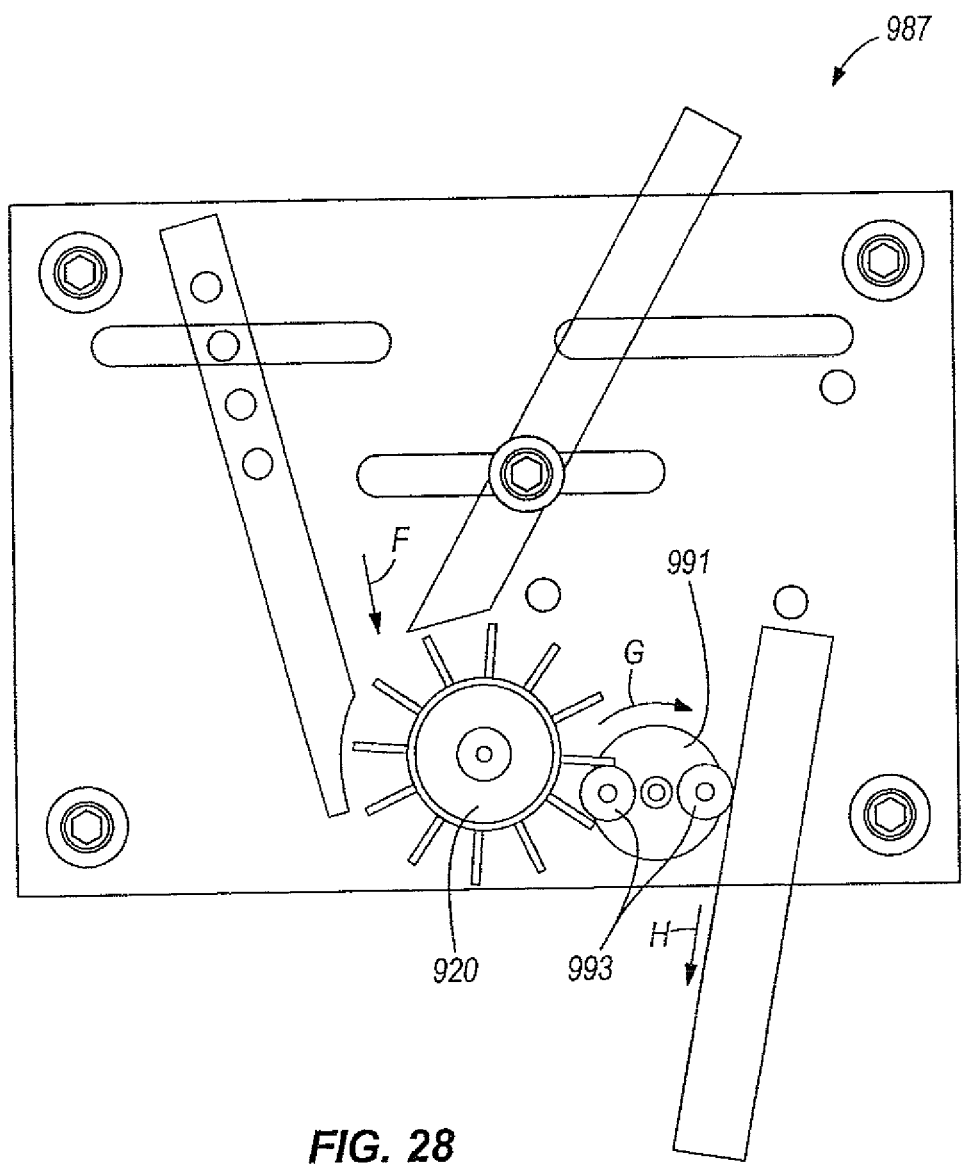
FIG. 28 is a front view of a pump according to yet another embodiment of the present invention.

FIGS. 27 and 28 illustrate alternative embodiments of a pump that can be utilized in any of the dispensing apparatuses described and illustrated herein to pump chemical concentrate from a chemical reservoir for mixture with water or other diluent. With reference first to FIG. 27, a gear pump 871 driven by a wheel 820 is shown. The gear pump 871 can include a worm gear or screw 873 (hereinafter collectively referred to as a screw 873) rotated in response to rotation of the wheel 820. The wheel 820 is rotated by the weight and/or impact of diluent thereon, in any of the manners described above in connection with earlier embodiments. The wheel 820 can either be coupled to the screw 873 to drive the screw 873 at the same speed as the wheel 820, or through one or more gears (not shown) in any of the manners described herein to rotate the screw 873 at a different speed. The sizes and numbers of gears can at least partially determine the quantity of concentrated chemical released in response to a given number of rotations of the wheel 820.

The worm gear 873 can be positioned adjacent an inlet 875 to drawn concentrated chemical toward a pump chamber 877. As concentrated chemical is directed toward the pump chamber 877, pressure builds within the pump chamber 877, and urges the concentrated chemical against a valve 879. The valve 879 can be any suitable normally-closed one-way valve, such as a ball valve, check valve, duck-bill valve, umbrella valve, two-piece hinged valve, and the like. Once a threshold pressure has been reached, the valve 879 is urged open to allow concentrated chemical to flow past the valve 879 and toward the wheel 820 for dispense (or in other embodiments, through a suitable conduit for dispense elsewhere in the dispensing apparatus). In some embodiments, a biasing element, such as the spring 881 shown in FIG. 27, can be used to bias the valve 879 toward a closed position. In other embodiments, and depending upon the type of valve 879 used, a biasing element is not required due to an inherent pre-load provided by the valve 879.

Another pump that can be used in any of the dispensing apparatus embodiments described and illustrated herein is shown in FIG. 28. The pump 987 in shown in FIG. 28 is a peristaltic pump 987, and is coupled to a wheel 920 receives a flow of diluent in the general direction indicated by arrow F to rotate the wheel 920. The wheel 920 can be drivably connected to a rotor 991 of the peristaltic pump 987 in any of the manners described herein, whether directly (without change in rotational speed) or through one or more gears or other mechanical power transmission elements (possibly with change in rotational speed). Rotation of the wheel 920 causes rotation of the rotor 991 in the direction indicated by arrow G in FIG. 28. As described above in earlier embodiments, the manner in which the wheel 920 is drivably coupled to the rotor 991 can at least partially determine the rate of concentrated chemical dispense and the resulting dilution ratio of the concentrated chemical by virtue of the speed of the pump 987. The rotor 991 shown in FIG. 28 includes two rollers 993 that press against a resilient and flexible conduit (not shown) to move fluid along the conduit in the direction indicated by Arrow H. The peristaltic pump 987 shown in FIG. 28 can produce a repeatable dispensed quantity of concentrated chemical per rotation(s) of the wheel, and can function as an attractive alternative to the other pumps described and illustrated herein.

In some embodiments of the present invention, including in any of the dispensing apparatus embodiments described and illustrated herein, it may be desirable to control or limit the inertial effect of diluent entering the dispensing apparatus and being introduced to the wheel. For example, the pressure of fluid supplied to the dispensing apparatus (and therefore the pressure of fluid being supplied to the wheel in some embodiments) can vary from environment to environment, thereby impacting the speed of the wheel in some embodiments. For example, in some areas, water may flow out of a plumbed faucet, for example, at 6 gallons per minute or more, whereas in other areas, this flow rate may be as little as, for example, 0.5 gallons per minute or less. Even in cases where fluid pressure from a diluent source is not a significant issue, the inertia gained by diluent falling to the dispensing apparatus can impact the speed of the wheel in some embodiments. For example, the height difference between a faucet and the chemical dispensing apparatus can range from as little as an inch or two, to as much as sixteen inches or more, for example.

In some embodiments of the present invention, any of the dispensing apparatuses described and illustrated herein can be provided with a baffle as described in greater detail below. The baffle can be used to control or limit the velocity of diluent entering the dispensing apparatus, thereby allow the weight of the water to be the primary or only substantial force generating rotation of the wheel and dispense of concentrated chemical. In this manner, the accuracy of chemical dosing to the diluent can be increased significantly. This accuracy is desirable based upon the need in many facilities to meet codes regulating mixtures acceptable for cleaning cooking and eating utensils, floors, bathrooms, and for other applications. A mixture that is too weak (has too much diluent) or is too strong (has too much chemical) may not meet code requirements. The baffles described below and illustrated in FIGS. 29-34B help to keep concentrated chemical dosing consistent, despite factors that can significantly alter the kinetic energy of diluent flowing to the dispensing apparatus, such as diluent source pressure and height as described above.

Figure 29:
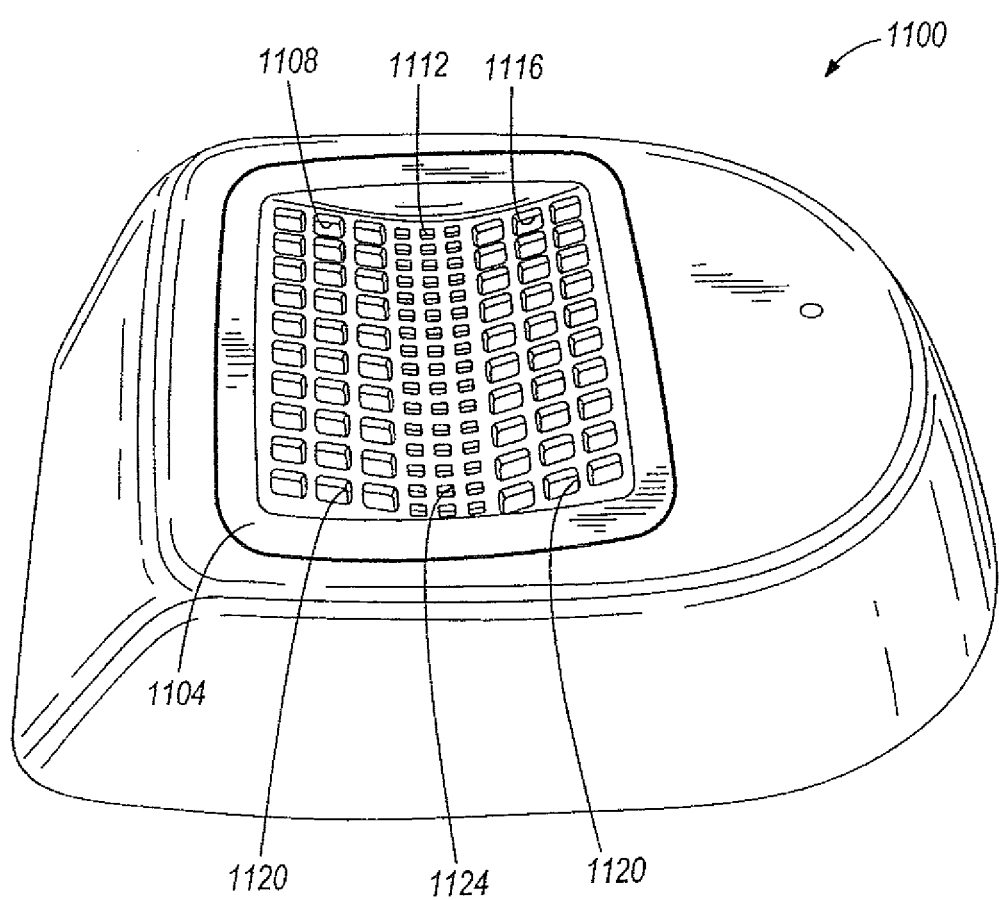
FIG. 29 is a perspective view of a cap and baffle according to an embodiment of the present invention.

FIG. 29 shows a cap 1100 that can be coupled to any of the previously-described dispensing apparatuses. The cap 1100 can define or be coupled to a funnel, and in some embodiments can be coupled to a body or other portion of the dispensing apparatus and/or a concentrated chemical reservoir (not shown). The cap 1100 is provided with a baffle 1104 having a plurality of apertures, 1120, 1124 extending therethrough. The illustrated baffle 1104 has first, second, and third portions 1108, 1112 and 1116, respectively, wherein a plurality of apertures 1120 extend through the first and third portions 1108, 1116, and a plurality of generally smaller apertures 1124 extend through the second portion 1112. To limit splash or spillage, the illustrated baffle 1104 is generally concave in shape, such that the second portion 1112 is positioned at a lower height than the first and third portions 1108, 1116. This concave arrangement is best illustrated in FIGS. 29-32.

Diluent approaching the dispensing apparatus can be slowed and/or disrupted by the baffle 1104. In those embodiments, such as that shown in FIGS. 29 and 30, the diluent can then be captured in a funnel 1140 of the dispensing apparatus positioned below the baffle 1104. The weight of the diluent (or the potential energy of the diluent) can thereafter generate rotation of the wheel for concentrated chemical dispense, with reduced or eliminated impact of diluent velocity upon wheel rotation.

In the illustrated configuration of the baffle 1104, apertures 1124 are smaller than the apertures 1120 to improve the disruption and/or deceleration of diluent directed vertically downward toward apertures 1124—a common orientation of the diluent flow relative to the baffle 1104 in some applications. The smaller size of the apertures 1124 in the second portion 1112 of the baffle 1104 can limit the velocity of the diluent flow by deflecting much of the diluent. Despite the fact that the apertures 1120 in the first and second portions 1108, 1116 of the illustrated baffle 1104 are larger, the first and third portions 1108, 1116 are oriented at an acute angle with respect to a plane of the second portion 1112. Therefore, the larger apertures 1120 are also effective in limiting the velocity of diluent flow by deflecting the diluent that would otherwise flow directly vertically downward in some applications.

Other arrangements and configurations of the baffle 1104 are possible while still performing the diluent flow disruption and velocity-limiting functions described above. By way of example only, the baffle 1104 need not necessarily have three portions 1108, 1112, 1116 as described above, and can instead have any number of portions with the same or different aperture sizes (e.g., two non-parallel and intersecting portions, four or more portions defining a bowl shape, and the like). Also, although a concave baffle 1104 can provide significant advantages, baffles 1104 having other shapes can instead be used to effectively disrupt and slow diluent flow into the dispensing apparatus. For example, the baffle 1104 can be substantially planar, or could have first, second, and third portions presenting a substantially convex shape to the approaching diluent flow. Furthermore, baffles 1104 according to some embodiments can have any number aperture sizes as desired.

Figure 30:
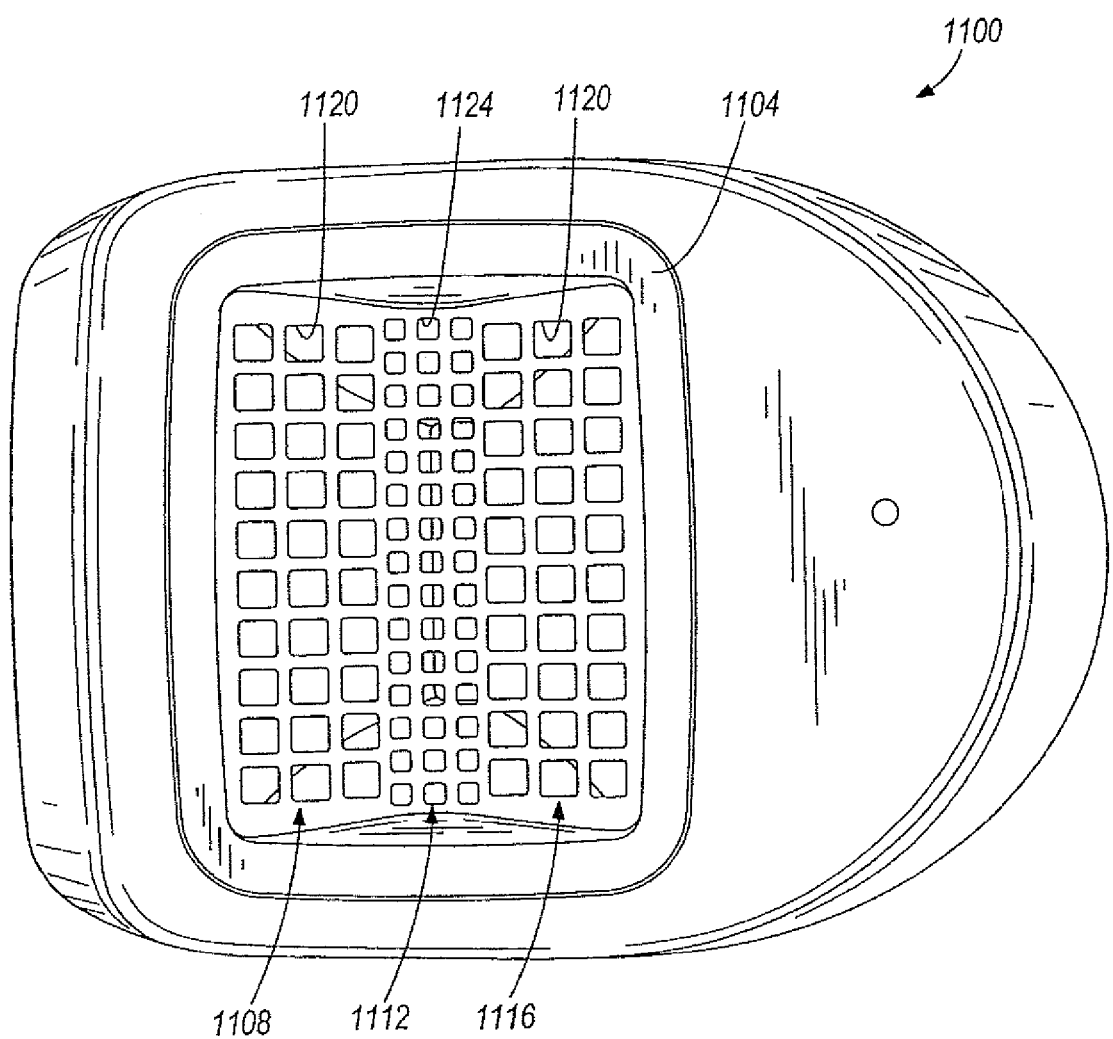
FIG. 30 is a top view of the cap and baffle shown in FIG. 29.
Figure 31:
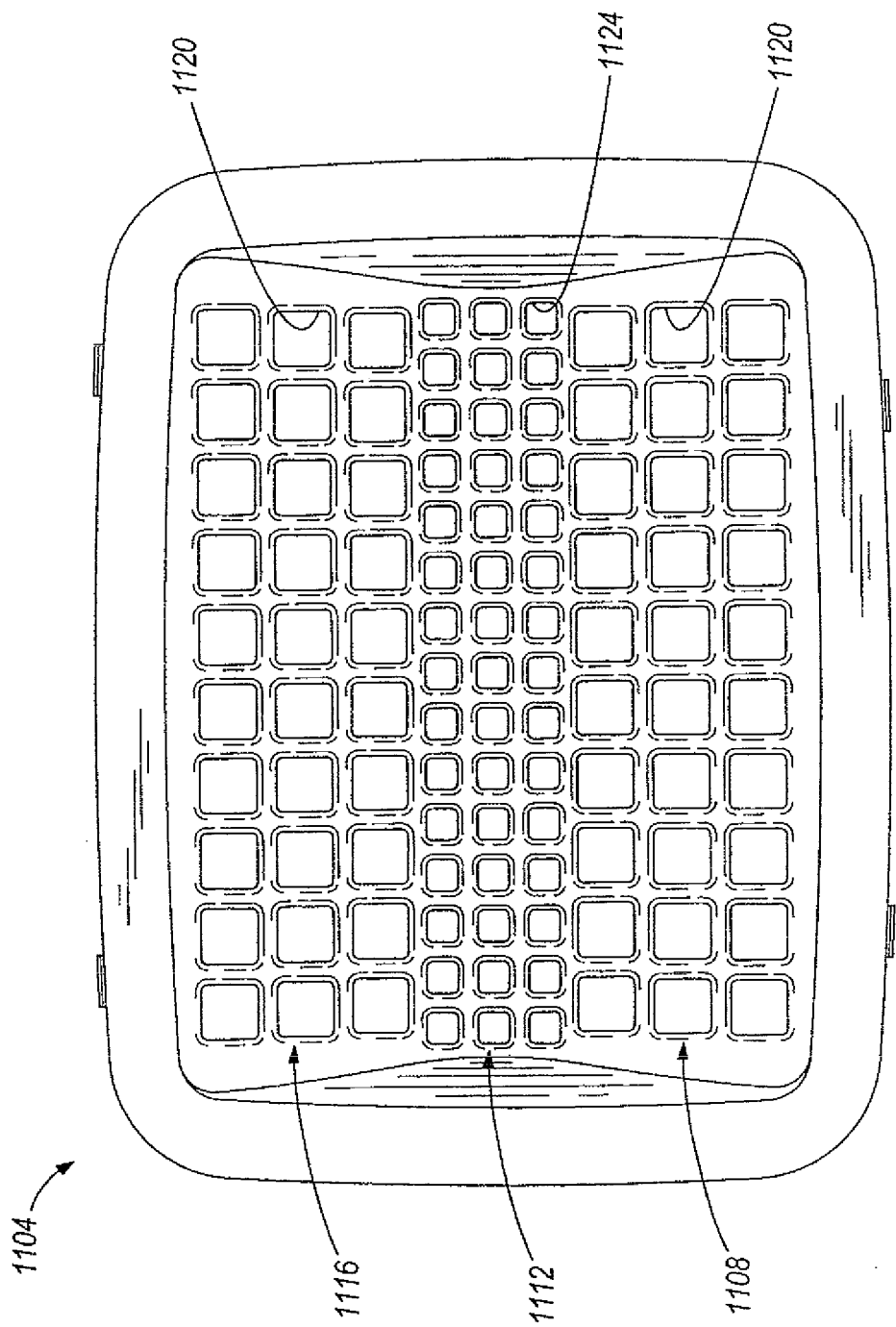
FIG. 31 is another top view of the cap and baffle shown in FIGS. 29 and 30.
Figure 32:
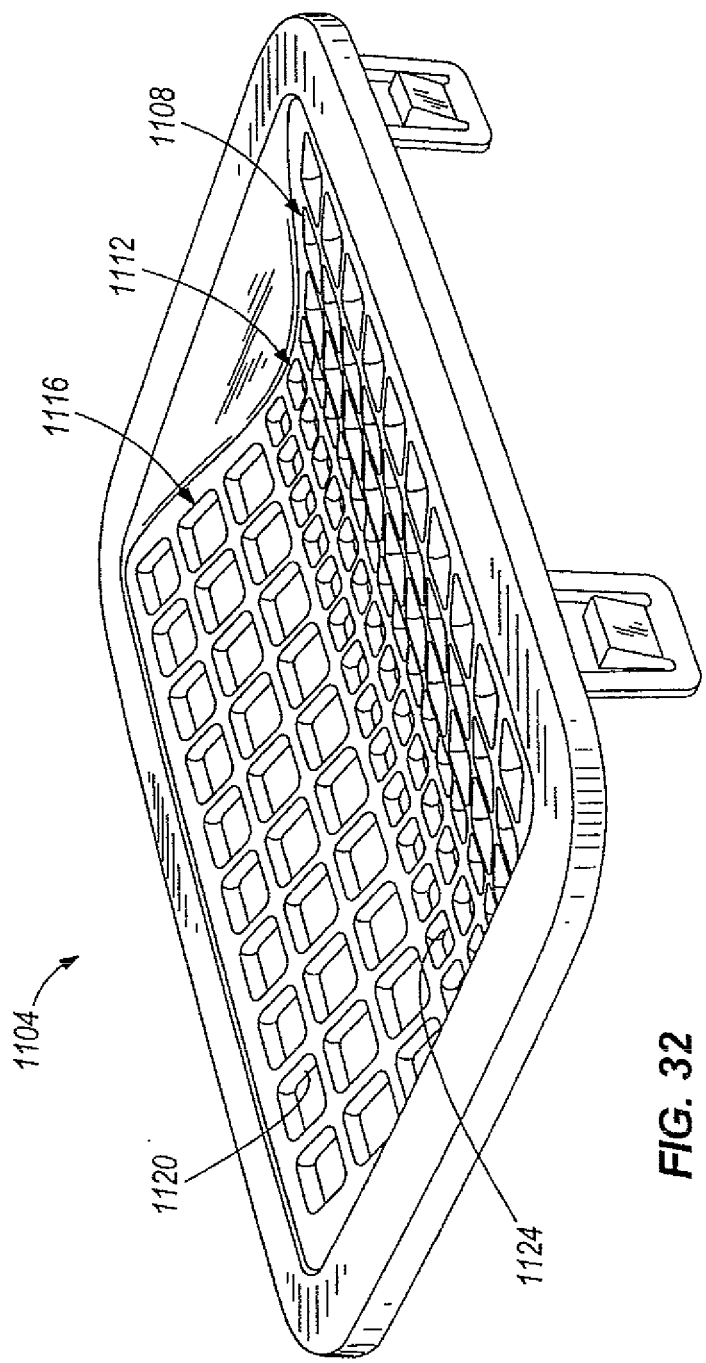
FIG. 32 is perspective view of the baffle shown in FIGS. 29-31.

The baffle 1104 shown in FIGS. 29-32 is shown installed on a cap 1100 in FIGS. 29 and 30. In some embodiments, the baffle 1104 can be removably installed on the cap 1100, or can be integrally formed with the cap 1100. It should also be noted that the baffle 1104 can be installed in dispensing apparatuses having no identifiable cap 1100, in which cases the baffle 1104 can be installed in any location between the source of diluent and the wheel (or fluid passage leading to the wheel), such as on a body or frame of the dispensing apparatus, in or on the mouth of a funnel upstream of the wheel, and the like.

Figure 33:
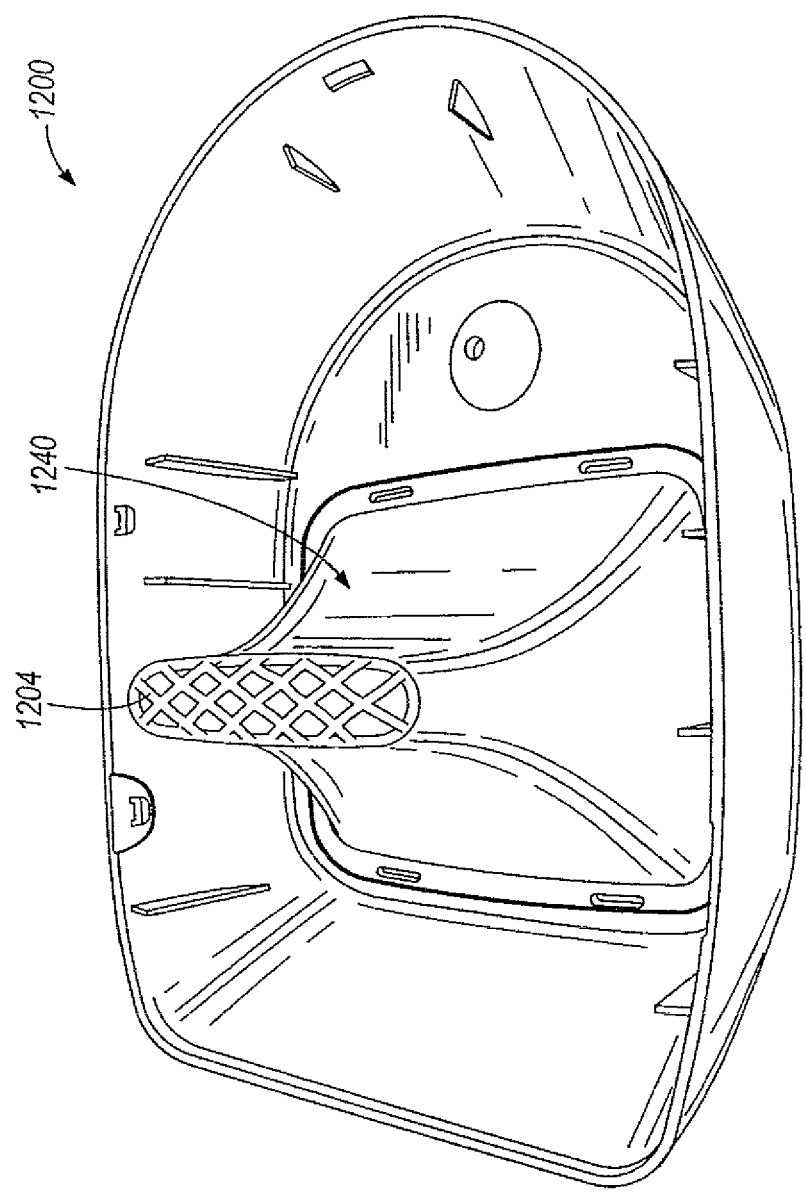
FIG. 33 is a bottom perspective view of a cap and baffle according to another embodiment of the present invention.

A baffle 1204 according to another embodiment of the present invention is shown in FIG. 33. The illustrated baffle 1204 is positioned at a lower portion of the funnel 1240 and cap 1200, and is permanently connected to the funnel 1240. The baffle 1204 can be coupled to the funnel 1240 and/or cap 1200 in any manner desired, such as adhesive or cohesive bonding material, welding, mechanical fasteners, and the like. In other embodiments, the baffle 1204 is removable from the funnel 1240 and/or cap 1200. Also, in other embodiments, the baffle 1204 is positioned to disrupt and reduce the velocity of diluent flow (e.g., at a lower portion of the funnel 1240 and cap 1200) but is instead permanently or releasably connected to another part of the dispensing apparatus, such as to a body, frame, or to the chemical reservoir (not shown).

Other types of baffles that can be used to disrupt and reduce the speed of entering diluent are possible, and fall within the spirit and scope of the present invention. For example, and with reference to FIG. 34A, a plurality of baffles 1350 are provided on the funnel 1340, and can be dispersed along the interior surface of the funnel 1340. In some non-illustrated embodiments, the baffles 1350 form a regular pattern along the length of the funnel 1340, whereas in other embodiments, the baffles 1350 are positioned irregularly along the length of the funnel 1340. In other embodiments, the funnel 1340 can be provided with recesses of any shape and depth for receiving a quantity of diluent prior to allowing the diluent to flow further into the funnel 1340. These recesses can function to disrupt and reduce the speed of diluent passing into the funnel 1340.

Still other devices and elements exist for disrupting and reducing the speed of diluent introduced into the various dispensing apparatuses of the present invention. In some embodiments, diluent can be collected in one or more reservoirs to limit the diluent velocity, and can thereafter flow into and through an aperture elevated above a lowermost portion of the reservoir after the reservoir has filled sufficiently. For example, and with reference to the schematic illustration of FIG. 34B, diluent can flow into a funnel 1340 and out through an aperture 1360 in the funnel 1340 as indicated by arrow 1365. In this manner, the velocity of the diluent can be regulated, since the diluent velocity flowing out of aperture 1360 can have a relatively consistent potential energy and limited kinetic energy. Furthermore, one or more additional reservoirs can be positioned to receive diluent flowing through aperture 1360, and can function in the same or similar manner as the funnel 1340 and aperture. Accordingly, diluent can be gradually lowered toward the wheel (not shown) with limited velocity.

Figure 34C:
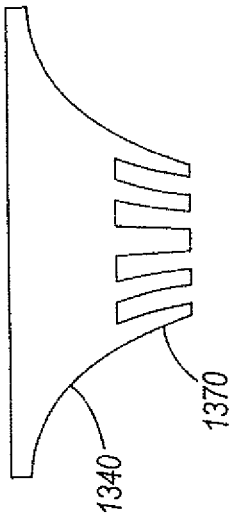
FIG. 34C is a schematic view of another velocity limiter according to another embodiment of the present invention.
Figure 34B:
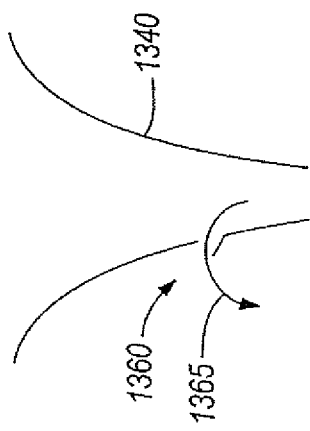
FIG. 34B is a schematic view of a velocity limiter according to an embodiment of the present invention.
Figure 34A:
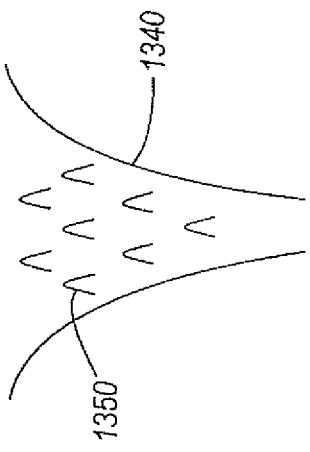
FIG. 34A is a schematic view of a baffle according to another embodiment of the present invention.

In still other embodiments, diluent can be contained within a structure having an aperture openable in response to weight of the diluent (as opposed to the velocity and impact of the diluent). For example, a deformable and resilient membrane having slits or other similar apertures can be opened when a given weight of diluent upon the resilient membrane is reached. However, the resilient membrane can otherwise remain substantially unmoved in response to impact of diluent thereupon. An example of such a velocity limiter is illustrated in FIG. 34C. The illustrated funnel-shaped membrane 1340 includes a plurality of resilient fingers 1370 that can deflect as shown in response to sufficient weight of diluent thereon.

In still other non-illustrated embodiments, diluent is directed through a tortuous pathway to reduce the velocity of the diluent prior to reaching the wheel. The tortuous pathway can be positioned above or below any of the baffles or other velocity limiting devices described above, or can be utilized without such baffles or velocity limiting devices.

Figure 36:
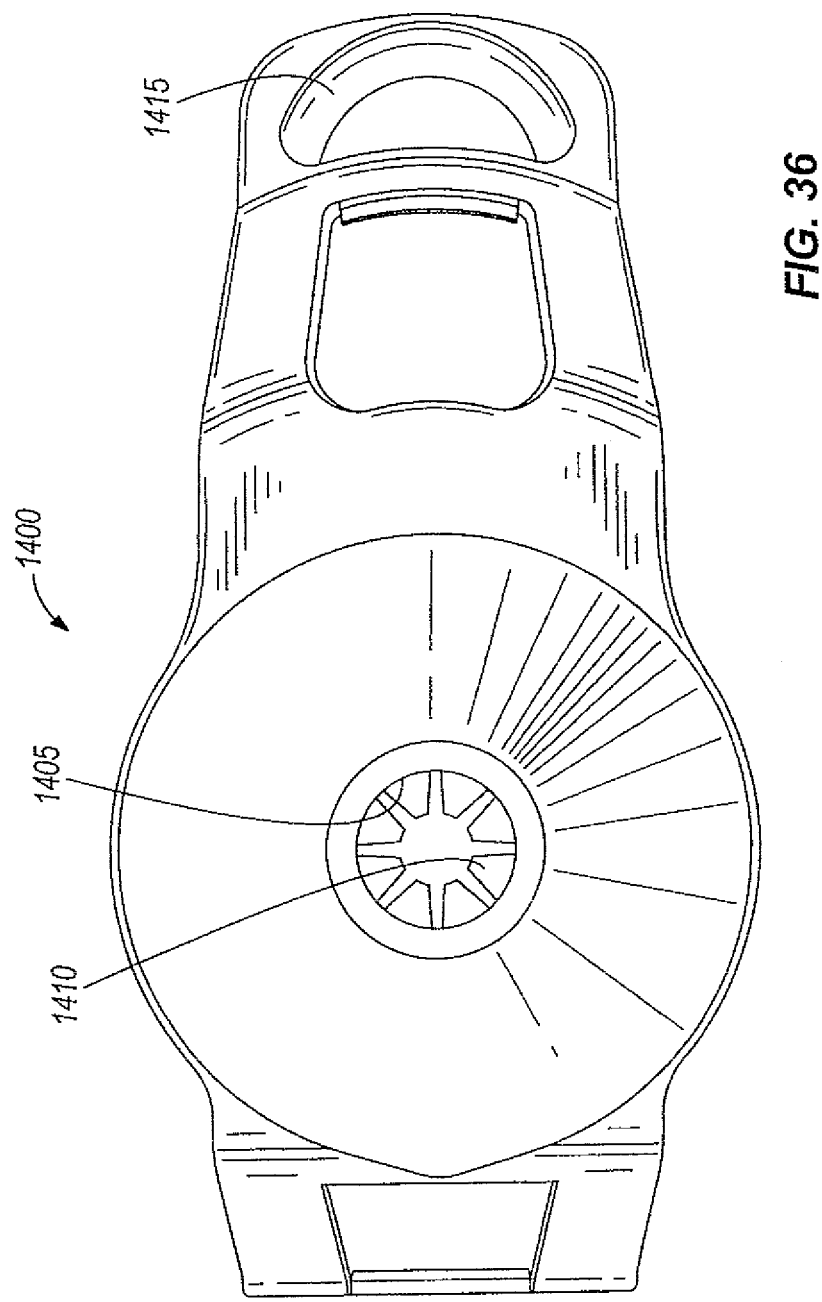
FIG. 36 is a top view of the hood shown in FIG. 35.
Figure 37:
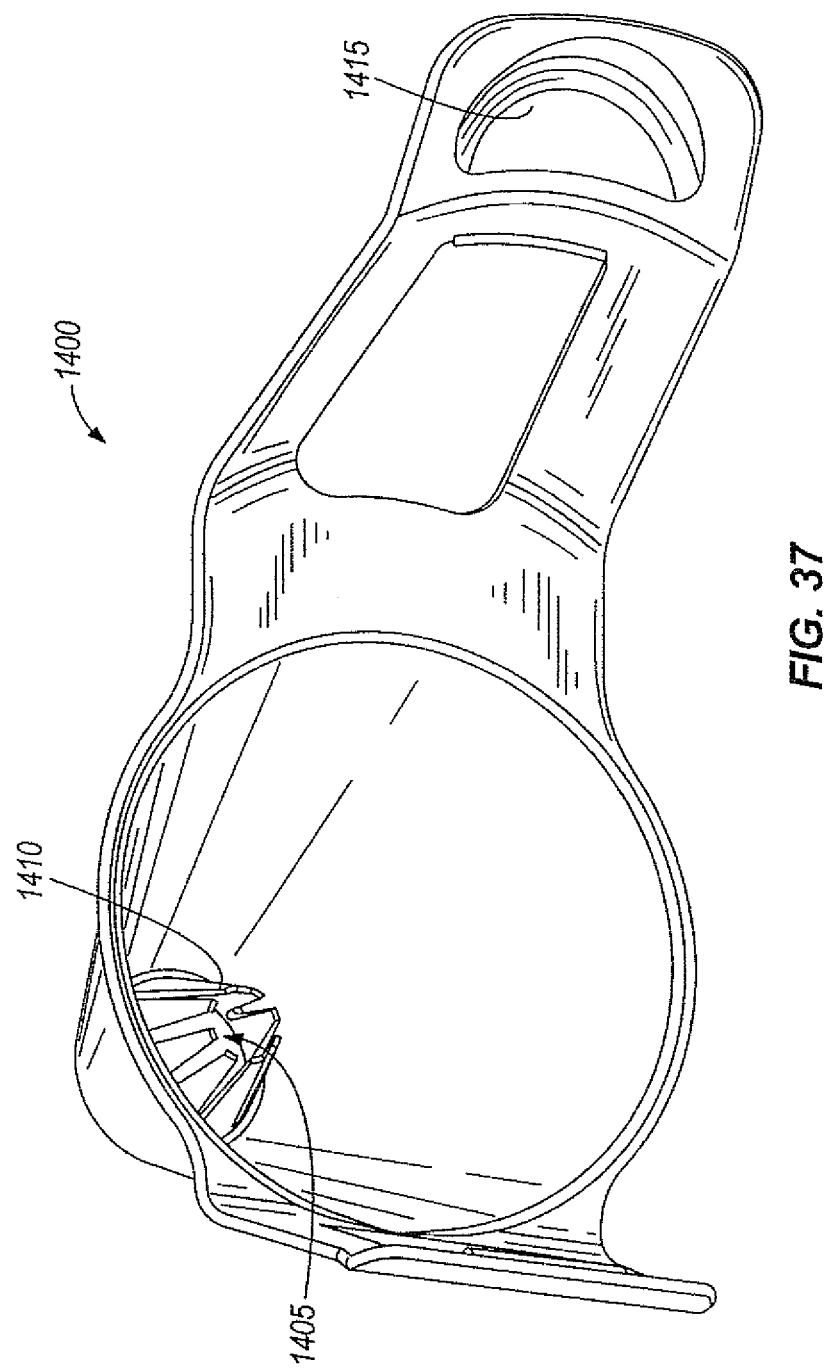
FIG. 37 is a bottom perspective view of the hood shown in FIGS. 35 and 36.

Another device that can be utilized in conjunction with any of the dispensing apparatuses described and illustrated herein is shown in FIGS. 35-37. This hood 1400 can be installed upon or defined by a cap or other portion of the dispensing apparatus, and can be permanently or releasably attached to the dispensing apparatus. The hood 1400 can limit splash back of diluent as the diluent enters the cap 1100 and funnel (if used). The hood 1400 can also contain any amount of diluent that has not yet flowed through a velocity limiter. The illustrated hood 1400 includes an aperture 1405 proximate an upper portion of the hood 1400. A plurality of barbs 1410 can be included, and can extend downward toward the cap 1100 from the aperture 1405. The aperture 1405 and barbs 1410 can receive a hose, or can inhibit splash back or overfilling of the dispensing apparatus.

The illustrated hood 1400 is an integral piece that is snap-fit onto the cap 1100. In some embodiments, the hood 1400 is removably coupled to the cap 1100, and in some embodiments can be removed from the cap 1100 by lifting up on a handle 1415. In other embodiments, the hood 1400 is non-removably secured to the cap 1100 or other portion of the dispensing apparatus. In the embodiments that include a removable hood 1400, the hood 1400 can be removed for storage or to receive a flow of water from a source that requires a larger input area than that provided by the aperture 1405. The hood 1400 can be made of any resilient material, such as plastic or metal.

As shown in FIGS. 35-37, the illustrated hood 1400 has a substantially cone-like shape. However, in other non-illustrated embodiments, the hood 1400 can have a rectangular, square, ovular, or any other regular or irregular shape.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, a rotary metering device is utilized in some embodiments to control the flow of concentrate through the dispenser. In some embodiments, other non-rotary structures can be used, such as a reciprocating member that selectively blocks a dispensing aperture. In other embodiments, one or more pumps or other metering devices can be utilized. For example, two pumps can be configured or driven to provide different dilution ratios of the same chemical. Alternatively, the additional pumps can be placed in communication with additional chemical reservoirs containing additional chemicals to dispense those chemicals. The additional chemicals can be dispensed simultaneously, sequentially, or alternatively.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Various features of the invention are set forth in the following claims.

What is claimed is:

1. A disposable fluid dispensing apparatus for dispense of a fluid into a diluent, the disposable fluid dispensing apparatus comprising:
    a housing;
    a diluent flow path through which diluent moves within the disposable dispensing apparatus, the diluent flow path having a diluent inlet area, a diluent accumulation area, and a diluent outlet area, the diluent inlet area oriented to receive a free-flowing diluent;
    a wheel located at least partially within the housing and driven by diluent flowing along the diluent flow path;
    a reservoir in which a quantity of fluid is retained, the reservoir permanently sealed against access by a user from outside of the disposable dispensing apparatus; and
    a pump in fluid communication with the fluid in the reservoir, the pump coupled to the wheel and driven by rotation of the wheel;
    wherein the housing, wheel, reservoir, and pump define a portable structure installed, removable, and disposable as a single integral unit without the use of tools.

2. The disposable fluid dispensing apparatus of claim 1, further comprising an arm adjustable to different positions to mount the dispensing apparatus to structures having different sizes.

3. The disposable fluid dispensing apparatus of claim 1, wherein the housing comprises a protrusion having a downwardly-facing bearing surface supporting the apparatus in an installed position of the apparatus.

4. The disposable fluid dispensing apparatus of claim 1, wherein the pump is a gear pump comprising first and second gear pump housing portions and a sheet of resilient compressible material compressed between the first and second gear pump housing portions.

5. The disposable fluid dispensing apparatus of claim 4, wherein the first and second gear pump housing portions are rotatable with respect to one another to change an amount of compression exerted upon the sheet.

6. The disposable fluid dispensing apparatus of claim 1, wherein the pump is a piston pump having a pump chamber, a first piston driven by the wheel to pump fluid within the pump chamber, and a second piston manually operable independently with respect to the first piston to pump fluid within the pump chamber.

7. The disposable fluid dispensing apparatus of claim 1, wherein fluid from the pump is delivered to the wheel.

8. The disposable fluid dispensing apparatus of claim 1, wherein:
   each rotation of the wheel corresponds to an amount of diluent passing the wheel along the diluent flow path and an amount of fluid pumped from the reservoir; and
   a ratio of the amount of fluid pumped from the reservoir per rotation of the wheel to the amount of diluent passing the wheel per rotation of the wheel is at least about 1:500.

9. The disposable fluid dispensing apparatus of claim 8, wherein the ratio is at least about 1:1800.

10. The disposable fluid dispensing apparatus of claim 8, wherein the ratio is at least about 1:2500.

11. The disposable fluid dispensing apparatus of claim 1, further comprising a baffle upstream of an inlet of the housing and through which diluent flows to enter the inlet.

12. The disposable fluid dispensing apparatus of claim 1, further comprising a gear train coupled to and between the wheel and the pump to drive the pump at a speed different from that of the wheel.

13. The disposable fluid dispensing apparatus of claim 1, wherein the housing encloses the wheel, the reservoir, and the pump, and the housing is constructed to permanently seal the reservoir against access by a user from outside of the disposable dispensing apparatus.

14. The disposable fluid dispensing apparatus of claim 1, wherein the housing includes a bearing surface, the portable structure configured to be mounted on a surface via the bearing surface such that a portion of the portable structure is disposed above the bearing surface and a portion of the portable structure is disposed below the bearing surface.

15. The disposable fluid dispensing apparatus of claim 1, wherein the diluent inlet, the diluent accumulation area, the wheel, and the diluent outlet are oriented in a vertical relationship relative to each other.

16. The disposable fluid dispensing apparatus of claim 1, wherein user access to an interior of the reservoir is only possible by permanently damaging or destroying the reservoir.

17. A disposable fluid dispensing apparatus for dispense of a fluid into a diluent, the disposable fluid dispensing apparatus comprising:
   a housing;
   a diluent flow path through which diluent moves within the disposable dispensing apparatus;
   a wheel located at least partially within the housing and driven by diluent flowing along the diluent flow path;
   a reservoir in which a quantity of fluid is retained, the reservoir permanently sealed against access by a user from outside the disposable dispensing apparatus; and
   an arm coupled to a portion of the housing and adjustable relative to the housing to different positions to mount the dispensing apparatus to structures having different thicknesses;
   wherein the housing, wheel, reservoir, and arm define a portable structure installed, removable, and disposable as a single integral unit without the use of tools.

18. The disposable fluid dispensing apparatus of claim 17, wherein the housing encloses the wheel, the reservoir, and the pump, and the housing is constructed to permanently seal the reservoir against access by a user from outside of the disposable dispensing apparatus.

19. A disposable fluid dispensing apparatus for dispense of a fluid into a diluent, the disposable fluid dispensing apparatus comprising:
   a housing;
   a diluent flow path through which diluent moves within the disposable dispensing apparatus;
   a wheel located at least partially within the housing and driven by diluent flowing along the diluent flow path;
   a reservoir in which a quantity of fluid is retained, the reservoir permanently sealed against access by a user from outside the disposable dispensing apparatus; and
   a baffle upstream of an inlet of the housing and through which diluent flows to enter the inlet;
   wherein the housing, wheel, reservoir, and baffle define a portable structure installed, removable, and disposable as a single integral unit without the use of tools.

20. The disposable fluid dispensing apparatus of claim 19, wherein the housing encloses the wheel, the reservoir, and the pump, and the housing is constructed to permanently seal the reservoir against access by a user from outside of the disposable dispensing apparatus.

21. The disposable fluid dispensing apparatus of claim 19, wherein the baffle defines a plurality of apertures having different sizes through which diluent flows to enter the inlet.

* * * * *